(12) United States Patent
Lambarth et al.

(10) Patent No.: US 10,561,551 B2
(45) Date of Patent: *Feb. 18, 2020

(54) PATIENT SUPPORT WITH ENERGY TRANSFER

(71) Applicant: Stryker Corporation, Kalamazoo, MI (US)

(72) Inventors: Clifford Edwin Lambarth, Portage, MI (US); Chad Conway Souke, Vicksburg, MI (US); Michael Joseph Hayes, Kalamazoo, MI (US); Aaron Douglas Furman, Kalamazoo, MI (US); Martin Plante, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 918 days.

This patent is subject to a terminal disclaimer.

(21) Appl. No.: 15/040,593

(22) Filed: Feb. 10, 2016

(65) Prior Publication Data

US 2016/0158083 A1 Jun. 9, 2016

Related U.S. Application Data

(63) Continuation of application No. 14/517,973, filed on Oct. 20, 2014, now Pat. No. 9,289,336, which is a
(Continued)

(51) Int. Cl.
*A61G 7/05* (2006.01)
*A61G 1/02* (2006.01)
(Continued)

(52) U.S. Cl.
CPC ............. *A61G 7/05* (2013.01); *A61G 1/0268* (2013.01); *A61G 1/04* (2013.01); *A61G 3/029* (2013.01);
(Continued)

(58) Field of Classification Search
CPC .......... A61G 7/002; A61G 7/018; A61G 7/05; A61G 7/0528; A61G 7/1046; A61G 13/02;
(Continued)

(56) References Cited

U.S. PATENT DOCUMENTS

| 1,482,439 A | 2/1924 | McCollough |
| 2,127,309 A | 8/1938 | Rickard |

(Continued)

FOREIGN PATENT DOCUMENTS

| EP | 1034764 | 9/2000 |
| GB | 2203999 | 11/1998 |

(Continued)

OTHER PUBLICATIONS

PCT International Search Report dated Jan. 22, 2009, for corresponding PCT Application No. PCT/US2008/068138.
(Continued)

*Primary Examiner* — Robert G Santos
(74) *Attorney, Agent, or Firm* — Warner Norcross + Judd LLP

(57) ABSTRACT

A patient support including a base; a patient support surface supported by the base; an electrically powered device; a rechargeable power storage device for powering the electrically powered device; and a receiving coil electrically coupled to the rechargeable power supply for inductive coupling with a transmitting coil. The receiving coil is for recharging the rechargeable power supply when the receiving coil is inductively coupled to the transmitting coil.

22 Claims, 39 Drawing Sheets

Related U.S. Application Data continuation of application No. 13/296,656, filed on Nov. 15, 2011, now Pat. No. 8,864,205, which is a continuation-in-part of application No. 11/769,959, filed on Jun. 28, 2007, now Pat. No. 8,056,163, said application No. 13/296,656 is a continuation-in-part of application No. 12/886,987, filed on Sep. 21, 2010, now Pat. No. 8,439,416, and a continuation-in-part of application No. 12/145,037, filed on Jun. 24, 2008, now Pat. No. 7,887,113.

(60) Provisional application No. 60/817,528, filed on Jun. 28, 2006, provisional application No. 60/830,397, filed on Jul. 11, 2006, provisional application No. 61/248,654, filed on Oct. 5, 2009, provisional application No. 61/248,374, filed on Oct. 2, 2009, provisional application No. 60/949,005, filed on Jul. 11, 2007.

(51) Int. Cl.
```
A61G 7/018    (2006.01)
H02J 50/90    (2016.01)
H02J 50/12    (2016.01)
H02J 7/02     (2016.01)
A61G 1/04     (2006.01)
A61G 3/02     (2006.01)
A61G 7/005    (2006.01)
A61G 7/012    (2006.01)
A61G 7/015    (2006.01)
A61G 7/10     (2006.01)
A61G 3/08     (2006.01)
A61G 5/10     (2006.01)
```

(52) U.S. Cl.
CPC ......... *A61G 3/0236* (2013.01); *A61G 3/0254* (2013.01); *A61G 3/0272* (2013.01); *A61G 3/0875* (2013.01); *A61G 5/10* (2013.01); *A61G 7/005* (2013.01); *A61G 7/012* (2013.01); *A61G 7/015* (2013.01); *A61G 7/018* (2013.01); *A61G 7/1042* (2013.01); *A61G 7/1046* (2013.01); *H02J 7/025* (2013.01); *H02J 50/12* (2016.02); *H02J 50/90* (2016.02); *A61G 7/0506* (2013.01); *A61G 7/1067* (2013.01); *A61G 7/1076* (2013.01); *A61G 2200/32* (2013.01); *A61G 2200/325* (2013.01); *A61G 2200/34* (2013.01); *A61G 2203/10* (2013.01); *A61G 2203/42* (2013.01); *A61G 2205/60* (2013.01)

(58) Field of Classification Search
CPC ........ A61G 13/10; A61G 13/104; A61G 1/02; A61G 1/0287
USPC .................. 5/600, 620, 86.1, 81.1 R; 296/20
See application file for complete search history.

(56) References Cited

U.S. PATENT DOCUMENTS

| | | |
|---|---|---|
| 2,347,002 A | 4/1944 | Schofield |
| 2,456,024 A | 12/1948 | Schofield |
| 2,504,324 A | 4/1950 | Goldstein |
| 2,522,759 A | 9/1950 | Lindquist |
| 3,302,219 A | 2/1967 | Harris |
| 3,311,933 A | 4/1967 | Peterson |
| 3,380,085 A | 4/1968 | Ferneau et al. |
| 3,465,373 A | 9/1969 | Wilson |
| 3,742,527 A | 8/1973 | Johnson et al. |
| 3,759,565 A | 9/1973 | Ferneau |
| 3,790,133 A | 2/1974 | Jones |
| 3,814,414 A | 6/1974 | Chapa |
| 3,831,996 A | 8/1974 | Layer |
| 4,052,097 A | 10/1977 | Weil et al. |
| 4,097,941 A | 7/1978 | Merkel |
| 4,175,550 A | 11/1979 | Leininger et al. |
| 4,227,269 A | 10/1980 | Johnston |
| 4,251,100 A | 2/1981 | Rolandelli |
| 4,273,374 A | 6/1981 | Portman |
| 4,376,317 A | 3/1983 | Johnson |
| 4,389,066 A | 6/1983 | Weir et al. |
| 4,405,172 A | 9/1983 | Ferneau |
| 4,409,695 A | 10/1983 | Johnson et al. |
| 4,579,381 A | 4/1986 | Williams |
| 4,584,989 A | 4/1986 | Stith |
| 4,631,761 A | 12/1986 | Lederman |
| 4,682,810 A | 7/1987 | Zarka |
| 4,767,148 A | 8/1988 | Ferneau et al. |
| 4,872,657 A | 10/1989 | Lussi |
| 4,894,876 A | 1/1990 | Fenwick |
| 5,092,722 A | 3/1992 | Reazor, III et al. |
| 5,095,560 A | 3/1992 | Volker |
| 5,112,076 A | 5/1992 | Wilson |
| 5,129,116 A | 7/1992 | Borders et al. |
| 5,134,731 A | 8/1992 | Quintile et al. |
| 5,135,350 A | 8/1992 | Eelman et al. |
| 5,172,442 A | 12/1992 | Bartley et al. |
| 5,178,432 A | 1/1993 | Zeman et al. |
| 5,230,112 A | 7/1993 | Harrawood et al. |
| 5,236,390 A | 8/1993 | Young |
| 5,271,113 A | 12/1993 | White |
| 5,279,011 A | 1/1994 | Schnelle |
| 5,317,769 A | 6/1994 | Weismiller et al. |
| 5,343,581 A | 9/1994 | Bartley et al. |
| 5,365,622 A | 11/1994 | Schimer |
| 5,370,111 A | 12/1994 | Reeder et al. |
| 5,432,966 A | 7/1995 | Berta et al. |
| 5,461,739 A | 10/1995 | Falbo, Sr. |
| 5,461,740 A | 10/1995 | Pearson |
| 5,509,159 A | 4/1996 | Du-Bois |
| 5,577,279 A | 11/1996 | Foster et al. |
| 5,615,848 A | 4/1997 | Ceriani |
| 5,636,394 A | 6/1997 | Bartley |
| 5,774,915 A | 7/1998 | Scott et al. |
| 5,894,966 A | 4/1999 | Bobey et al. |
| 5,991,947 A | 11/1999 | Lavin et al. |
| 5,996,145 A | 12/1999 | Taylor |
| 6,038,718 A | 3/2000 | Pennington et al. |
| 6,112,345 A | 9/2000 | Foster et al. |
| 6,125,485 A | 10/2000 | Way et al. |
| 6,131,215 A | 10/2000 | Lindell |
| 6,141,806 A | 11/2000 | Bobey et al. |
| 6,240,579 B1 | 6/2001 | Hanson et al. |
| 6,260,220 B1 | 7/2001 | Lamb et al. |
| 6,276,010 B1 | 8/2001 | Way et al. |
| 6,282,736 B1 | 9/2001 | Hand et al. |
| 6,357,065 B1 | 3/2002 | Adams |
| 6,389,623 B1 | 5/2002 | Flynn et al. |
| 6,461,290 B1 | 10/2002 | Reichman et al. |
| 6,502,261 B1 | 1/2003 | Harwood |
| 6,505,363 B2 | 1/2003 | Davis |
| 6,505,365 B1 | 1/2003 | Hanson |
| 6,516,479 B1 | 2/2003 | Barbour |
| 6,536,056 B1 | 3/2003 | Vrzalik et al. |
| 6,678,907 B1 | 1/2004 | Voelker et al. |
| 6,681,423 B2 | 1/2004 | Zachrisson |
| 6,694,557 B1 | 2/2004 | Bobey et al. |
| 6,735,794 B1 | 5/2004 | Way et al. |
| 6,779,210 B1 | 8/2004 | Kelly |
| 6,822,571 B2 | 11/2004 | Conway |
| 6,848,127 B2 | 2/2005 | Inagaki |
| 6,880,187 B1 | 4/2005 | Johnson |
| 6,904,631 B2 | 6/2005 | Vrzalik et al. |
| 6,916,056 B2 | 7/2005 | Mitchell et al. |
| 6,978,501 B2 | 12/2005 | Vrzalik |
| 7,003,829 B2 | 2/2006 | Choi et al. |
| 7,111,340 B2 | 9/2006 | Mitchell et al. |
| 7,140,054 B2 | 11/2006 | Charles |
| 7,152,261 B2 | 12/2006 | Jackson |
| 7,181,791 B2 | 2/2007 | Clayton |

(56) References Cited

U.S. PATENT DOCUMENTS

| | | | |
|---|---|---|---|
| 7,343,635 B2 | 3/2008 | Jackson | |
| 7,389,552 B1 | 6/2008 | Reed et al. | |
| 7,398,571 B2 | 7/2008 | Souke et al. | |
| 7,424,758 B2 | 9/2008 | Broadley et al. | |
| 7,478,855 B2 | 1/2009 | Lambarth et al. | |
| 7,490,884 B2 | 2/2009 | Matunaga et al. | |
| 7,520,551 B2 | 4/2009 | Lambarth et al. | |
| 7,540,547 B2 | 6/2009 | Lambarth et al. | |
| 7,565,708 B2 | 7/2009 | Jackson | |
| 7,600,281 B2 | 10/2009 | Skripps | |
| 7,637,550 B2 | 12/2009 | Menna | |
| 7,650,654 B2 | 1/2010 | Lambarth et al. | |
| 7,690,057 B2 | 4/2010 | Malassigne et al. | |
| 7,694,368 B2 | 4/2010 | Lewis, Jr. | |
| 7,887,113 B2 * | 2/2011 | Lambarth | A61G 1/0212 296/20 |
| 8,046,116 B2 | 10/2011 | Rawls-Meehan | |
| 8,046,117 B2 | 10/2011 | Rawls-Meehan | |
| 8,051,511 B2 | 11/2011 | Nahavandi et al. | |
| 8,051,513 B2 | 11/2011 | Reed et al. | |
| 8,056,163 B2 | 11/2011 | Lemire et al. | |
| 8,143,846 B2 * | 3/2012 | Herman | A61G 7/0507 320/108 |
| 8,155,918 B2 | 4/2012 | Reed et al. | |
| 8,181,868 B2 | 5/2012 | Thomas et al. | |
| 8,439,416 B2 * | 5/2013 | Lambarth | A61G 1/02 296/20 |
| 8,499,384 B2 * | 8/2013 | Zerhusen | A61G 7/0507 5/424 |
| 8,864,205 B2 * | 10/2014 | Lemire | A61G 1/0268 296/20 |
| 8,973,963 B2 * | 3/2015 | Lambarth | A61G 1/02 296/20 |
| 9,003,581 B2 | 4/2015 | Beumer | |
| 9,038,218 B1 | 5/2015 | Heil et al. | |
| 9,125,785 B2 | 9/2015 | Trees | |
| 9,132,051 B2 | 9/2015 | Heil | |
| 9,289,336 B2 * | 3/2016 | Lambarth | A61G 1/0268 |
| 9,375,374 B2 * | 6/2016 | Herman | A61G 7/0507 |
| 9,456,939 B2 * | 10/2016 | Lambarth | A61G 1/02 |
| 9,693,922 B2 * | 7/2017 | Andersson | A61G 7/1015 |
| 9,966,997 B2 * | 5/2018 | Hayes | H04B 5/0037 |
| 10,123,925 B2 * | 11/2018 | Herman | A61G 7/0507 |
| 10,149,791 B2 * | 12/2018 | Lambarth | A61G 1/02 |
| 2003/0000015 A1 | 1/2003 | Horlin | |
| 2004/0133983 A1 | 7/2004 | Newkirk et al. | |
| 2004/0143904 A1 | 7/2004 | Borders et al. | |
| 2004/0176983 A1 | 9/2004 | Birkett et al. | |
| 2004/0202533 A1 | 10/2004 | Haire | |
| 2005/0015877 A1 | 1/2005 | Qi | |
| 2005/0015878 A1 | 1/2005 | Bannister et al. | |
| 2005/0120480 A1 | 6/2005 | Benedict et al. | |
| 2005/0125899 A1 | 6/2005 | Hanson et al. | |
| 2005/0210579 A1 | 9/2005 | Moffa et al. | |
| 2005/0229321 A1 | 10/2005 | Phillips et al. | |
| 2005/0273932 A1 | 12/2005 | Horlin | |
| 2006/0000021 A1 | 1/2006 | Hayes et al. | |
| 2006/0021143 A1 | 2/2006 | Lemire | |
| 2006/0059623 A1 | 3/2006 | Kramer, Jr. et al. | |
| 2006/0075558 A1 | 4/2006 | Lambarth et al. | |
| 2006/0082176 A1 | 4/2006 | Broadley et al. | |
| 2006/0085914 A1 | 4/2006 | Peterson et al. | |
| 2006/0090260 A1 | 5/2006 | Stryker et al. | |
| 2006/0090261 A1 | 5/2006 | Vrzalik | |
| 2006/0117484 A1 | 6/2006 | Derenne et al. | |
| 2006/0168728 A1 | 8/2006 | Stobel et al. | |
| 2006/0181100 A1 | 8/2006 | Lambarth et al. | |
| 2006/0195984 A1 | 9/2006 | Hakamiun et al. | |
| 2006/0195986 A1 | 9/2006 | Hakamiun et al. | |
| 2006/0225203 A1 | 10/2006 | Hosoya et al. | |
| 2006/0253983 A1 | 11/2006 | Falabrino | |
| 2007/0000055 A1 | 1/2007 | Donaldson | |
| 2007/0169269 A1 | 7/2007 | Wells | |
| 2007/0192960 A1 | 8/2007 | Jackson | |
| 2008/0000028 A1 * | 1/2008 | Lemire | A61G 7/001 5/618 |
| 2008/0240901 A1 | 10/2008 | Lambarth et al. | |
| 2008/0258486 A1 | 10/2008 | Broadley et al. | |
| 2008/0276372 A1 | 11/2008 | Lambarth | |
| 2009/0015027 A1 | 1/2009 | Lambarth et al. | |
| 2009/0039666 A1 | 2/2009 | Lambarth | |
| 2009/0178198 A1 | 7/2009 | Nahavandi et al. | |
| 2009/0178200 A1 | 7/2009 | Lambarth et al. | |
| 2009/0222988 A1 | 9/2009 | Reed et al. | |
| 2010/0045059 A1 | 2/2010 | Bourgraf et al. | |
| 2010/0176618 A1 | 7/2010 | Souke et al. | |
| 2011/0080016 A1 | 4/2011 | Lambarth et al. | |
| 2011/0229294 A1 | 9/2011 | Gale | |
| 2011/0247135 A1 * | 10/2011 | Herman | A61G 7/0507 5/425 |
| 2011/0248672 A1 * | 10/2011 | Herman | A61G 7/0507 320/108 |
| 2011/0260482 A1 | 10/2011 | Bourgraf et al. | |
| 2012/0117730 A1 | 5/2012 | Lemire et al. | |
| 2012/0199405 A1 | 8/2012 | Carletti et al. | |
| 2012/0233774 A1 | 9/2012 | Zerhusen | |
| 2012/0235830 A1 | 9/2012 | Becker et al. | |
| 2012/0237326 A1 | 9/2012 | Van Ness | |
| 2012/0267910 A9 * | 10/2012 | Lambarth | A61G 1/02 296/20 |
| 2014/0023469 A1 * | 1/2014 | Lambarth | A61G 1/02 414/513 |
| 2014/0080413 A1 | 3/2014 | Hayes et al. | |
| 2014/0265181 A1 | 9/2014 | Lambarth et al. | |
| 2015/0107020 A1 * | 4/2015 | Andersson | A61G 7/1015 5/83.1 |
| 2015/0115638 A1 * | 4/2015 | Lambarth | A61G 1/0268 296/20 |
| 2015/0297427 A1 * | 10/2015 | Lambarth | A61G 1/02 414/525.1 |
| 2016/0158083 A1 * | 6/2016 | Lambarth | A61G 1/0268 5/600 |
| 2016/0367416 A1 * | 12/2016 | Lambarth | A61G 1/02 |
| 2017/0319412 A1 * | 11/2017 | Herman | A61G 7/0507 |
| 2019/0123587 A1 * | 4/2019 | Titov | H02J 50/10 |
| 2019/0123598 A1 * | 4/2019 | Patmore | A61G 7/05 |
| 2019/0167496 A1 * | 6/2019 | Lambarth | A61G 1/02 |
| 2019/0192367 A1 * | 6/2019 | Patmore | A61G 7/0524 |
| 2019/0247254 A1 * | 8/2019 | Naber | A47C 31/123 |

FOREIGN PATENT DOCUMENTS

| | | |
|---|---|---|
| GB | 2431360 | 4/2007 |
| JP | 2000108770 A | 4/2000 |
| JP | 2002/153512 | 5/2002 |
| JP | 2004/283238 | 10/2004 |
| WO | WO 94/28560 | 12/1994 |
| WO | WO 01/47340 | 7/2001 |
| WO | WO 02/00466 | 1/2002 |
| WO | WO 2006/004820 | 1/2006 |
| WO | WO 2007/109267 | 9/2007 |
| WO | WO 2007/123571 | 11/2007 |

OTHER PUBLICATIONS

PCT International Search Report dated Jan. 22, 2009, for PCT Application No. PCT/US/2008/068138, which corresponds to U.S. Appl. No. 12/145,037, to which the present application claims priority.

PCT International Search report and Written Opinion for PCT Application No. PCT/US2010/04946 dated Aug. 2, 2011, which claims priority to U.S. Appl. Nos. 61/248,374 and 61/248,654.

PCT International Search Report and Written Opinion for PCT Application No. PCT/US07/72332 dated Feb. 4, 2008, which corresponds to U.S. Pat. No. 8,056,163, to which the present application claims priority.

* cited by examiner

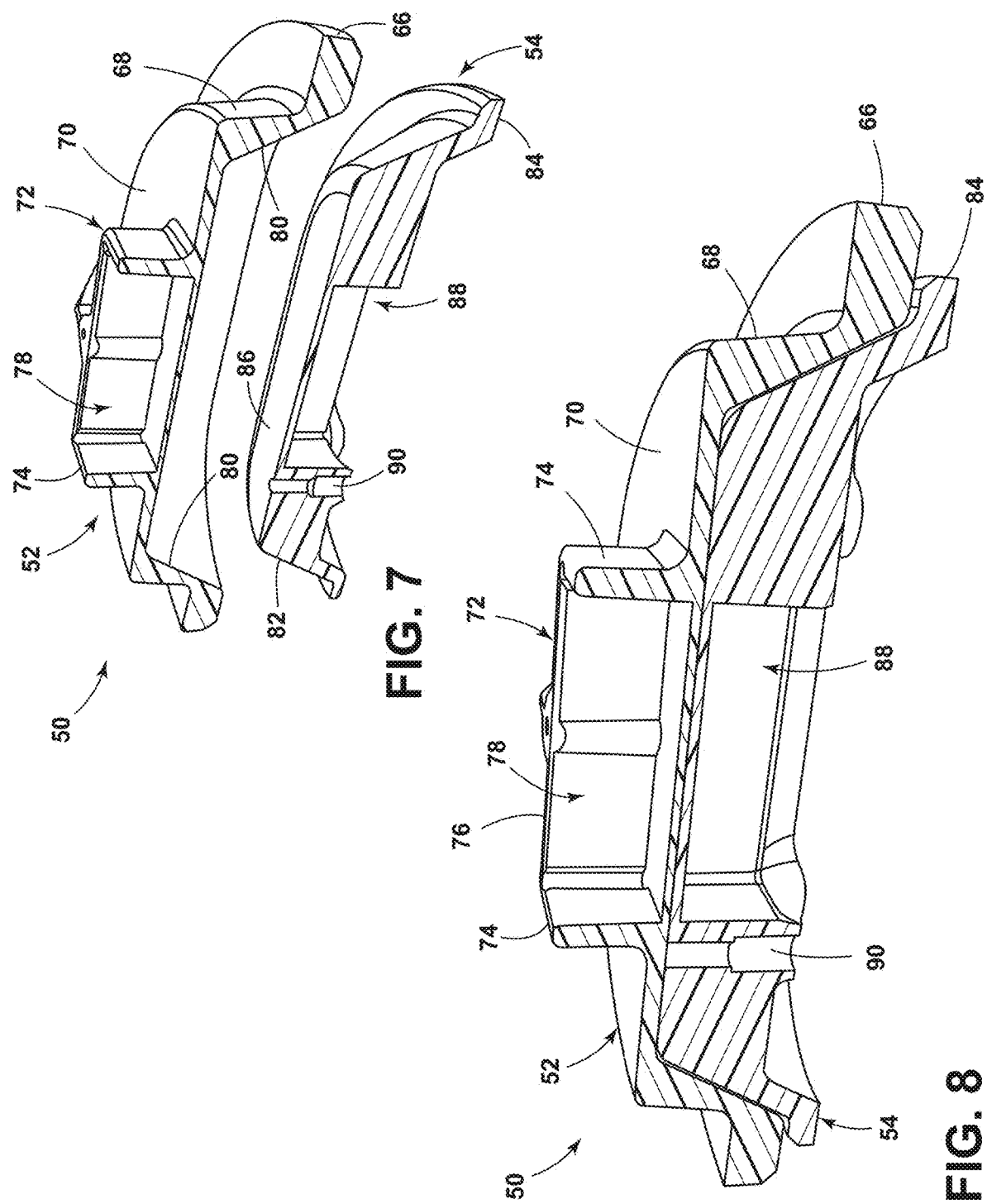

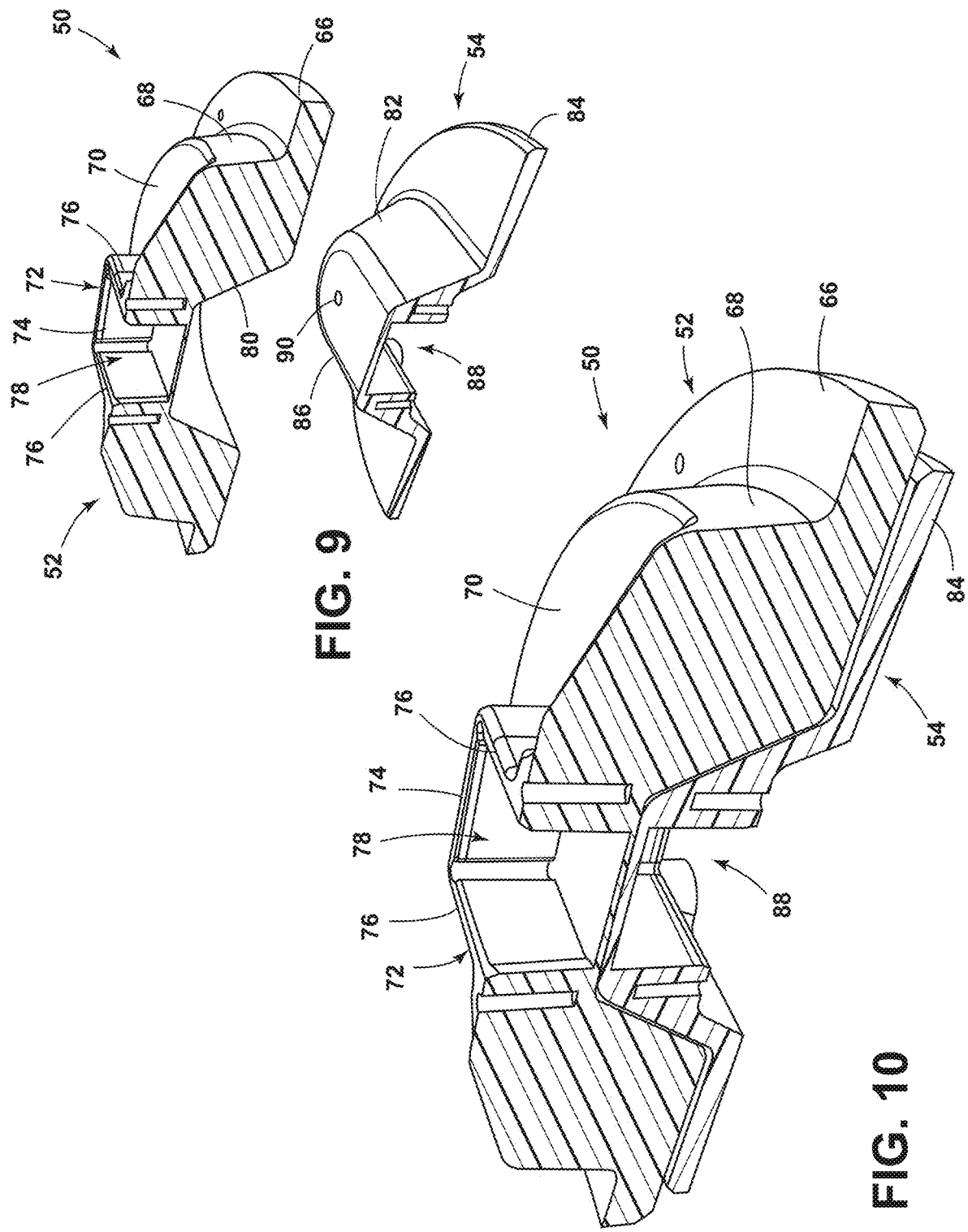

| FIG. 13A | FIG. 13B | FIG. 13C |

FIG. 13

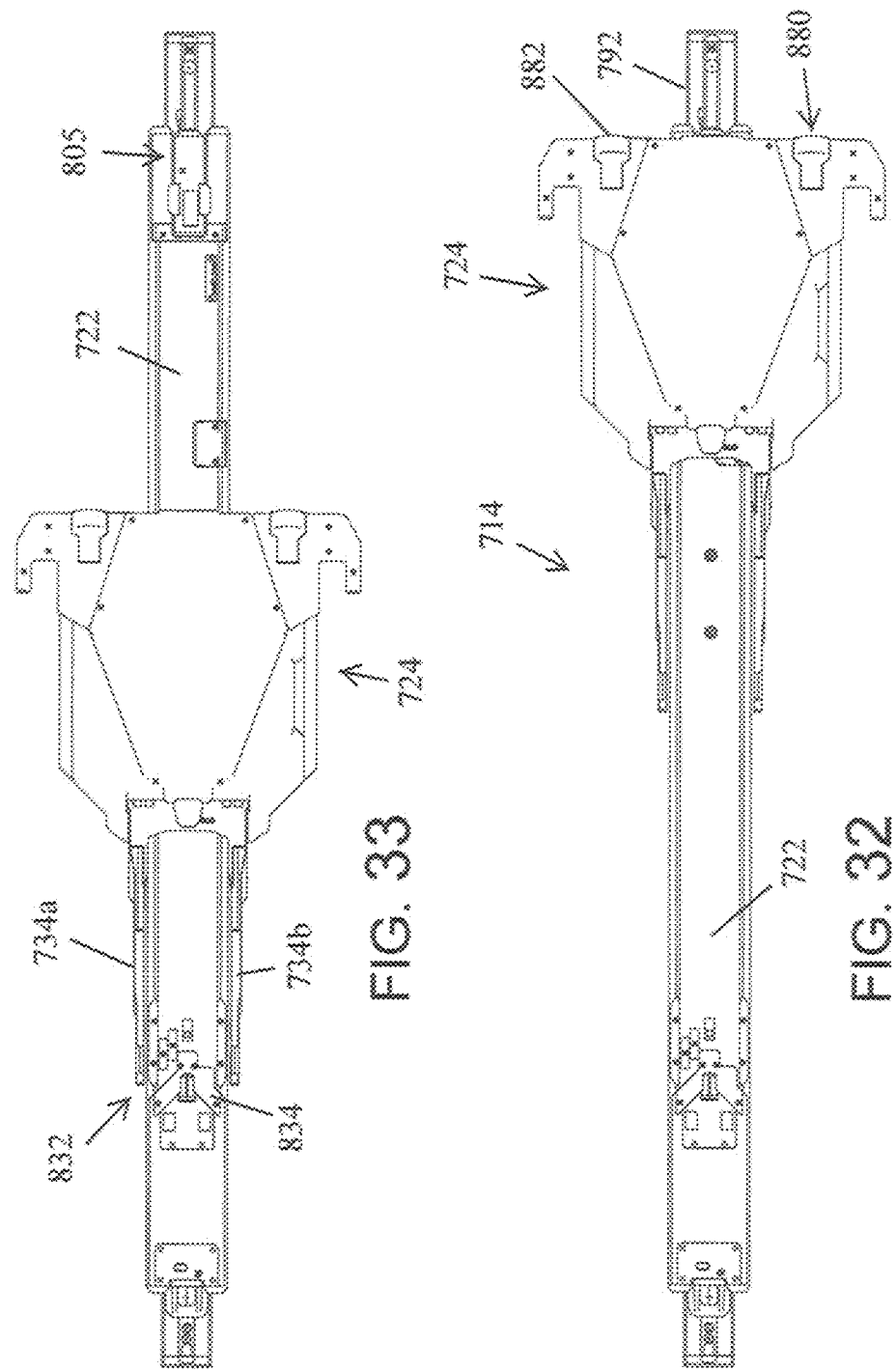

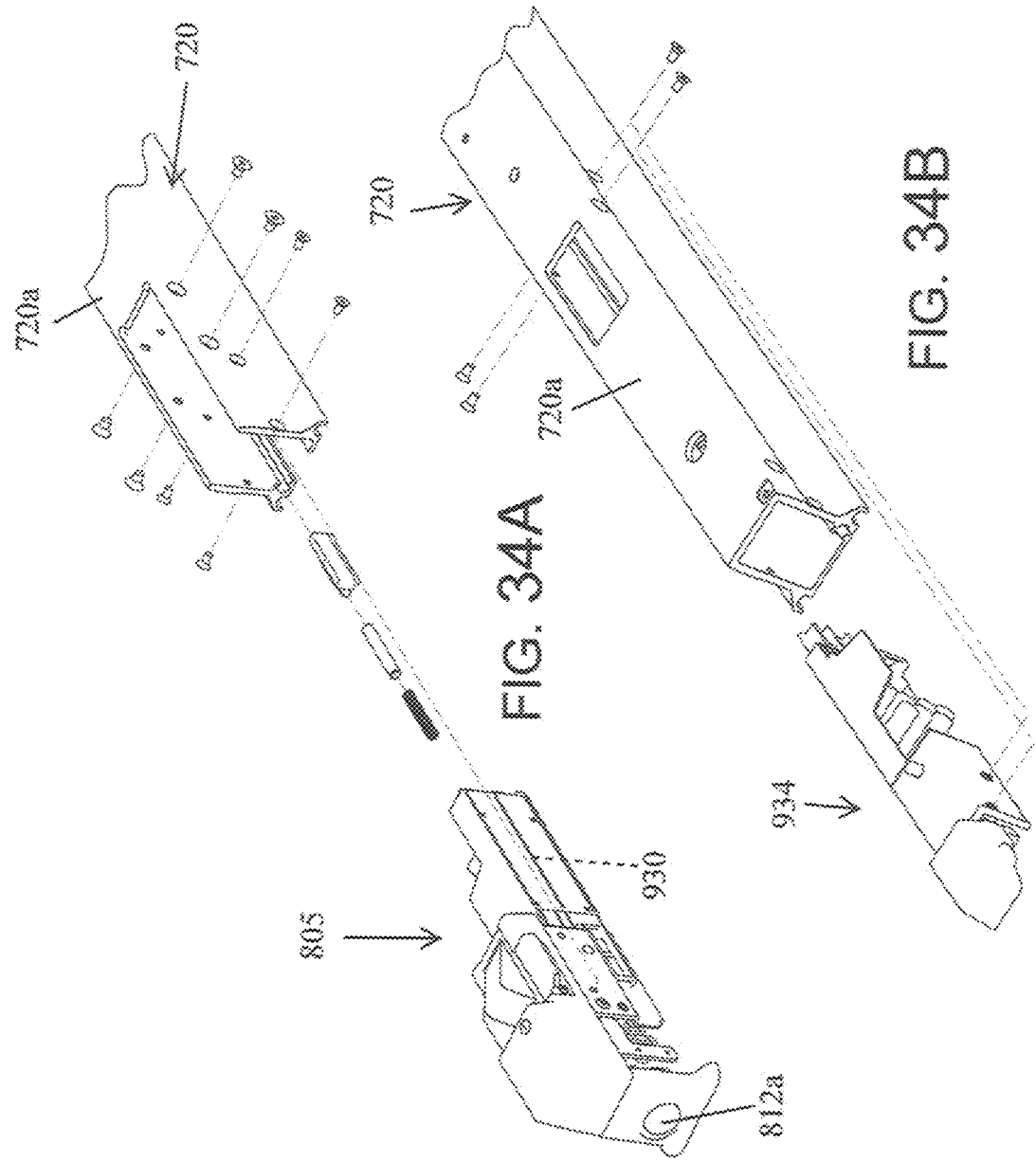

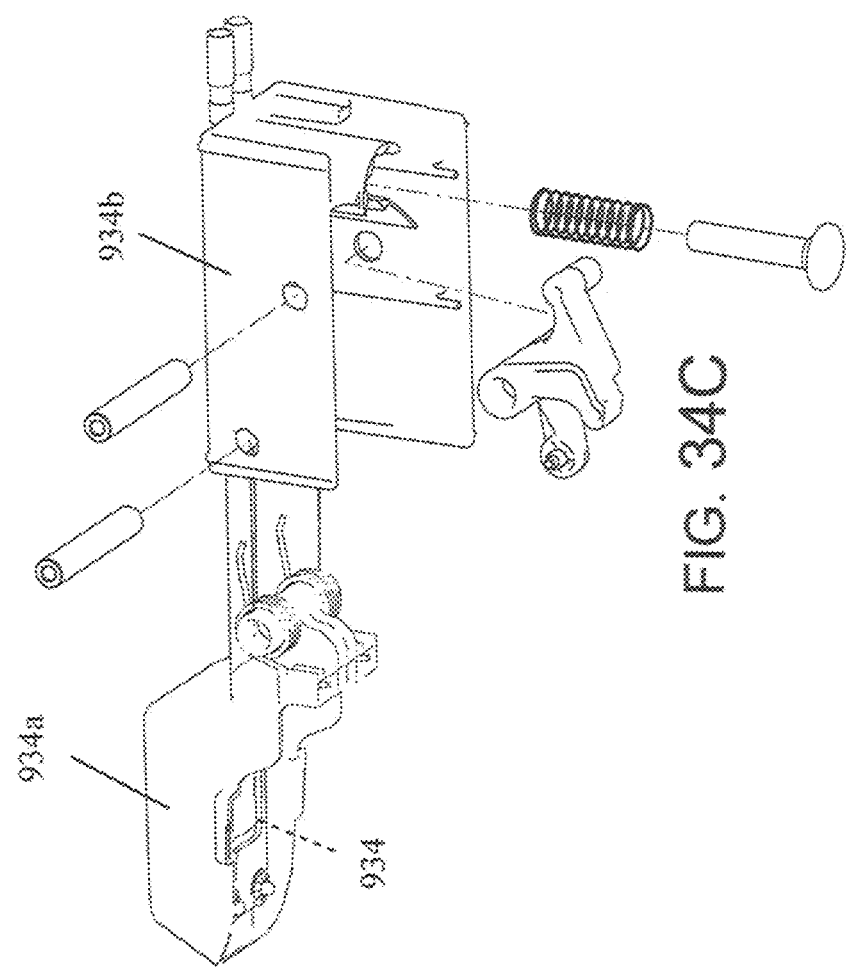

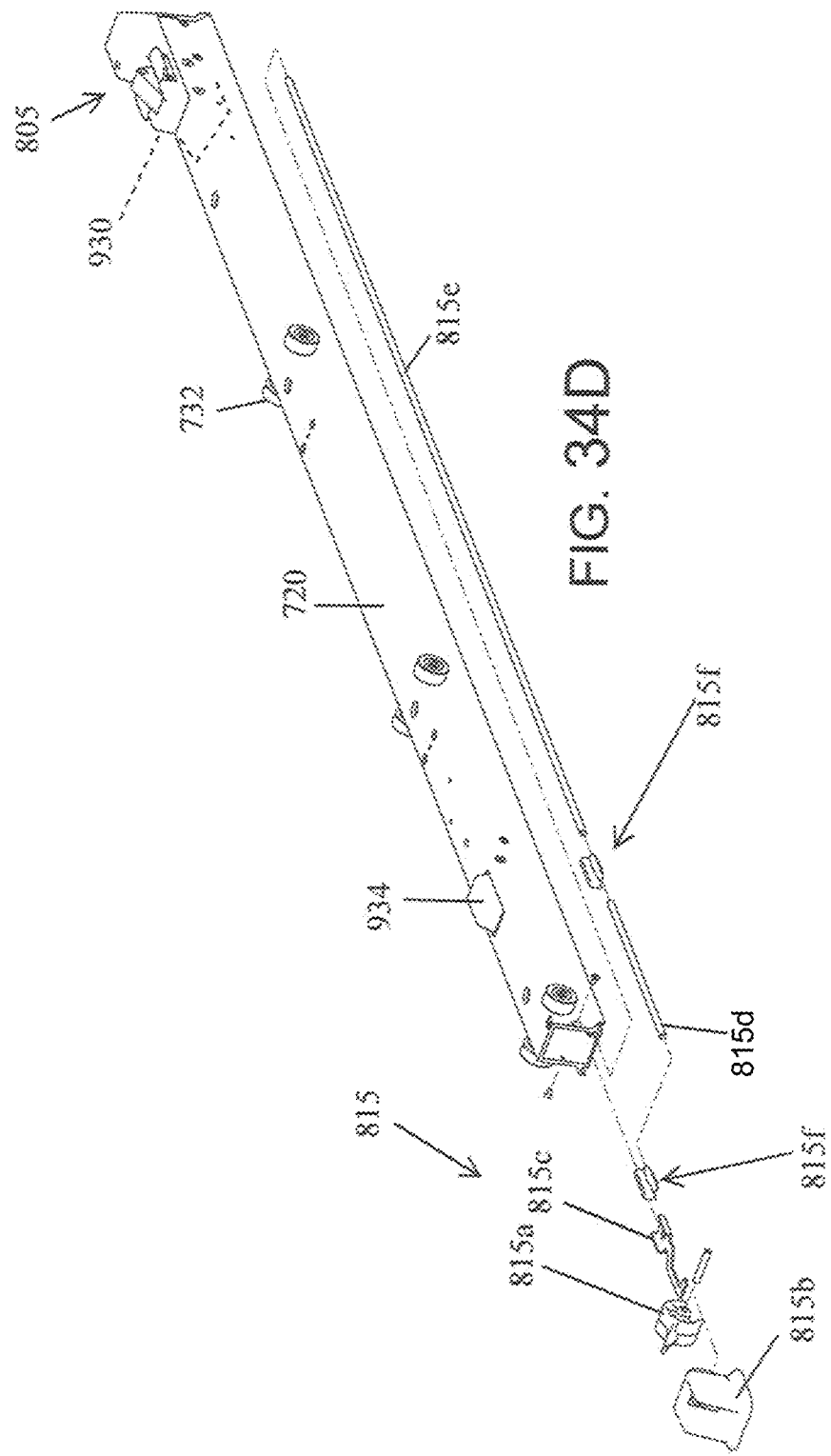

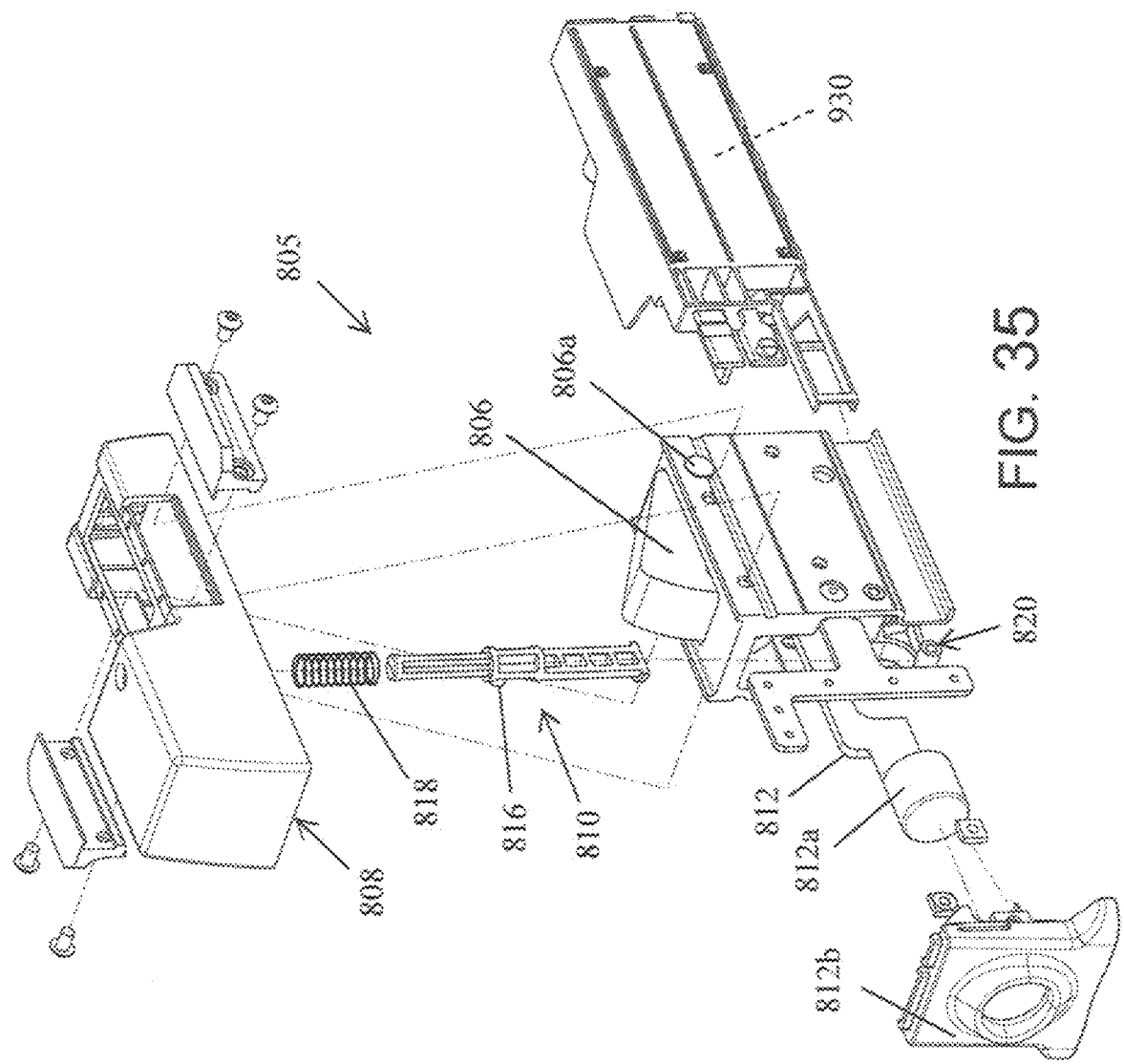

PATIENT SUPPORT WITH ENERGY TRANSFER

CROSS-REFERENCE TO RELATED APPLICATIONS

This application claims priority as a continuation application to U.S. patent application Ser. No. 14/517,973, filed Oct. 20, 2014, now U.S. Pat. No. 9,289,336, and entitled PATIENT SUPPORT WITH ENERGY TRANSFER, by Applicants Clifford Edwin Lambarth, et al., which is a continuation application of U.S. patent application Ser. No. 13/296,656, filed Nov. 15, 2011, now U.S. Pat. No. 8,864,205, and entitled PATIENT SUPPORT WITH WIRELESS DATA AND/OR ENERGY TRANSFER, by Applicants Guy Lemire, et al., which is a continuation-in-part application to U.S. patent application Ser. No. 11/769,959, filed Jun. 28, 2007, now U.S. Pat. No. 8,056,163, and entitled PATIENT SUPPORT, filed by inventors Martin Stryker, Guy Lemire, and Martin Castonguay, which in turn claims priority to U.S. provisional application Ser. Nos. 60/817,528, filed Jun. 28, 2006, and 60/830,397, filed Jul. 11, 2006. U.S. patent application Ser. No. 13/296,656 also claims priority as a continuation-in-part application to U.S. patent application Ser. No. 12/886,987, filed Sep. 21, 2010 and entitled AMBULANCE COT AND LOADING AND UNLOADING SYSTEM, by applicants Clifford Lambarth et al., which claims priority to U.S. provisional applications 61/248,374, filed Oct. 2, 2009, and 61/248,654, filed Oct. 5, 2009, and which claims priority to U.S. patent application Ser. No. 12/145,037, filed Jun. 24, 2008, now U.S. Pat. No. 7,887,113, entitled POWERED PATIENT SUPPORT AND FASTENING SYSTEM WITH INDUCTIVE BASED POWER SYSTEM, which in turn claims priority to U.S. provisional application Ser. No. 60/949,005, filed Jul. 11, 2007. The disclosures of all of the aforementioned patents and patent applications are hereby incorporated herein in their entirety by reference.

BACKGROUND OF THE INVENTION

The present invention relates to patient support apparatuses—such as cots, stretchers, beds, surgical tables, wheelchairs, chairs, and the like—and more particularly to wireless methods and structures for transferring data and/or power to or from such devices, or components of such devices.

Patient support apparatuses are commonly used in healthcare environments for supporting patients. Such support apparatuses often include electrical components, such as, but not limited to, motors, actuators, lights, control panels, sensors, and still other devices. Such devices may receive their electrical power from one or more batteries provided on the patient support apparatus, or from a wired connection to a conventional electrical wall outlet.

SUMMARY OF THE INVENTION

The present invention provides improved methods and structures for delivering electrical power to a patient support apparatus, and/or delivering electrical power to a component of the patient support apparatus. In other embodiments, the present invention also provides improved methods and structures for communicating electronic signals between components of the patient support apparatus. In various of the embodiments, the present invention reduces the weight and bulk of various components of the patient support apparatus, improves the ease in which the support apparatus may be cleaned, and helps to reduce the work involved in connecting the support apparatus, or a component of the support apparatus, to a source of power.

According to one embodiment, a patient support is provided that includes a base, a frame, an elevation adjustment mechanism, a deck, a plurality of electronic control circuits, a wired communication network, and a wireless link. The elevation adjustment mechanism raises and lowers the frame with respect to the base. The deck is supported on the frame and includes a plurality of sections adapted to support a patient thereon. The plurality of electronic control circuits are each adapted to control at least one specific function of the patient support apparatus, and each of the electronic control circuits located in different locations of the patient support apparatus. The wired communication network transports messages between a first subset of the electronic control circuits. The wireless link transports messages between a second subset of the electronic control circuits, wherein the second subset of electronic control circuits includes at least one electronic control circuit that is not in common with the first subset of electronic control circuits.

According to another aspect, a patient support apparatus is provided that includes a base, a frame, an elevation adjustment mechanism, a deck, an electrical power supply, an inductive coil, and a controller. The elevation adjustment mechanism raises and lowers the frame with respect to the base. The deck is supported on the frame and includes a plurality of sections adapted to support a patient thereon. The electrical power supply supplies electrical power to at least one motor positioned on the patient support apparatus. The inductive coil is positioned on the patient support apparatus and is adapted to receive electrical power from the electrical power supply. The controller controls electrical current that flows through the inductive coil so as to inductively transfer electrical power from the inductive coil to a mattress positioned on the deck.

According to yet another aspect, a patient support apparatus is provided that includes a base, a patient support surface, a rechargeable battery, an on-board inductive coil, and a controller. The base includes a plurality of wheels. The patient support surface provides a surface on which a patient may be supported. The rechargeable battery provides electrical power to at least one electronic device positioned on the patient support apparatus. The on-board inductive coil receives electrical power from an off-board inductive coil when the on-board and off-board inductive coils are positioned within inductive proximity to each other. The controller controls the receipt of electrical power via the on-board inductive coil and supplies the electrical power to the battery for recharging the rechargeable battery.

According to other aspects, the first subset of electronic control circuits may include a first electronic control circuit adapted to control the raising and lowering of the frame with respect to the base, along with a second electronic control circuit adapted to control a user interface on the patient support apparatus. The second subset of electronic control circuits may include a third electronic control circuit adapted to control the inflation of a mattress positioned on the deck.

The wired communication network may be a controller area network (CAN), a LONWorks network, a LIN network, an RS-232 network, a Firewire network, a DeviceNet network, or any other type of network or fieldbus that provides a communication system for communication between electronic control circuits. Regardless of the specific type of network, the wireless link may be between a node on the network and an electronic control circuit adapted to control the inflation of a mattress positioned on the deck, wherein the electronic control circuit that is adapted to control the inflation of a mattress positioned on the deck is an electronic control circuit that is not part of the network.

A battery may be positioned inside of the mattress to supply electrical power to a blower positioned inside of the mattress.

First and second housings for the first and second inductive coils, respectively, may also be provided, and the housings may be configured to selectively engage together in a manner that orients the first and second inductive coils in a desired relative orientation to each other for inductive energy transfer therebetween. The first housing may be mounted to a foot section of the deck.

An indicator may be provided on the patient support apparatus that provides a human-perceptible signal to a caregiver when the first and second housings are engaged. The indicator may include a light and/or the indicator may emit an aural signal. The light may be a separate stand-alone light, or it may be an icon, graphic, or other portion of a display screen.

The patient support apparatus may further include an electronic control circuit that controls the first inductive coil and that includes circuitry adapted to detect when the first and second housings are engaged with each other. One of the first and second housings may include an elongated projection having a sloped wall, and the other one of the first and second housings may include an elongated recess adapted to receive the elongated projection.

The patient support apparatus may further include an inductive coil positioned on an underside of the patient support apparatus that is adapted to inductively couple with a stationary inductive coil positioned on or in a floor.

A controller may automatically determine when a mattress inductive coil is positioned on the support deck and in alignment with the inductive coil. The inductive coil may be positioned at a foot end of the patient support apparatus. A wireless transceiver may be coupled to the patient support apparatus that wirelessly communicates with a mattress controller contained within the mattress. A control panel may be positioned on the patient support apparatus and include at least one control for controlling a feature of the mattress. The control panel communicates with the wireless transceiver such that a signal relating to the control of the feature may be transmitted from the wireless transceiver to the mattress controller.

A controller may be included that initiates a message to an off-board controller of the off-board inductive coil when the rechargeable battery is charged. The message may cause the off-board controller to terminate the inductive transfer of electrical energy from the off-board inductive coil to the on-board inductive coil.

A brake may be provided on the patient support apparatus and the controller may only allow electrical power to inductively recharge the rechargeable battery when the brake is activated. The patient support apparatus may be one of a chair, a bed, a stretcher, a cot, or a surgical table. The patient support apparatus may further include an electrically powered wheel adapted to assist caregivers in moving the patient support apparatus from one location to another.

An actuator may be included that moves the on-board coil between an extended and a retracted position. The actuator may be configured to automatically move the on-board coil to the extended position when a brake on the patient support apparatus is activated.

According to still other aspects, the patient support apparatus may include one or more on-board coils that inductively receive electrical energy from one or more off-board electrical coils that occupy a greater area than the on-board coil or coils. The greater area of the off-board coil or coils may allow efficient inductive coupling to occur between the off-board and on-board coils in a variety of different positions and a variety of different orientations, thereby avoiding the need for a specific position and/or orientation to be achieved between the two coils before efficient inductive coupling can occur.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 7 is cross-sectional view of the inductive housing receptacle and inductive housing projection of FIGS. 5 and 6 shown separated from each other;

FIG. 8 is a cross-sectional view of the inductive housing receptacle and inductive housing projection of FIGS. 5 and 6 shown engaging each other and taken along the same cross-sectional plane as that of FIG. 11;

FIG. 9 is a cross-sectional view of the inductive housing receptacle and inductive housing projection of FIGS. 5 and 6 shown separated from each other and taken along a vertical plane that is perpendicular to the cross-sectional plane of FIGS. 7 and 8;

FIG. 10 is a cross-sectional view of the inductive housing receptacle and inductive housing projection of FIGS. 5 and 6 shown engaging each other and taken along the same cross-sectional plane as that of FIG. 9;

FIG. 13 is a diagram showing the arrangement and relationship between FIGS. 13A, 13B, and 13C, which together illustrate a detailed diagram of one embodiment of the electrical components that may be inside one of the nodes of the electrical communication network, such as, but not limited to, node #4 of FIG. 12;

FIG. 32 is a plan view of the loading and unloading apparatus of FIG. 31 shown with a trolley and a transfer track moved to their fully retracted stowed positions;

FIG. 33 is a similar view to FIG. 32 showing the trolley extended along the transfer track;

FIG. 34A is an exploded perspective view of the mounting arrangement of the trolley latch assembly mounted to the base of the loading and unloading system of FIG. 31;

FIG. 34B is an exploded perspective view of the mounting of the primary coil at the cot anchor location along the base of the inductive recharging system of the embodiment of FIG. 31;

FIG. 34C is an exploded perspective view of the primary coil mounting bracket;

FIG. 34D is a perspective view of the base illustrating the mounting details of a release trigger assembly;

FIG. 35 is an exploded perspective view of the trolley anchor assembly of the loading and unloading system of FIG. 31;

DETAILED DESCRIPTION OF THE EMBODIMENTS

Figure 1:
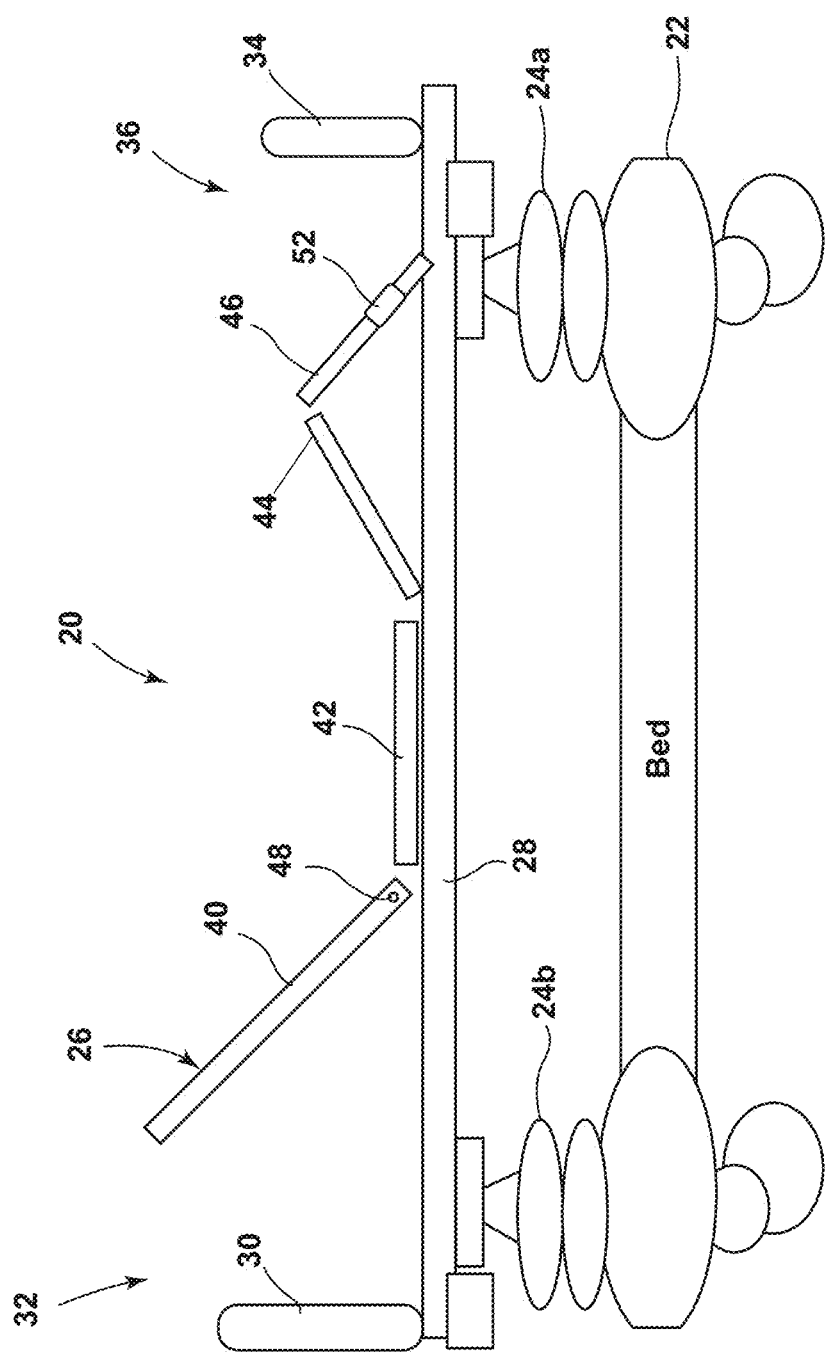
FIG. 1 is a diagram of an illustrative patient support apparatus that may incorporate one or more aspects of the present invention.

The present invention will now be described with reference to the accompanying drawings wherein the reference numerals appearing in the following written description correspond to like-numbered elements in the several drawings. A diagram of a patient support apparatus 20 that may incorporate one or more aspects of the present invention is illustrated in FIG. 1. In section A below, a more detailed description of the various components that may be present on patient support apparatus 20 when it is used within a medical care setting is provided. In sections B and C, a more detailed description of the various components that may be present on a patient support apparatus intended primarily for use in a vehicle, such as an ambulance, helicopter, or the like, is provided. It will, however, be understood by those skilled in the art that any of the features of the patient support apparatuses described in sections A, B, or C can be incorporated into the patient support apparatuses described in any of the other sections herein.

A. Patient Support Apparatuses

As shown in FIG. 1, patient support apparatus 20 includes a base 22, a pair of elevation assemblies 24a-b, a patient support deck 26, a frame 28, a headboard 30 positioned at a head end 32 of patient support apparatus 20, and a footboard 34 positioned at a foot end 36 of patient support apparatus 20. Base 22 includes a plurality of wheels 35 that may be selectively braked and unbraked to thereby facilitate movement of patient support apparatus 20. Patient support apparatus 20 may be a bed, a stretcher, a cot, a surgical table, a gurney, a chair, or any other type of support that is used for supporting a patient in a healthcare setting.

Deck 26 of patient support apparatus 20 is adapted to support a mattress 38 (FIG. 2) on which a patient may lie. Deck 26 is, in the illustrated embodiment, divided into a plurality of sections, including a head section 40, a seat section 42, a thigh section 44, and a foot section 46. It will be understood by those skilled in the art that the number of sections into which deck 26 may be divided may be fewer or greater than the four sections shown in FIG. 1. In the embodiment of FIG. 1, head section 40 is pivotable about a horizontal pivot axis 48 that extends vertically out of the plane of FIG. 1. One or more actuators, not shown, may be included that enable head section 40 to pivot about axis 48. Additional actuators may also be provided for allowing other sections of deck 26 to pivot and/or move.

Figure 2:
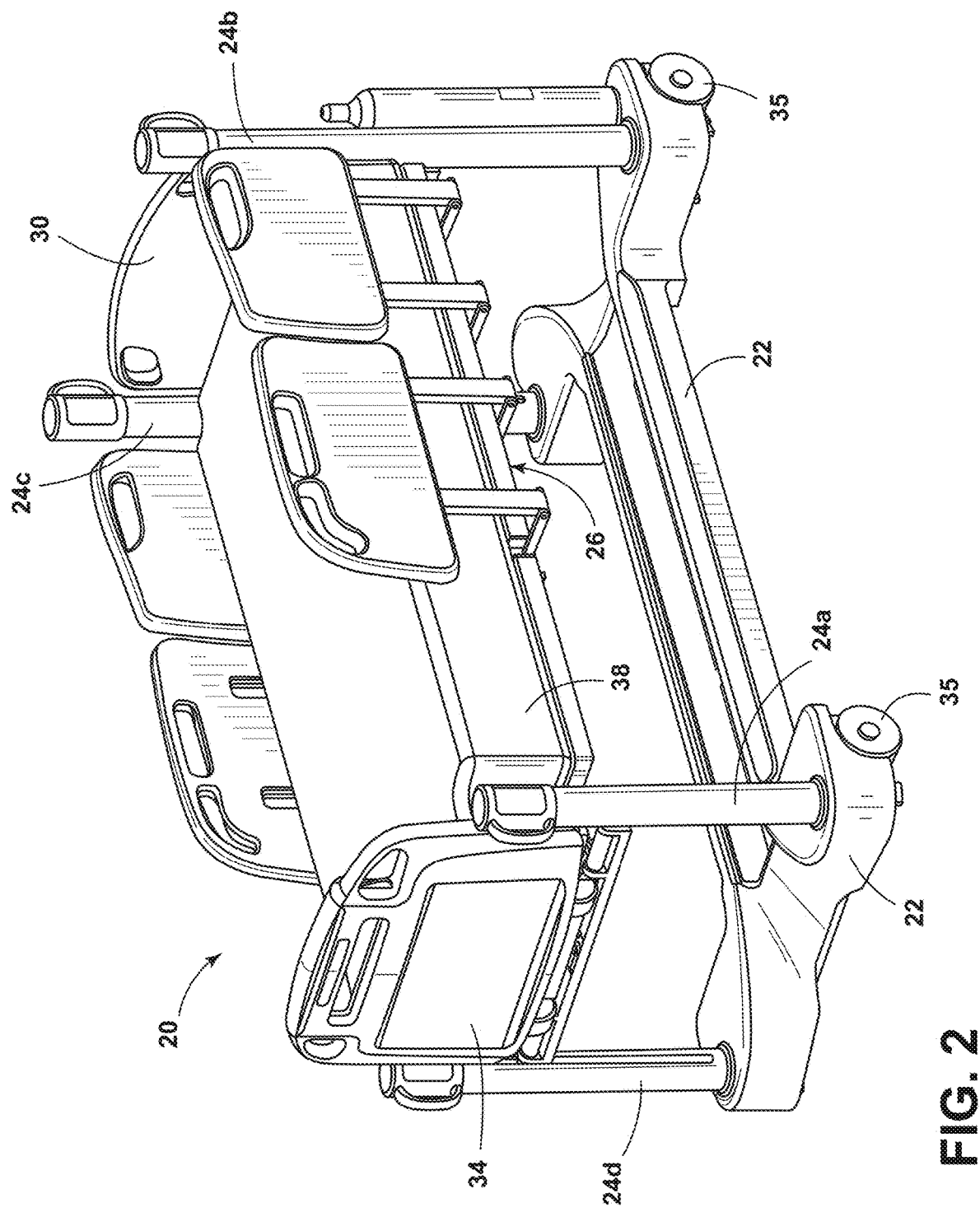
FIG. 2. is perspective view of another patient support apparatus that may incorporate one or more aspects of the present invention.
Figure 3:
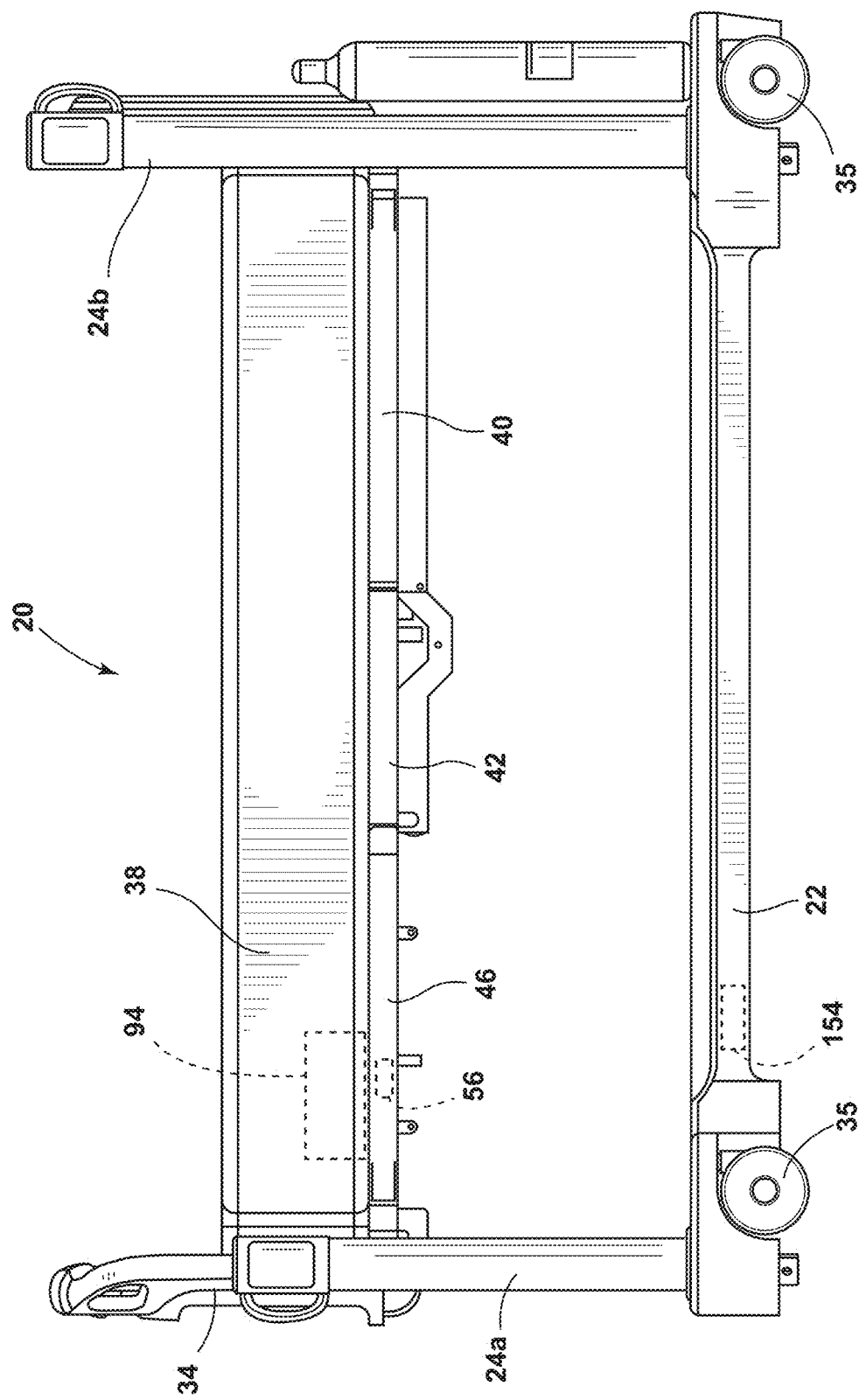
FIG. 3 is a side, elevational view of the patient support apparatus of FIG. 2.

FIGS. 2-3 illustrates another embodiment of a patient support apparatus 20 that may incorporate one or more aspects of the present invention. Patient support apparatus 20 also includes a base 22, a plurality of elevation assemblies 24a-d, a support deck 26, a headboard 30, a footboard 34, and a mattress 38. Unlike the embodiment shown in FIG. 1, the embodiment of FIG. 2 does not include a frame 28 or a thigh section 44. Each section of deck 26 in the embodiment of FIG. 2 may include a plate (not shown) or other flat structure positioned on top of it that helps support a mattress or other type of sleep surface on which a patient lies. Head section 40 is configured to support the head and torso region of a patient lying on support deck 26. Seat section 42 is configured to support the buttocks region of a patient lying on support deck 26. And foot section 46 is configured to support the foot and lower leg region (e.g. the region of the leg below the knee) of a patient lying on support deck 26. It will be understood, however, that the precise line of demarcation between the various deck sections can be varied within the present invention to align with different portions of the patient's body.

Figure 4A:
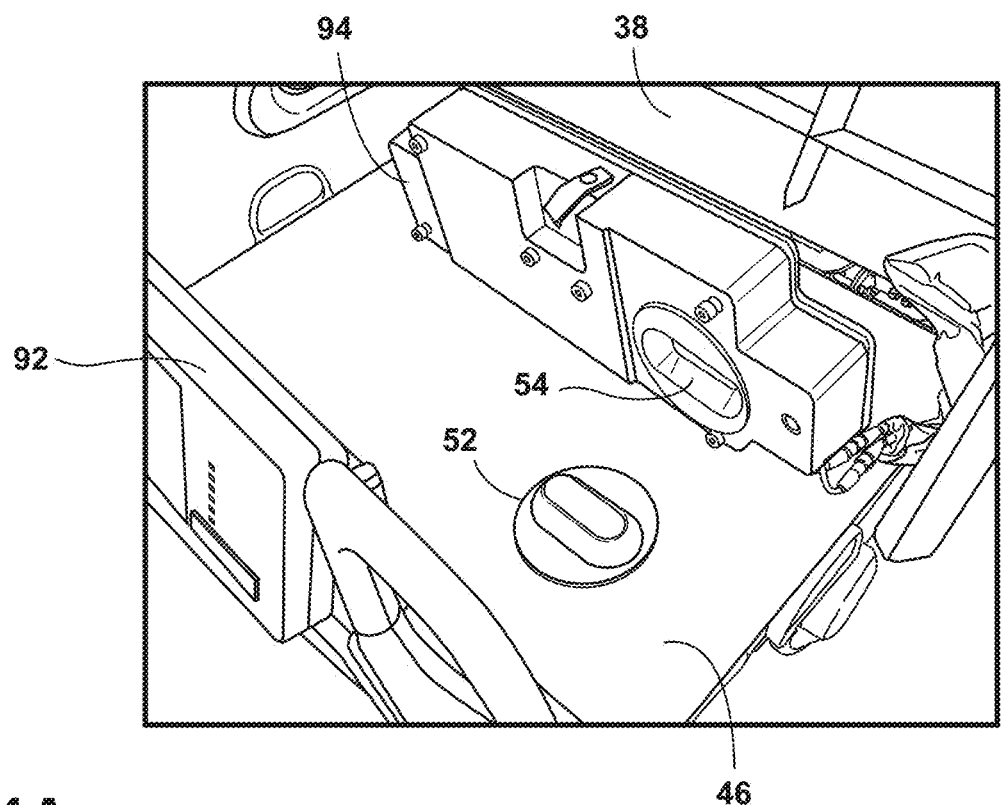
FIG. 4A is a perspective view of rear portion of a patient support apparatus showing an inductive power supply decoupled from a control box of a mattress.
Figure 4B:
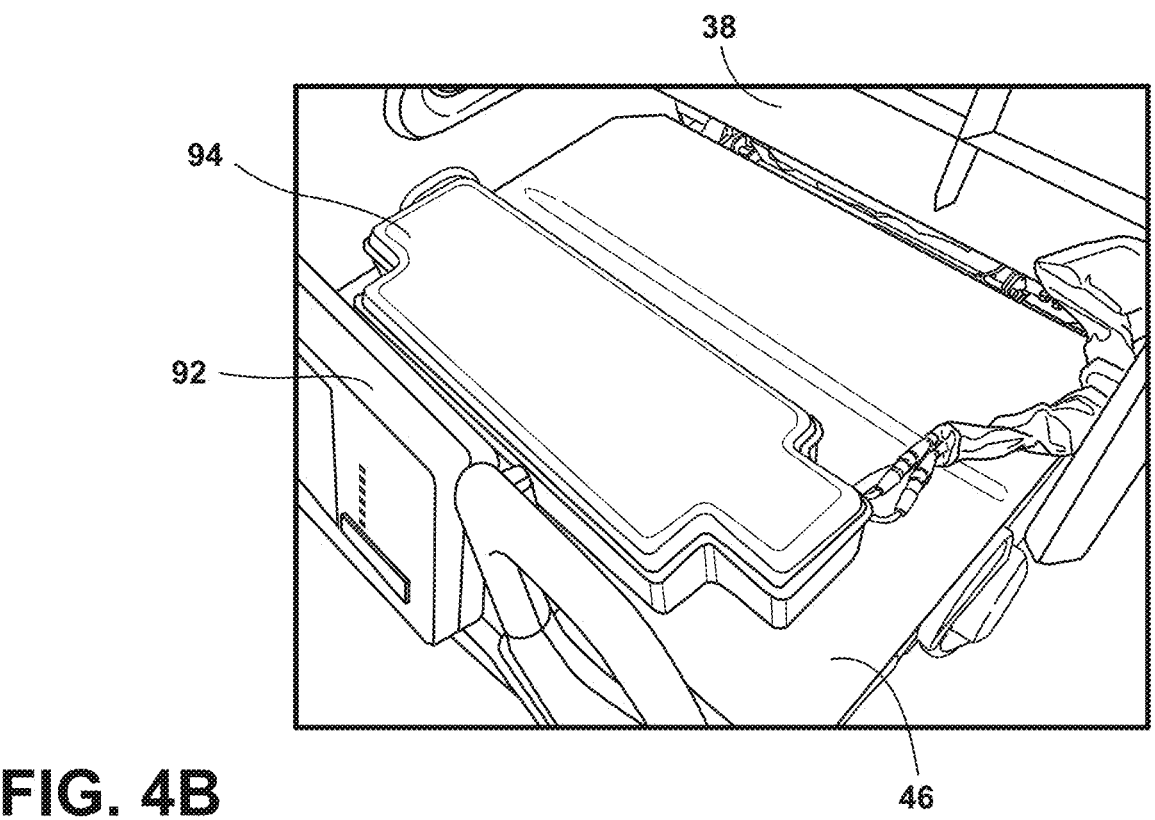
FIG. 4B is a perspective view of the rear portion of the patient support apparatus of FIG. 4A showing the control box of the mattress coupled to the inductive power supply of the patient support apparatus.

For any of the patient support apparatuses described herein, one or more control panels (e.g. control panel 92 of FIGS. 4A and 4B) may be included on patient support apparatus 20 that include buttons, knobs, switches, touch screens, or other types of controls that enable a patient and/or a caregiver to control the pivoting of head section 40 about axis 48. Such control panels may also include a number or other controls for controlling various other aspects of patient support apparatus 20. Such additional controls may include controls for raising and lowering the height of frame 28 (or deck 26 in the embodiment of FIGS. 2-3) relative to base 22, pivoting and/or moving any of the other sections of deck 26 (e.g. seat section 42, thigh section 44, or foot section 46), arming a bed exit alert, weighing a patient while positioned on support apparatus 20, communicating with a nurse call system, and for performing still other functions.

In some embodiments, mattress 38 may be a mattress that includes one or more internal fluid bladders that may be selectively inflated to different pressures for providing maximum comfort to a patient positioned thereon, as well as for performing various therapies on the patient. Such mattresses typically include a blower or pump that is controlled by suitable electronics within the mattress. The blower or pump is controlled to change or maintain the fluid pressure within the various bladders in whatever manner is desirable. In many instances, one or more manifolds are included within mattress 38 so that different sections of the mattress can be controlled individually.

The actuators and controls on the patient support apparatus 20, as well as the controls and blower inside mattress 38, are typically powered by electricity. Patient support apparatus 20 includes a power cable (not shown) that plugs into a conventional electrical wall outlet for receiving electrical power therefrom. In some embodiments, support apparatus 20 may include one or more batteries that enable the support apparatus to maintain some, or all, of its electrical functions while its power cable is disconnected from the electrical wall outlet. Such uses of battery power are typical when support apparatus 20 is being moved from one location to another.

Figure 13A:
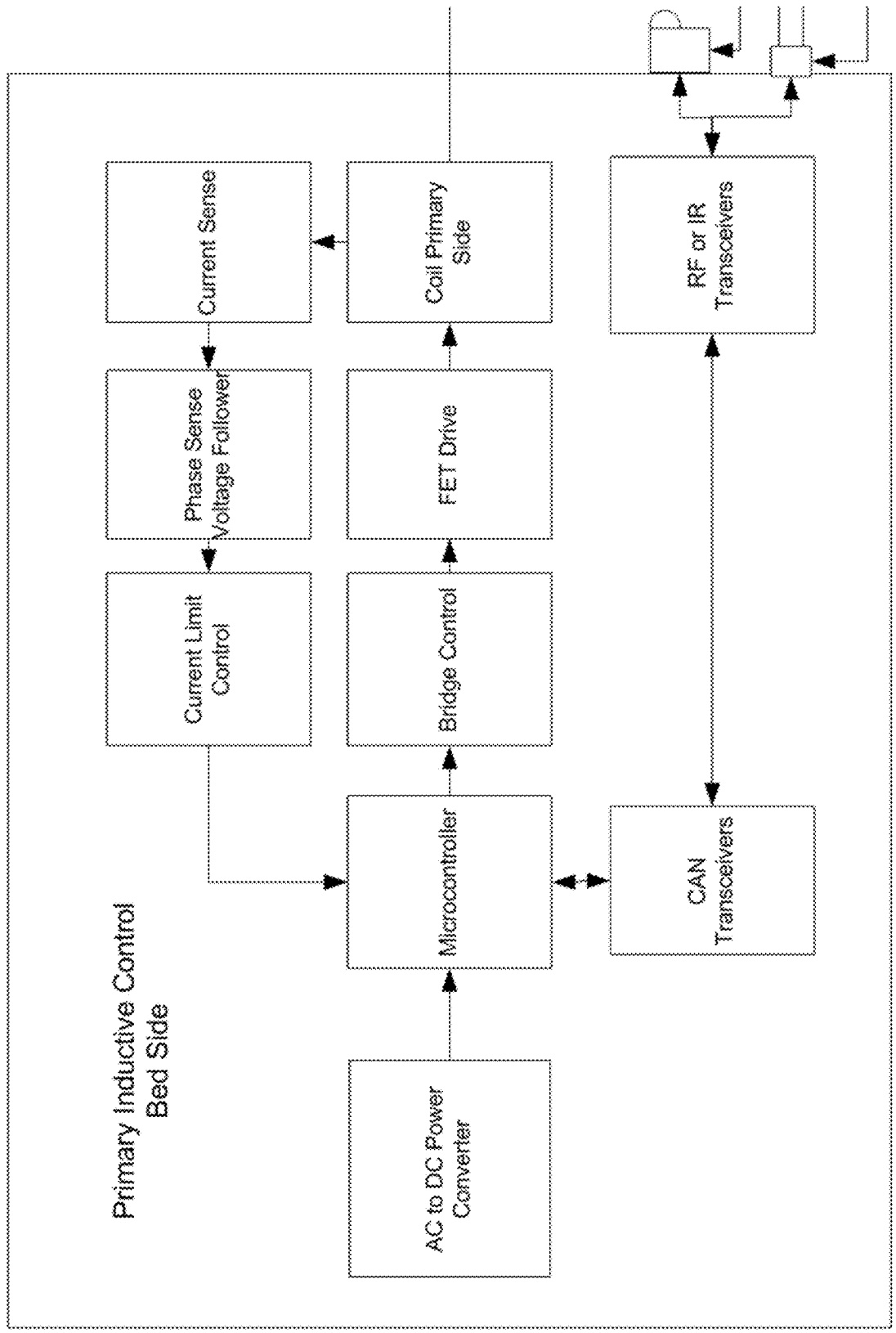
FIG. 13A is a first portion of the detailed diagram referenced by FIG. 13.
Figure 13B:
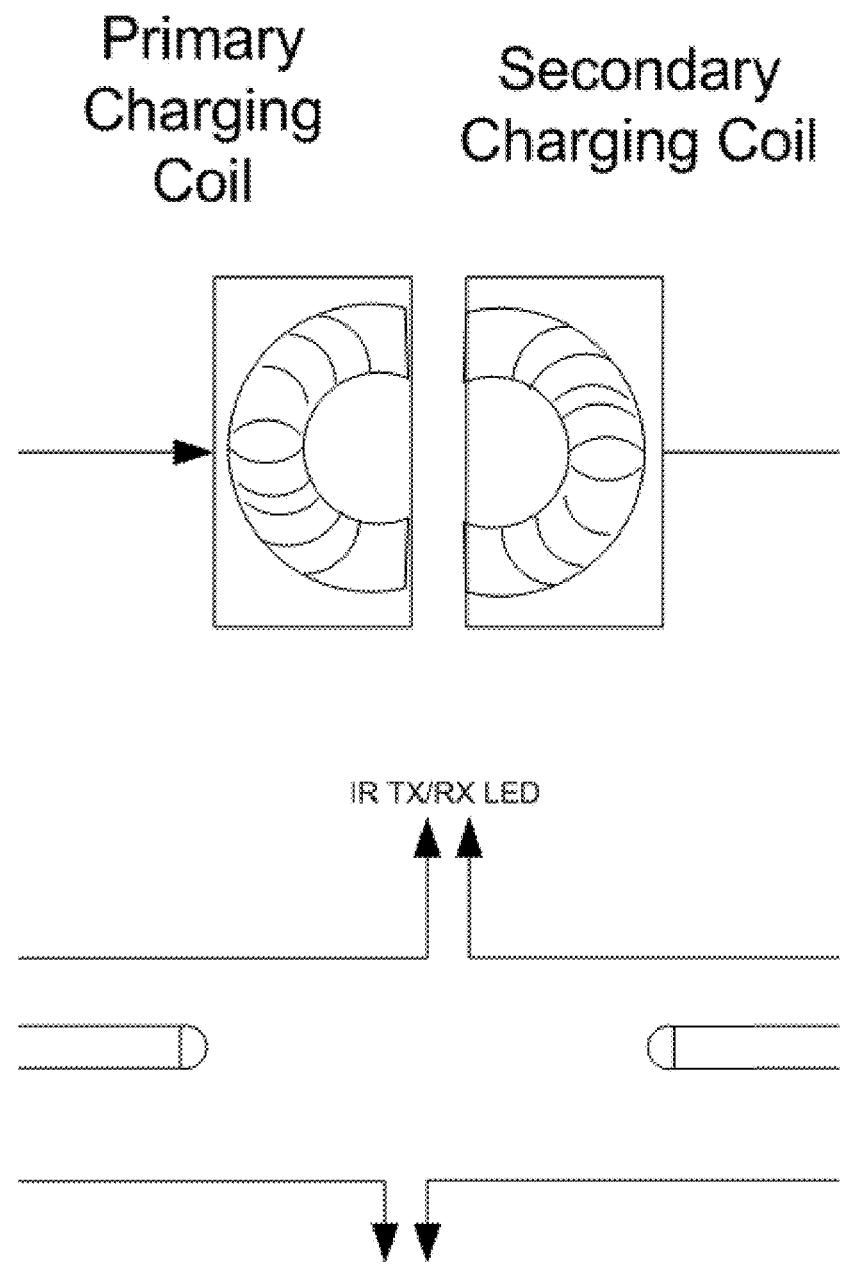
FIG. 13B is a second portion of the detailed diagram referenced by FIG. 13.
Figure 13C:
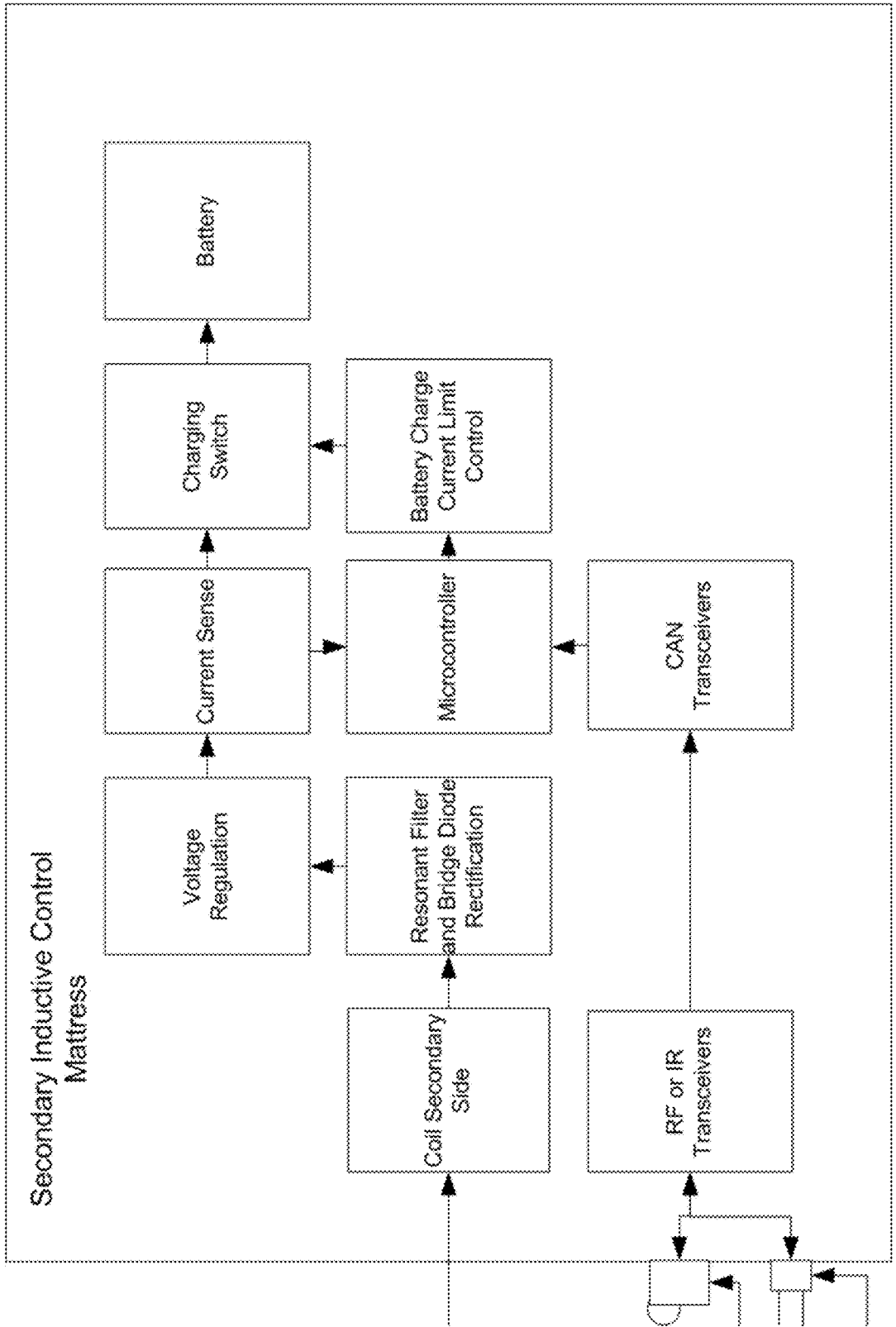
FIG. 13C is a third portion of the detailed diagram referenced by FIG. 13.
Figure 14:
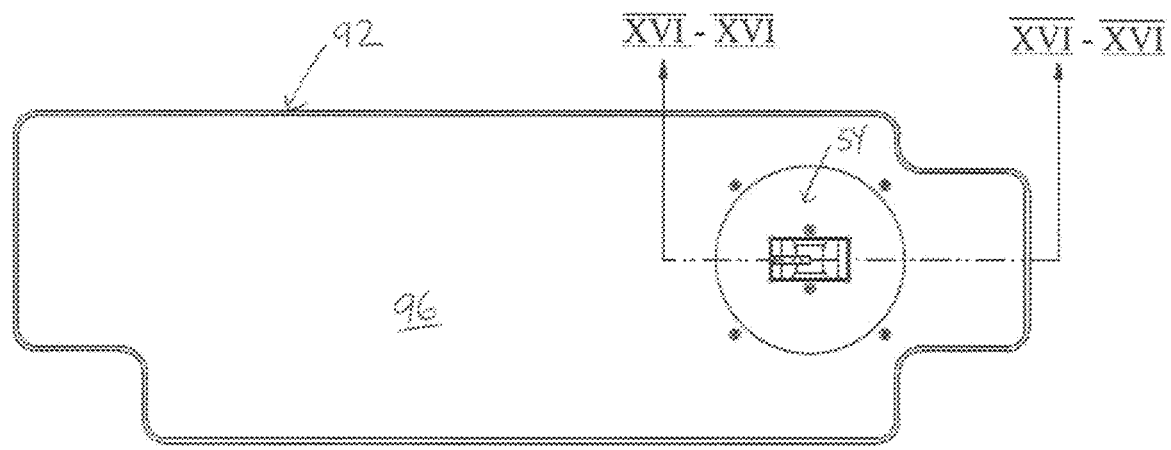
FIG. 14 is a plan view of an electrical control box that may be incorporated into a mattress supported on the patient support apparatus and that shows the inductive housing receptacle of FIG. 5 affixed thereto.

In order to provide electrical power to the control circuitry within mattress 38, patient support apparatus 20 may include an inductive coupler 50 (FIGS. 7 and 8). Inductive coupler 50 includes a patient support housing 52 and a mattress housing 54. Patient support housing 52 is integrated into, or attached to, patient support apparatus 20. Mattress housing 54 is integrated into, or attached to, mattress 38. Patient support housing 52 is configured to house one or more patient support coils 56 (FIGS. 13A-C). Mattress housing 54 is configured to house one or more mattress coils 58. Each housing 52 and 54 is positioned on its respective component (support apparatus 20 and mattress 38) at a location such that they will be aligned with each other when mattress 38 rests on patient support deck 26.

Figure 5:
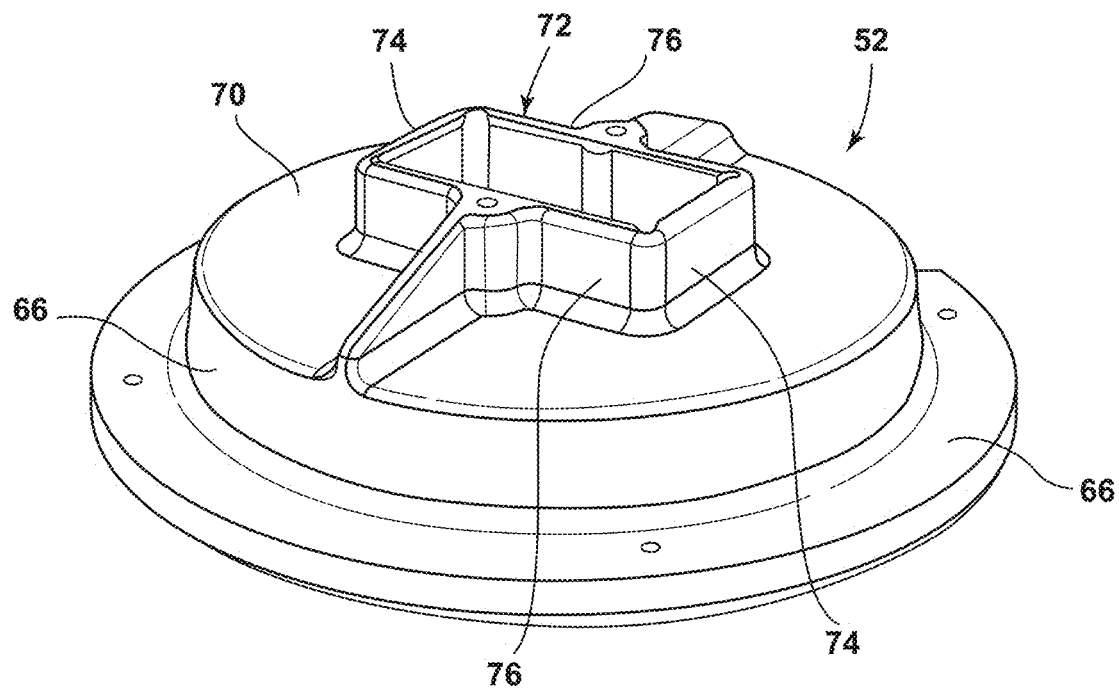
FIG. 5 is perspective view of an illustrative inductive housing receptacle.
Figure 6:
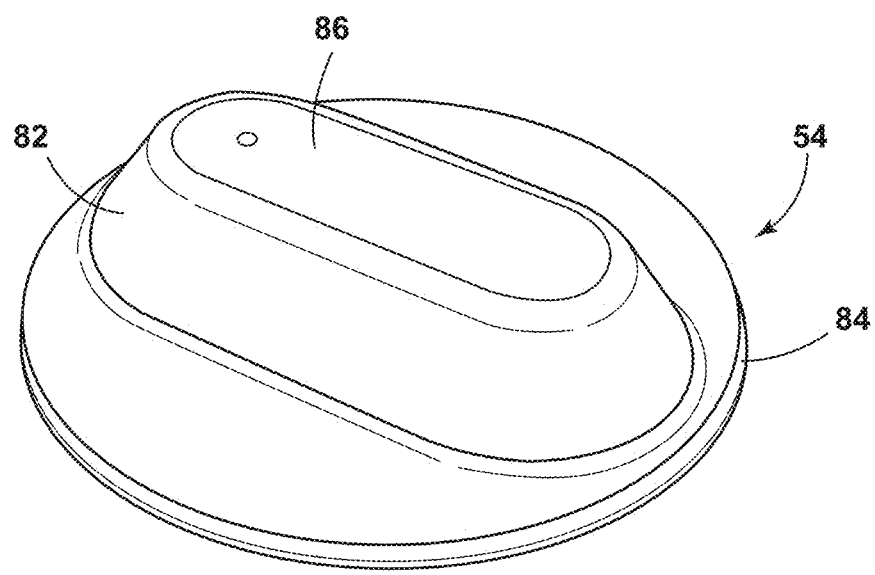
FIG. 6 is a perspective view of an illustrative inductive housing projection that is adapted to selectively engage with the inductive housing receptacle of FIG. 5.

In the embodiment shown in FIGS. 4 and 5, inductive coupler 50 is positioned on foot section 42 of deck 26. It will be understood by those skilled in the art that inductive coupler 50 may be positioned at other locations. Such locations may include being built into either of footboard 34 or headboard 30, or in other locations. To the extent the control circuitry and/or blower of the mattress 38 is positioned near the foot end of mattress 38, it may be beneficial to position inductive coupler 50 near the foot end of mattress 38 so that it is positioned closely to the electrical components inside of mattress 38.

Inductive coupler 50 is adapted to inductively supply electrical power from patient support apparatus 20 to mattress 38. The inductive transfer of electrical energy from patient support 20 to mattress 38 may be carried out by a controller 60 (FIGS. 13A-13O) positioned on patient support apparatus 20 that runs a changing electrical current through patient support coil 56. This creates a changing magnetic field around coil 56 that, when mattress coil 58 is closely positioned nearby, induces a changing electric field within coil 58, thereby creating electrical current within mattress coil 58 and the electrical circuit it is coupled to. A mattress controller 62 harnesses the electrical energy inductively generated within mattress coil 58 for providing electrical power to the electrical components of mattress 38. Such electrical components, in addition to the blower and/or pump within mattress 38, may include valve actuators, sensors, control circuits (including those within controller 62), and a battery 64.

FIGS. 5-10 illustrate in greater detail the physical construction of one embodiment of inductive coupler 50. It will be understood by those skilled in the art that the physical configuration of inductive coupler 50 may be changed from that shown and described herein. As shown in FIGS. 5, 7-8, and 9-10, patient support housing 52 includes a base 66, a circular wall 68 that extends upwardly from base 66, a top wall 70, and a rectangular coil wall 72 that is positioned on top of top wall 70. Rectangular coil wall 72 includes a pair of end walls 74 positioned opposite each other, and a pair of side walls 76 positioned opposite each other. Mattress coil 58 fits within an interior region 78 defined within rectangular coil wall 72. As can further be seen in FIGS. 7-10, a sloped interior surface 80 is defined on the interior of housing 52 that extends from base 66 up to an underside of top wall 70. Sloped interior surface 80 is dimensioned and sloped to matingly receive a similarly sloped projection surface 82 of patient support housing 52.

FIGS. 6-10 illustrate in greater detail the physical construction a patient support housing 52 that is designed to matingly and selectively engage with mattress housing 54 of FIGS. 5 and 7-10. Patient support housing 52 includes a base 84 and a top surface 86 that are separated from each other by sloped projection surface 82. A coil space 88 is defined within patient support housing 52 and dimensioned such that patient support coil 56 may fit therein. As can be seen in FIG. 8, coil space 88 is positioned such that it vertically aligns with interior region 78 of mattress housing 54. Thus, mattress coil 58 and patient support coil 56 will be aligned with each other, and very closely positioned to each other, when housing 52 is inserted into housing 54.

As can also be seen in FIGS. 5-10, sloped interior surface 80 and sloped projection surface 82 are not radially symmetrical about vertical axis. Instead, surfaces 80 and 82 are elongated such that housings 52 can only fit together in one of two manners—the one shown in FIGS. 7-10, or one in which either of housings 52 or 54 (but not both) are rotated 180 degrees about a vertical axis. In practice, this 180 degree rotation will not occur because such a rotation would require the mattress 38 (to which housing 54 is coupled) to be rotated 180 degrees which, in turn, would cause the mattress 38 to be positioned primarily off of patient support apparatus 20. Thus, the relative shapes of housings 52 and 54 ensure that the coils contained therein (56 and 58) can only be oriented in one possible orientation with respect to each other, which is the desired orientation for the effective inductive transfer of energy to mattress 38.

The sloped nature and dimensions of surfaces 80 and 82 also help ensure that housings 52 and 54 align with each other when mattress 38 is positioned on support deck 26. If the alignment is slightly off, the sloped surfaces will act as cam surfaces that translate the downward gravitational force on the mattress 38 (or other downward force exerted onto mattress 38) into a horizontal force, urging the mattress to slide in the needed direction for alignment of housings 52 and 54. When properly aligned, projection surface 82 fits completely within the interior space defined by sloped interior surface 80 of mattress housing 54. This alignment causes top wall 86 of patient support housing 52 to touch, or nearly touch, the underside of top wall 70 of mattress housing 54.

The sloped projection surface 80 of patient support housing 52 and the sloped interior surface 82 of mattress housing 54 are generally smooth, non-porous surfaces that are free from crevices, grooves, indentations, or other sharp changes in topology. This facilitates the cleaning and/or sterilization of both mattress 38 and patient support apparatus 20.

As can also be seen in FIGS. 6-9, patient support housing 52 also includes an LED (light emitting diode) tube 90. Tube 90 provides a space for either positioning an LED, or an optically conductive material for transferring light from an LED positioned adjacent tube 90 to the exterior or housing 52. In either case, light emitted from the LED is visible to a caregiver when mattress housing 54 is lifted off of patient support housing 52 (e.g. FIG. 4A). The LED may be lit to provide an indication that controller 60 is operable and functioning properly. This LED light may be emitted at all times while controller 60 is functioning properly. In other embodiments, patient support apparatus 20 may be configured such that a caregiver has to manipulate a control on apparatus 20 (such as a button, or the like) in order to turn on the inductive coupling feature. In such embodiments, the LED light will only illuminate when the inductive coupling feature is turned on, assuming controller 60—and any other components necessary for the inductive transfer or electrical energy to mattress 38—are functioning properly. LED light therefore provides diagnostic information to a user. If, for example, electrical energy is not being inductively transferred to mattress 38, but the LED light is illuminated, this would suggest that the failure of inductive energy transfer is due to a component within mattress 38, not due to a component within patient support apparatus 20.

Controller 60 (FIGS. 13A-13C) may be configured, in at least one embodiment, to automatically detect when housings 52 and 54 are matingly engaged with each other. Such automatic detection may occur by driving the patient support coil 56 with a known current or voltage and then sensing the actual current or voltage that is generated within coil 56, including the phase relationship therebetween and any changes in such phase relationship. Changes in the current, voltage, and/or phase relationship will occur depending upon whether or not mattress coil 58 is positioned adjacent coil 56 or not. Controller 60 may sense these differences and provide an indication to the caregiver when the engagement of mattress housing 54 with patient support housing 52 is detected. Controller 60 may further be configured to provide a humanly-perceptible indication of this successful engagement. The indication may be aural, visual, or a combination of aural and visual indications.

In one embodiment, a control panel 92 (FIGS. 4A and 4B) positioned on footboard 34 may include a light that illuminates when housings 52 and 54 are successfully engaged with each other. Alternatively, control panel 92 may include a display screen that includes an icon or other graphics that indicate the successful engagement of housings 52 and 54. The control panel 92, in some embodiments, may be a menu driven control panel that includes a menu of graphics and/or screens that are specifically designed for controlling the operation of mattress 38. In some embodiments, a graphic indication may be provided that indicates the degree of electrical charge within battery 64 of mattress 38. Such a graphic may be displayed to indicate the progress of recharging battery 64 through inductive coupler 50.

In some embodiments, control panel 92 may be built into patient support apparatus 20 and include other menus and/or controls for controlling any of the other functions of patient support apparatus 20. In other embodiments, control panel 92 may be part of a pendant, or other device, that is not an integral part of patient support apparatus 20, but which may be selectively coupled and decoupled thereto. Control panel 92 may receive data from mattress controller 62 (or another controller on mattress 38 that is in communication with mattress controller 62) by way of a wireless communication channel that will be discussed in greater detail below.

FIGS. 14-17 illustrate one embodiment of a mattress control box 94 that is designed to house the blower or pump of mattress 38, as well as mattress controller 62, any associated electronics, a fluid manifold, and any other components used in controlling the inflation and deflation of one or more sections of mattress 38. Mattress control box 94 includes a base wall 94 to which mattress housing 54 is affixed. The size and shape of control box 94 may be varied from that shown and should be suitably dimensioned to house the desired components of mattress 38. Mattress control box 94 is also shaped to be received within a similarly shaped recess (not shown) within mattress 38. In some embodiments, the underside of base wall 94 will be exposed when mattress 38 is covered by a sheet, or other suitable covering. In other embodiments, mattress 38 may be entirely covered by a sheet, or other flexible covering, thereby also covering the underside of mattress control box 94. In this latter case, the sheet or flexible covering will interpose itself between top surface 86 of patient support housing 52 and the underside of top wall 70 of mattress housing 54, but this thin layer of material will not prevent the inductive transfer of electrical energy from patient support apparatus 20 to mattress 38.

Figure 15:
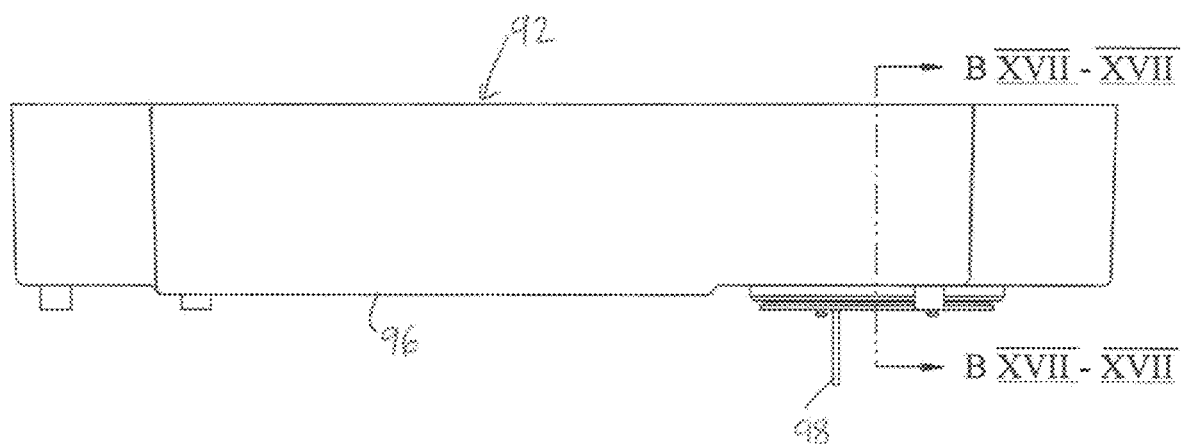
FIG. 15 is a side, elevational view of the electrical control box of FIG. 14.
Figure 16:
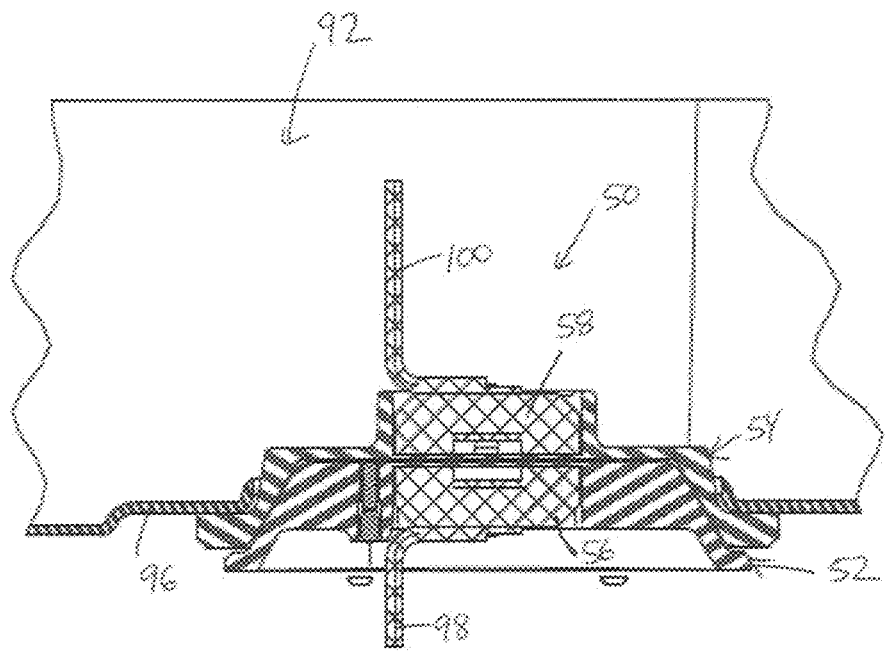
FIG. 16 is a partial, sectional view taken along the line XVI-XVI of FIG. 14.
Figure 17:
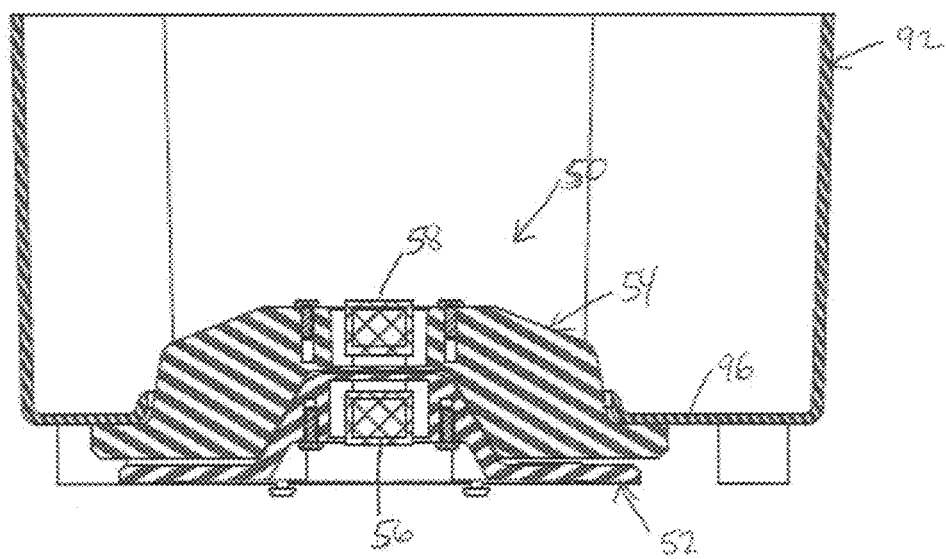
FIG. 17 is a partial, sectional view taken along the line XVII-XVII of FIG. 15.

As shown in FIGS. 15-16, a pair of wires 98 are electrically coupled to patient support coil 56. While not shown in these figures, wires 98 electrically couple patient support coil 56 to patient support controller 60. Similarly, a pair of wires 100 electrically couple mattress coil 58 to mattress controller 62.

Figure 11:
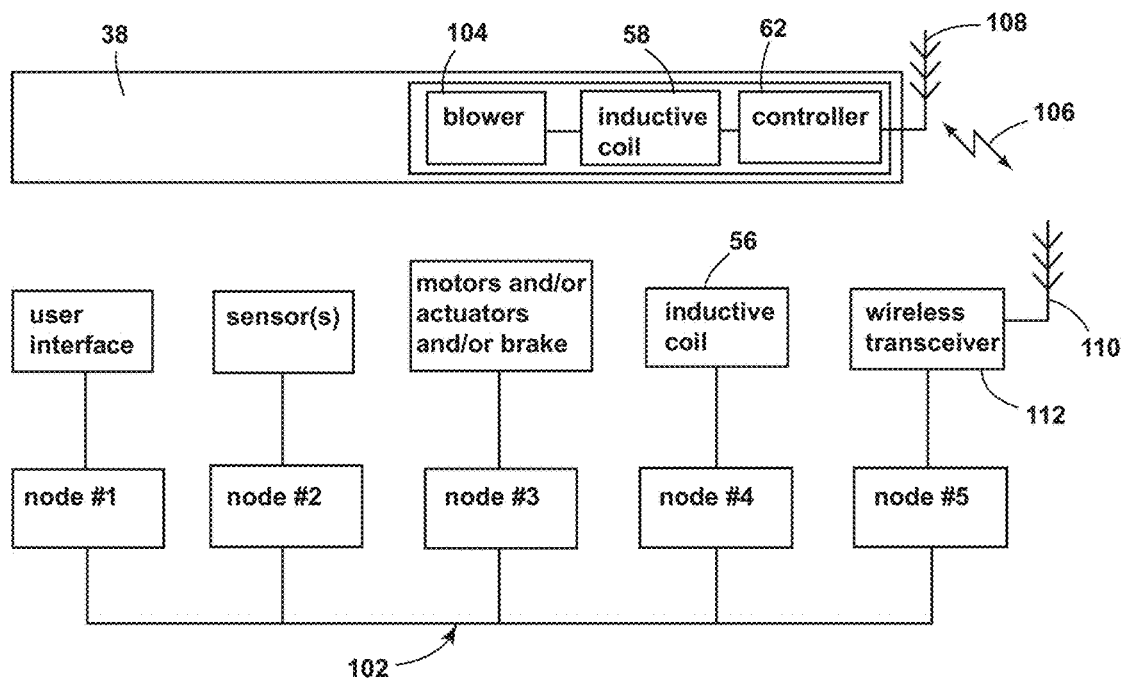
FIG. 11 is a block diagram of an electrical communications network that may be present on the patient support apparatuses of FIG. 1 or 2, or any of the other patient support apparatuses described herein.
Figure 12:
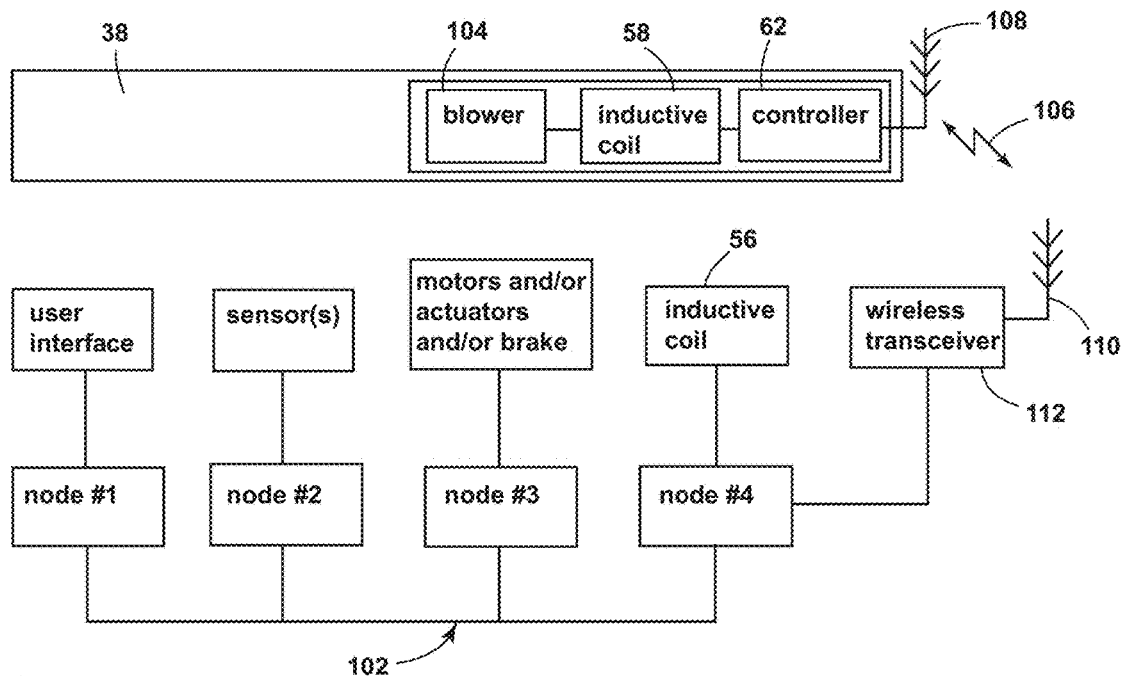
FIG. 12 is a block diagram of an alternative electrical communications network that may be present on the patient support apparatuses of FIG. 1 or 2, or any of the other patient support apparatuses described herein.
Figure 18:
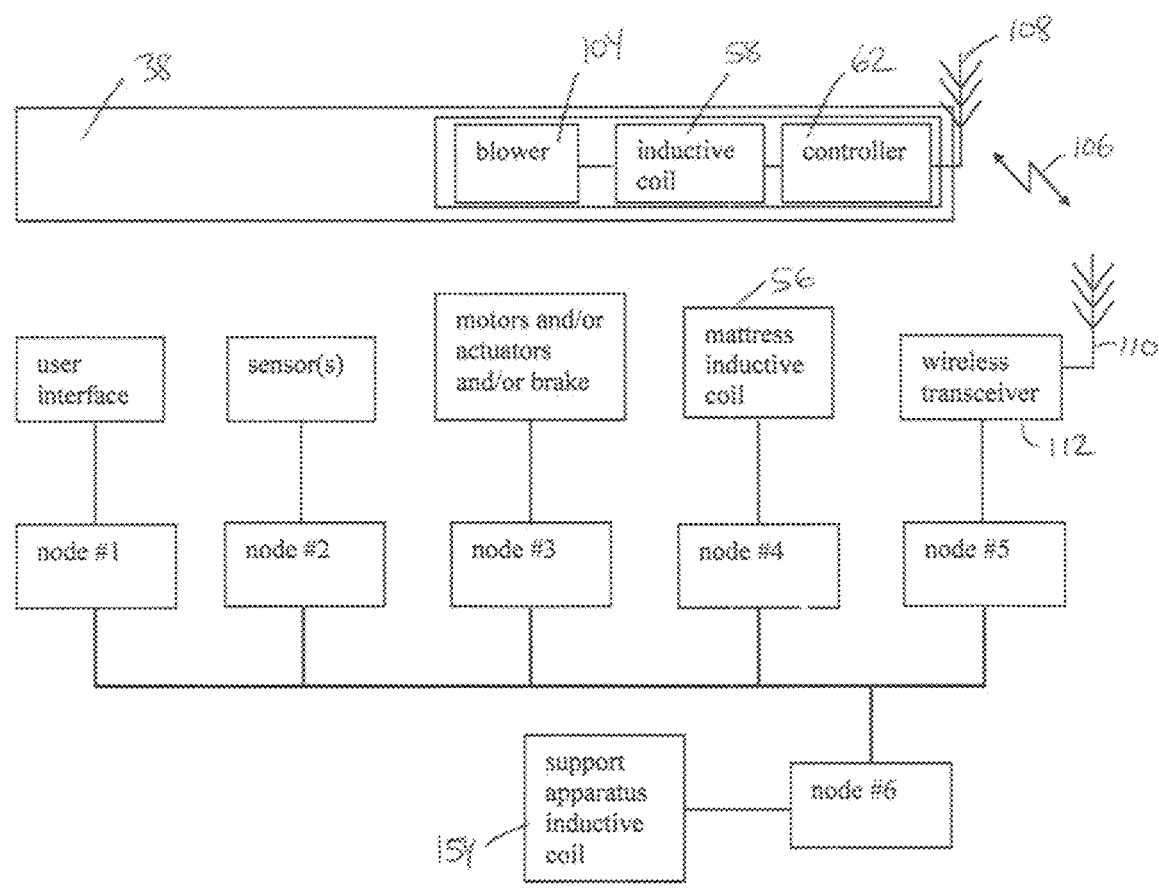
FIG. 18 is a block diagram of yet another alternative electrical communications network that may be present on the patient support apparatuses of FIG. 1 or 2, or any of the other patient support apparatuses described herein.

Any of the patient support apparatuses described herein—such as, but not limited to, support apparatus 20—may include an electrical communication network 102, such as is shown in FIGS. 11, 12, and 18. Electrical communication network 102 enables electrical messages to be sent to and received from various nodes or electronic control circuits on patient support apparatus 20. The embodiment of FIG. 11 illustrates such a communication network 102 having five nodes. The embodiment of FIG. 12 illustrates such a communication network 102 having four nodes. And the embodiment of FIG. 18 illustrates such a communication network 102 having six nodes. It will be understood by those skilled in the art that the number of nodes may be fewer or greater than what is shown in FIGS. 11, 12, and 18. It will also be understood that the numbering of the nodes in FIGS. 11-12 and 18 is arbitrary, and that the functions described for various of the nodes have been done for illustrative purposes only. That is, the functions of various of the nodes may be changed and/or combined with other nodes and/or eliminated in some embodiments of patient support apparatus 20.

Electrical communication network 102 may be a controller area network (CAN), or it may be another type of communication network. Such other types may include LONWorks, LIN, RS-232, DeviceNet, or still other types of networks. The network may include only the two network layers of CAN, or it may include more than two layers, such as CANopen.

Each node typically includes a circuit board that contains the electronics necessary for controlling a user interface, one or more actuators, one or more sensors, and one or more other electrical components. For example, in FIGS. 11-12 and 18, node #1 is configured to control a user interface. The user interface may include one or more buttons or switches, or the like, or it may include a touch screen, or other device for allowing a patient or caregiver to control one or more aspects of patient support apparatus 20. Node #2 is shown to interact with one or more sensors. Such sensors may include load cells for measuring the weight of a patient positioned on support apparatus 20, and/or it may include one or more sensors for detecting the activation of the brake, and/or angle sensors for detecting the angular orientation of one or more components of support apparatus 20, such as the head section 40 of support deck 26. Node #2 is responsible for processing the outputs of these sensors and forwarding messages containing the sensed information to the network 102.

In the illustrated embodiment, node #3 is provided for controlling one or more motors, actuators, and/or the brake of patient support apparatus 20. Node #4 is shown controlling inductive coil 56 of patient support apparatus 20. Node #4 includes patient support controller 60, as well as the associated electronic necessary for allowing controller 60 to communicate with network 102 (and any other suitable or desired electronics). In the illustrated embodiment of FIG. 11, a fifth node (node #5) is provided that manages wireless communication between patient support apparatus 20 and mattress 38. An alternative embodiment of network 102 is shown in FIG. 12 in which the functions of nodes #4 and #5 of FIG. 11 is combined into a single node (node #4 of FIG. 12). Node #4 of FIG. 12 therefore not only controls the inductive transfer or electrical energy from patient support apparatus 20 to mattress 38, it also controls the wireless communications between patient support apparatus 20 and mattress 38. A more detailed description of one embodiment of node #4 of FIG. 12 is provided below and shown in FIGS. 13A-13C.

Mattress 38 is depicted diagrammatically in FIGS. 11-12 and 18. Mattress 38 includes mattress coil 58, a blower 104 (which may be a pump), and controller 62. Controller 62 is in electrical communication with both mattress coil 58 and blower 104. Additional structures may be included within mattress 38 that have been omitted from FIGS. 11-12 and 18, such as battery 64, a fluid manifold, one or more other controllers, and other components.

In the embodiments of FIGS. 11 and 12, mattress 38 and patient support apparatus 20 communicate with each via a wireless communication link 106. Link 106 includes a mattress antenna 108 and a patient support antenna 110. A wireless transceiver 112 is also included on patient support apparatus 20. Another wireless transceiver (not shown) is included within mattress, such as within control box 94. The wireless link 106 may be a Bluetooth connection, a ZigBee connection, a RuBee connection, a WiFi (IEEE 802.11) connection, an infrared (IR) connection, or any other suitable wireless communication connection.

Patient support controller 60 and mattress controller 62 may communicate mattress control data, as well as status data, over wireless communication link 106. In other embodiments, such mattress control and status data may be transferred by other controllers that are in communication with link 106. Regardless of the specific components transferring such information, the mattress control data may include commands that are entered on one of the control panels, such as control panel 92, of patient support apparatus 20 for controlling mattress 38. Thus, for example, a caregiver may use control panel 92 to enter commands for changing the inflation pressure inside of one or more fluid bladders of mattress 92. The control panel will communicate those commands to controller 60, or another controller, via communication network 102. Controller 60, or another controller, will then wirelessly transmit those commands via wireless link 106 to mattress controller 62, or to another controller on mattress 38. In this manner, it is possible to control mattress 38 via patient support apparatus 20 without any wires, cables, or other physical coupling between support apparatus 20 and mattress 38. Similarly, because of the inductive transfer of energy to mattress 38 from support apparatus 20, there is no need for any power supply wires, cables, or other physical connections between mattress 38 and support 20 for supplying electrical power. The combination of inductive power transfer and wireless communication therefore enables mattress 38 to be completely separable from patient support apparatus 20. This eliminates the need for caregivers to physically couple any cables or the like from mattress 38 to patient support 20 before using mattress 38. Similarly, this eliminates the need for caregivers to physically disconnect any cables or the like from mattress 38 when mattress 38 is removed.

Mattress controller 62 may be in communication with one or more sensors on mattress 38, such as, but not limited to, pressure sensors and/or a battery level sensor. Mattress controller 62 may transmit the readings from these sensors, or data related to the readings from these sensors, to patient support controller 60 by way of link 106. Patient support controller 60 may then display this information to a caregiver on one or more control panels positioned on patient support apparatus 20. Controller 60 may communicate this information to the display directly, or by way of network 102. In an alternative, the sensors on mattress 38 may communicate their data to a separate controller on mattress 38 that then transmits this information via wireless link 106 to patient support apparatus 20.

Patient support controller 60 may also communicate via link 106 with one or more sensors and/or sensing sheets that may be placed on or in mattress 38, and which may not be in direct communication with mattress controller 62. Examples of one type of sensing sheet that may wirelessly communicate via link 106 with patient support apparatus 20 are disclosed in commonly assigned U.S. provisional patent application Ser. No. 61/546,546 filed Oct. 1, 2011 by applicant Geoffrey Taylor and entitled Pressure Sensing Mat, the complete disclosure of which is hereby incorporated herein by reference. Controller 60 may also communicate via link 106 with any of the sensing sheets disclosed in commonly assigned U.S. provisional patent application Ser. No. 61/449,182 filed Mar. 4, 2011, by applicant Richard Derenne and entitled Sensing System for Patient Supports, the complete disclosure of which is also hereby incorporated by reference herein. When communicating with any of the mattress sensors and/or sensor sheets disclosed in these applications, controller 60 may communicate information from the mattress sensors and/or sensing sheet to communication network 102. Any appropriate node on network 102 may then use this information in carrying out its intended function. For example, if the sensing sheet detects an undesired amount of pressure being exerted on a specific portion of the patient, a node (such as node #3) may automatically be programmed to change the orientation of one or more of deck sections 40-46 to try to alleviate such pressure. The data sensed by the mattress sensors and/or sensing sheet may also be transmitted off of patient support apparatus to a remote location, such as a server, or other computer, that forwards the information to an electronic medical record, a caregiver alerting system, a work flow system, an admission, discharge, and transfer (ADT) system, or any other suitable system. In such embodiments, network 102 may include an additional node (not shown) for managing such remote communication.

In another embodiment, controller 60 may be configured to change the pressure inside one or more bladders of mattress 38 in response to data received from any of the sensing sheets disclosed in applications 61/546,546 or 61/449,182. For example, if controller 60 receives information from one of these sensing sheets that a patient is experiencing undesired interface pressure at a specific region on his or her body, controller 60 may then issue one or more commands via link 106 to mattress controller 62 to change the inflation of one or more bladders within mattress 38. Algorithms for changing the inflation of mattress 38 based upon sensed patient interface pressure are disclosed in, for example, commonly assigned U.S. patent application Ser. No. 12/075,937 filed Mar. 15, 2008 by applicant Geoffrey Taylor and entitled Adaptive Cushion Method and Apparatus for Minimizing Force Concentrations on a Human Body, the complete disclosure of which is hereby incorporated herein by reference.

FIGS. 13A-C illustrate in greater detail the electronic components that may make up patient support controller 60 and mattress controller 62. In the embodiment of FIGS. 13A-C, controllers 60 and 62 also manage the communications via link 106. However, as has been noted (and illustrated in FIG. 11), a separate controller may be used for managing communications between mattress 20 and patient support apparatus 38, if desired. As will be recognized by those skilled in the art, additional components beyond those shown in FIGS. 13A-C may also be added to either or both controllers 60 and 62 for controlling other aspects of either the patient support apparatus 20 or mattress 38 beyond the wireless power transfer and/or wireless data transfer.

Patient support controller 60 includes an AC to DC power converter 120 that converts the AC power received from a conventional electrical outlet to DC power. The DC power may be any suitable voltage. In one embodiment, the DC power may be 24 volts. In other embodiments, this voltage may be different. Further, in at least one embodiment, AC to DC power converter 120 also supplies DC power to all, or at least some, of the other electrical components on patient support apparatus 20. In this manner, patient support apparatus 20 may only have a single AC to DC power converter, instead of multiple AC to DC power converters.

Power converter 120 feeds DC power to a suitable microcontroller 122 for controlling the operation of patient support coil 56, as well as managing communications over wireless link 106. Microcontroller 122 controls a bridge controller 124 and a field effect transistor (FET) driver 126 that, in combination, generate an AC signal for driving patient support coil 56. A current sensing circuit 128 senses the current flowing through coil 56 and passes its output to a phase sense and voltage follower circuit 130. Phase sense and voltage follower circuit 130 analyzes any shift in the current flowing through coil 56. This analysis may be used to automatically detect whether or not mattress coil 58 is adjacent to coil 56 or not. That is, controller 60 may periodically ping coil 56 to determine if coil 58 is adjacent or not. Such pinging may take place multiple times a second until coil 58 is detected. Once detected, the phase analysis performed by circuit 130 may be used to monitor whether coil 58 remains in near proximity to coil 56 or not.

The pinging of coil 56 may take place multiple times a second. Such pinging may involve driving coil 56 with a small amplitude wave of electrical current and monitoring the relationship between the phase and current in coil 56 by circuit 130. Depending upon the phase relationship, the presence of absence of mattress coil 58 can be inferred, as would be known to one of ordinary skill in the art. The amount of current used in pinging coil 56 may be substantially less than that which flows through coil 56 during inductive energy transfer. This reduces power consumption, as well as electromagnetic interference with other electrical or electronic devices. The duration of a single current ping may also be less than a single cycle time used during inductive charging. In other words, the current used during pinging is less than that used during a single cycle of inductive coupling, and it also may last for less time than the length of a single inductive coupling cycle.

The output of circuit 130 is fed to a current limiting control circuit 132 that, in conjunction with microcontroller 122, limits the current flowing through coil 56. This current limiting may be used to prevent undesired and/or excessive amounts of current flowing through coil 56, as well as in limiting the amount of current that is used during the pinging process described above.

Microcontroller 122 is also in communication with a network transceiver 134, which, in the embodiment shown in FIGS. 13A-C is a CAN transceiver. As noted, however, it will be understood that other types of networks may be used on the patient support apparatuses discussed herein. Network transceiver 134 is in electrical communication with network 102, as well as wireless transceiver 112. As shown in FIG. 12, wireless transceiver 112 may be an RF transceiver or an IR transceiver.

One embodiment of a mattress controller 62 is also depicted in more detail in FIGS. 13A-C. Mattress controller 62 includes a coil secondary side circuit 136 that is in direct electrical communication with mattress coil 58. Coil secondary side circuit 136 passes its output onto a resonant filter and bridge diode rectification circuit 138 that filters and rectifies the AC current coming from coil 58. The output of filter and rectifier circuit 138 is sequentially fed to a voltage regulation circuit 140 and current sensing circuit 142. The current sensing circuit sensing the amount of current and forwards this information to a microcontroller 144. The current sensing circuit 142 also passes the current generated by coil 58 to a charging switch 145 that selectively couples the current to battery 64 for charging and recharging battery 64. Charging switch 145 is controlled by a battery charge and current limiting control circuit 146 that is, in turn, controlled by microcontroller 144. The circuitry of mattress controller 62 thereby allows microcontroller 144 to oversee and control the inductive transfer of electrical energy from coil 56 to coil 58, and to use that electrical energy for charging battery 64.

It will be understood by those skilled in the art that battery 64 is an optional component. In some embodiments, battery 64 may be omitted and controller 62 may be configured to supply electrical energy directly to all of the electrical consumers on mattress 38. This supply of electrical energy will only occur substantially at the time when mattress 38 is inductively coupled to patient support apparatus 20. It will also be understood that the electrical source of power for patient support apparatus controller 60 (and coil 56) could be a battery carried on board patient support apparatus 20, thereby allowing patient support apparatus 20 to inductively supply electrical energy to mattress 38 even when the electrical power cord of patient support apparatus 20 is not plugged into an electrical outlet.

Mattress controller 62 of FIGS. 13A-C further includes a network transceiver 148 that is in communication with a wireless transceiver 150. Network transceiver 148 is an optional component that may be omitted in some embodiments. Network transceiver may be desirably used in those situations where a manufacturer of mattresses or mattress controllers has a pre-existing mattress controller design that is adapted to received instructions via a specified electronic communication format. The use of network transceiver 148 allows the pre-existing design for a wired communication mattress controller to be maintained and used within mattress controller 62 without having to re-program the pre-existing wired communication mattress controller. That is, network transceiver 148 may be chosen so that is communicates with microcontroller 144 in the same manner as pre-existing wired microcontrollers communicated with a mattress microcontroller. In the embodiment shown in FIGS. 13A-C, network transceiver 148 is a CAN transceiver, although it will be understood that different types of network transceivers may be used. Also, as noted, network transceiver 148 could be omitted in some embodiments, in which case wireless transceiver 150 may communicate directly with microcontroller 144.

By supplying inductive electrical power to mattress 38, patient support apparatus 20 eliminates the need for power cords running between mattress 38 and patient support apparatus 20. The size of mattress control box 94 may also be reduced because various electrical components, such as a transformer, that were present in prior wired mattress controllers can be eliminated. The elimination of both power and data cables between mattress 38 and patient support apparatus 20 also eliminates the potential for damage to such cables and/or the circuitry connected thereto that was present in prior art designs. Such damage could occur when attempting to lift or remove a mattress from a patient support deck 26 without first unplugging the cables. Further, because such cables do not need to be unplugged in the present design, cleaning underneath mattress 38 is easier because mattress 38 only needs to be lifted, instead of both unplugged and lifted, as in the prior art.

In the illustrated embodiment, patient support controller 60 is configured to supply up to 120 watts of power to mattress 38. Other amounts of energy can also be inductively transferred. Controller 60 may also be configured to terminate power to coil 56 when no mattress 38 is present, or if mattress housing 54 is not aligned with patient support housing 52. In some embodiments, as was noted, controller 60 may periodically check for the presence of mattress 38, and it if is not found, no current will be supplied to coil 56. This eliminates or reduces the likelihood of coil 56 causing undesired electromagnetic interference with any nearby electronic devices. When mattress 38 is present and housings 52 and 54 are aligned, controller 60 may be configured to automatically begin transferring power to mattress 38, or it may await a prompt from a user indicating such transfer should occur. In one embodiment, mattress controller 62 may automatically terminate current to coil 56 when battery 64 is fully charged. In another embodiment mattress controller 62 may automatically terminate current to coil 56 only when mattress 38 is not consuming any, or any significant amounts of, electrical energy, and battery 64 is fully charged. Controller 60 may receive information about the charge status of battery 64 and/or the electricity usage of mattress 38 via wireless link 106.

Figure 20:
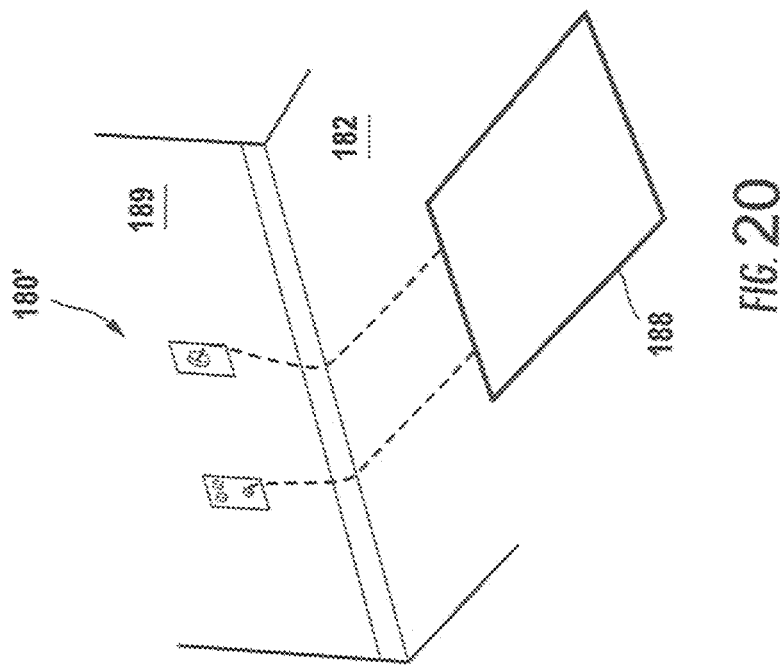
FIG. 20 is perspective view of an alternative inductive power station that may be used to wirelessly provide electrical power to any of the patient support apparatus embodiments described herein, as well as other patient support apparatuses.
Figure 19:
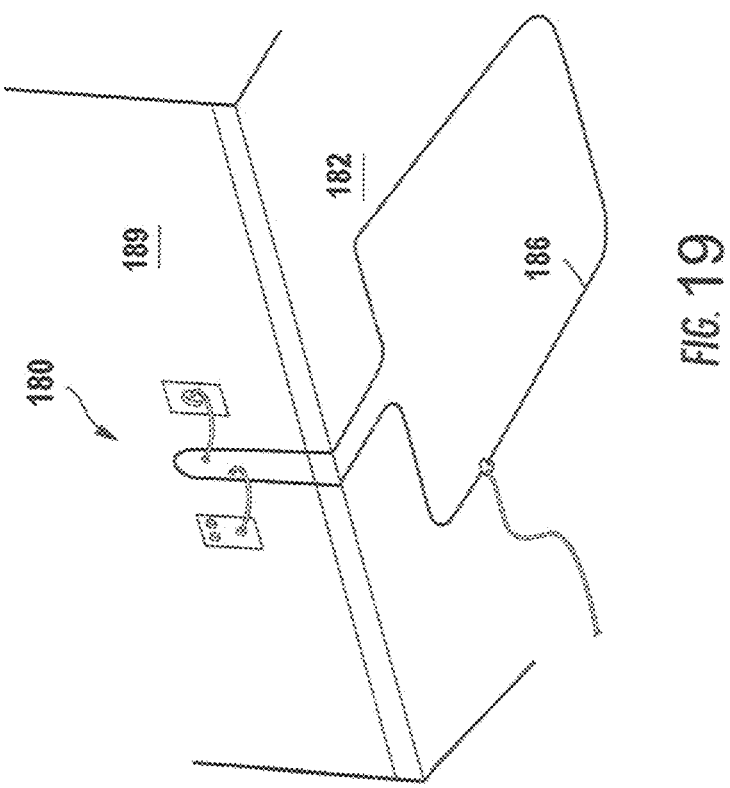
FIG. 19 is a perspective view of an inductive power station that may be used to wirelessly provide electrical power to any of the patient support apparatus embodiments described herein, as well as other patient support apparatuses.

FIG. 18 illustrates another embodiment of the electrical components that may be present on a patient support apparatus according to one or more aspects of the present invention. The network 102 of FIG. 18 is the same as the network 102 of FIG. 11 with the sole exception of the addition of node #6 and a support apparatus inductive coil 154 controlled by node #6. The electronics of FIG. 18 may be used on a patient support apparatus that has the ability to inductively receive electrical energy from a stationary source, such as an inductive power station 182 (FIGS. 19 and 20). This eliminates the need for the patient support apparatus 20 to have an electrical cable for plugging the apparatus 20 into a conventional electrical outlet. Or, in some embodiments, this gives the support apparatus the ability to either receive electrical energy inductively through power station 182, or to be plugged into an electrical wall outlet if no inductive power station 182 is present, or if it is not desired to use inductive power station 182. Node #6 controls coil 154 to draw power therefrom that is then used to power the electrical components on patient support apparatus 20. In addition to the components shown in FIG. 18 and/or discussed herein, the patient support apparatus 20 may include one or more rechargeable batteries that are recharged by the inductive power received through coil 154. This enables support apparatus 20 to be moved away from station 182 while still having a source of electrical energy. When moved away from station 182, the battery or batteries on board patient support apparatus 20 may be used to supply electrical energy to coil 56 for transfer to mattress 38.

FIGS. 19 and 20 illustrate two different embodiments of a power station 180 that may be positioned on a floor 182 adjacent a vertical wall 189. Power station 180 includes a coil 186 through which an alternating current is passed. Coil 186 may be positioned underneath a top surface of floor 182 so as to not be a trip hazard. When it is desirable to receive electrical power from power station 180, the patient support apparatus (such as, but not limited to, apparatus 20) is wheeled to a location such that its inductive power receptor is positioned vertically above coil 186. The alternating current passed through coil 186 creates a changing magnetic field that induces a voltage on a secondary coil, such as coil 154, within the inductive power receptor on the patient support apparatus. This induced voltage drives a current that may be used to power any of the various electrical systems on the patient support apparatus, or to re-charge a battery, or both.

In an alternative inductive power station 180', a conductive plate 188 is positioned on or underneath floor 182. Plate 188 is coupled to a source of alternating current such that it radiates an electromagnetic wave that induces a voltage on a coil or plate positioned on the patient support apparatus. Plate 188 or coil 186 can thus be used to wirelessly transmit power from stations 180 or 180' to a mobile patient support apparatus, such as patient support apparatus 20'.

FIG. 3 illustrates one suitable location on patient support apparatus 20 for inductive coil 154. In some embodiments, it may be desirable to have inductive coil 154 positioned closer to coil 186 or plate 188 than it otherwise would be if coil 186 were immovably mounted to patient support apparatus 20. To that end, an actuator (not shown) may be physically coupled to coil 186 to selectively extend and retract coil 186 toward and away from coil 186 and/or plate 188. Such actuation may be responsive to a user manipulating a control on patient support apparatus 20. In one embodiment, the extension of coil 186 may automatically occur each time the brake is activated on patient support apparatus 20, and the retraction of coil 186 may automatically occur each time the brake is deactivated on patient support apparatus 20. In another embodiment, control circuitry on-board patient support apparatus 20 that is in electrical communication with coil 154 may automatically detect the presence of a power station 180 or 180' and automatically extend coil 156 when such presence is detected. In still other embodiments, coil 186 or plate 188 may be extended and retracted toward and away from patient support apparatus 20 while coil 154 remains stationary on apparatus 20. In still other embodiments, both the coil 154 and the coil 186 or plate 188 of power station 180 or 180' may extend and retract toward each other so as to increase the efficiency of the inductive electrical energy transfer therebetween.

It will be understood by those skilled in the art that, in some embodiments, patient support apparatus 20 may only include the inductive coil 154 and not the coil 56. In such embodiments, patient support apparatus 20 inductively receives the power it needs, but does not have the ability to inductively transfer electrical energy to any mattress 38 positioned thereon. Power to such a mattress may be supplied by an electrical cable, and communication may take place either wirelessly or by a data cable. In other embodiments (e.g. FIG. 18), patient support apparatus 20 may include both coil 154 and coil 56, thereby both inductively receiving power and inductively transferring power to mattress 38. In still other embodiments (e.g. FIGS. 11 and 12), patient support apparatus 20 may include only patient support coil 56, but not coil 154, thereby enabling it to inductively transfer power to mattress 38, but not inductively receive any power itself.

It will further be understood by those skilled in the art that, although FIG. 19 illustrates only a single loop of coil 186, additional loops and/or additional coils may be present. Indeed, in some embodiments, power station 180 may include multiple coils 186. Such coils may be spread out over a large area relative to coil 154 of patient support apparatus 20. By having coils 186 spread out over a large area, it is not necessary for coil 154 to be precisely aligned with a single location relative to power station 180 in order for efficient inductive energy transfer to take place. In some embodiments, coil 186 may be large enough to accommodate multiple patient support apparatuses 20. Still further, in some embodiments power station 180 may include multiple coils 186 that may each be individually controlled. A controller for power station 180 may automatically detect which coils 186 are closest to support coil 154 and selectively energize only those coils, thereby reducing unwanted generation of electromagnetic interference.

B. Vehicular Patient Support Apparatuses

Any one or more of the aspects of the patient support apparatuses described above with respect to FIGS. 1-20 may be used in whole, or in part, in any of the vehicular patient support apparatuses and/or loading/unloading systems described below with respect to FIGS. 21-38. Some components of the patient support apparatuses are described in more detail in U.S. Pat. No. 7,887,113, which is incorporated by reference herein. The reference numbers in FIGS. 21-30 correspond to the reference numbers in the U.S. Pat. No. 7,887,113 patent but have been increased by 400. Thus, for example, the reference number 10 in the '113 patent corresponds to reference number 410 herein.

Figure 21:
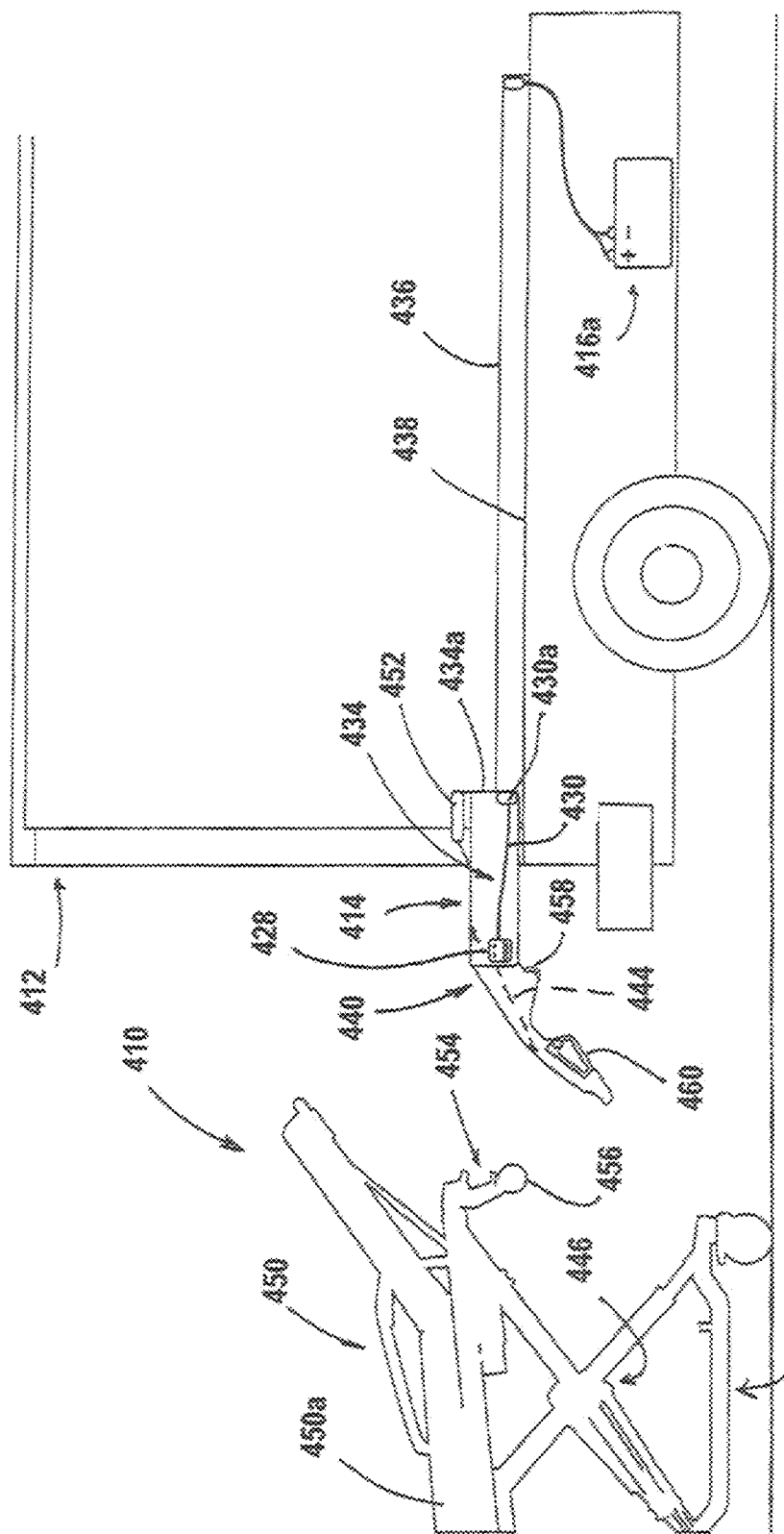
FIG. 21 is a fragmentary side elevation view of a patient support and emergency vehicle incorporating a loading and unloading device and, further, an induction based power supply system according to one aspect of the present invention.

Referring to FIG. 21, the numeral 410 generally designates a patient support that may incorporate one or more aspects of the present invention. In the illustrated embodiment, patient support 410 comprises a cot, such as an ambulance cot or emergency stretcher. For details of the overall structure of a suitable cot or stretcher that may incorporate the present invention, reference is made to U.S. Pat. Nos. 5,537,700; 6,125,485; 6,735,794; 7,100,224; WO 2004/064698; U.S. Patent Publication 2006/0075558, and copending U.S. patent application Ser. No. 10/542,232, for example, all commonly assigned to Stryker Corporation of Kalamazoo, Mich. and which are incorporated by reference in their entireties herein. As will be more fully described below, patient support 410 is secured in an emergency vehicle 412 by a cot or patient support fastening system. Further, each of the patient support 410 and the fastening system may include a rechargeable power supply, such as a rechargeable battery, that can be recharged by a power supply at the vehicle, including the vehicle's battery.

In the illustrated embodiment, the cot fastening system comprises a loading and unloading device 414 that loads patient support 410 into and unloads patient support 410 from the emergency vehicle, as well as fastens patient support 410 in the vehicle when patient support 410 is loaded into the vehicle. Additionally, an arresting device used in a cot fastening system, such as disclosed in U.S. Pat. No. 7,287,794, which is incorporated by reference herein its entirety, can be used to fasten the patient support in the vehicle. As will be more fully described below, when patient support 410 is fully loaded into the vehicle, the vehicle based power supply will recharge the rechargeable power supply of the patient support 410. Similarly, when the loading and unloading device (414) is in a preselected position in the vehicle, its rechargeable power supply will be recharged by the vehicle based power supply.

To charge the rechargeable power supplies, the vehicle incorporates an induction based power supply system 416. Although described in reference to an ambulance and an ambulance cot, it should be understood that the present invention has broader application, including to other patient supports, such as beds, infant incubators, or the like, and to other vehicles, including a helicopter. Further as previously noted, the vehicle based power supply may be the vehicle battery or another power supply provided in the vehicle.

Figure 22:
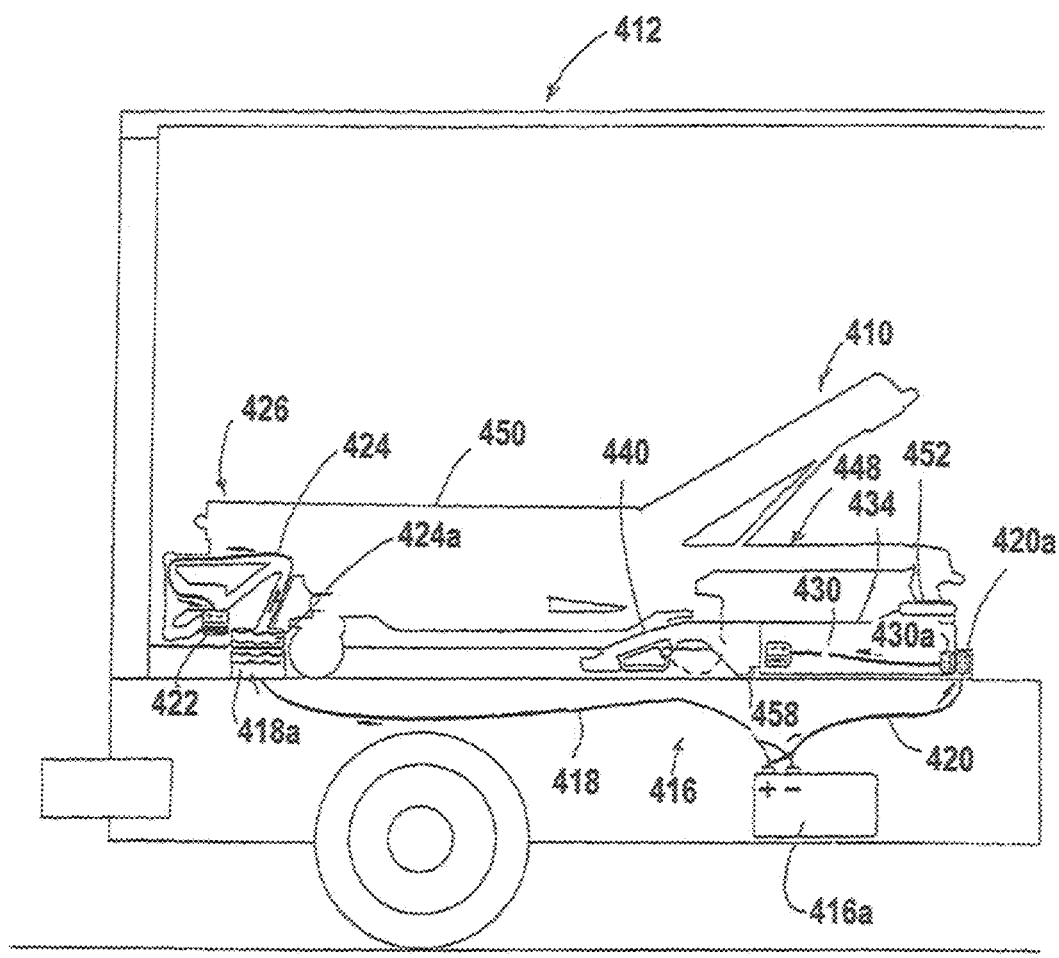
FIG. 22 is a side elevation view of the patient support and emergency vehicle of FIG. 21 shown with the patient support loaded onto the emergency vehicle.
Figure 23:
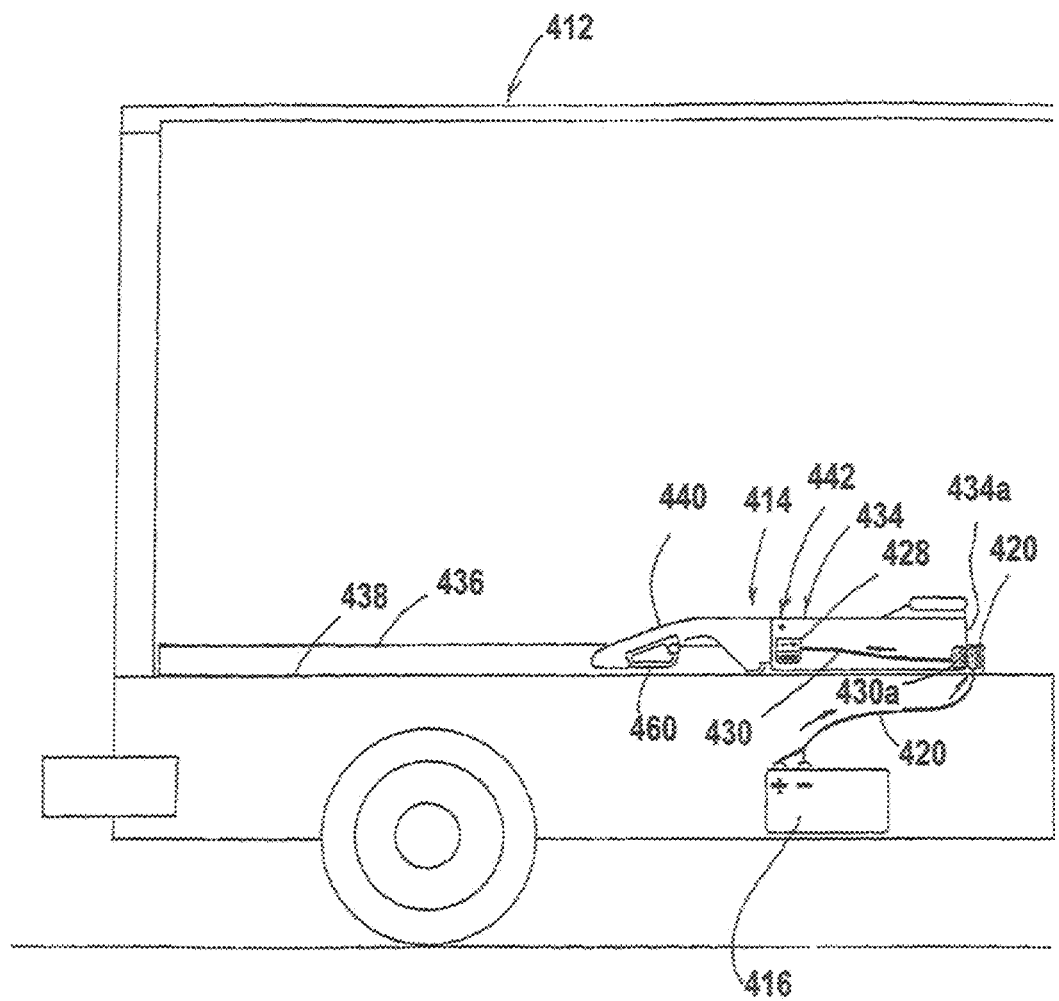
FIG. 23 is a similar view to FIG. 22 illustrating the loading and unloading device in a stowed position with the patient support removed for clarity.

Referring to FIGS. 22 and 23, induction based power supply system 416 includes a conventional DC power supply or source 416a, such as a battery, which is connected to two power supply circuits 418 and 420 for recharging the rechargeable power supplies on patient support 410 and on the loading and unloading device 414 through wireless power transmission, namely by inductive coupling. As best seen in FIG. 22, patient support 410 includes a rechargeable power supply or source 422 that is mounted to patient support 410 and, further, a power receiving or recharging circuit 424 that is electrically coupled to rechargeable power supply 422 for recharging power supply 422. As described below, recharging circuit 424 wirelessly receives power from power supply circuit 418 to thereby recharge supply 422.

As best understood from FIG. 22, power supply circuit 418 is coupled to vehicle based power supply 416a and includes a primary or transmitting coil 418a, which transmits power wirelessly to a secondary or receiving coil 424a of recharging circuit 424. In this manner, when electricity is passed through circuit 418 and the electricity passes through coil 418a, coil 418a will generate a magnetic field. The magnetic field in coil 418a will in turn induce a magnetic field in coil 424a when coil 424a is in close proximity to coil 418a, which will induce current flow in coil 424a and in turn in circuit 424, which is coupled to rechargeable power supply 422 to thereby recharge power supply 422.

In the illustrated embodiment, rechargeable power supply 422 and recharging circuit 424 are provided at the foot end 426 of patient support 410 and, further, such that receiving coil 424a is aligned with transmitting coil 418a when the patient support 410 is fully inserted or positioned in vehicle 412 by loading and unloading system 414. By providing a loading and unloading system 414 that loads the patient support 410 into a vehicle 412, the location of the patient support in the vehicle can be controlled such that its location when fully inserted is repeatable and, further, done in a manner to allow the transmitting and receiving coils to be closely aligned and/or in registry with each other to ensure the proper physical positioning of the respective coils, which will reduce the power loss in the wireless transfer of power and optimize the inductive coupling efficiency.

Referring to FIG. 23, as noted above, loading and unloading device 414 includes a rechargeable power supply 428, such as a battery, and a receiving or recharging circuit 430 that is electrically coupled to rechargeable power supply 428, which similarly receives power from power supply 416a through power supply circuit 420. Receiving circuit 430 also includes a receiving coil 430a, which receives power from transmitting coil 420a of power supply circuit 420 when the loading and unloading device is positioned in its fully retracted or inserted position within the vehicle and coil 430a is aligned with coil 420a.

Again referring to FIG. 23, loading and unloading device 414 includes a carriage or trolley 434, which is mounted on one or more tracks or rails 436, which are in turn mounted to the deck 438 of vehicle 412. Carriage 434 is movably mounted to tracks or rails 436 by a pair of guides (not shown). For example, where the tracks or rails are tubular, guides 436 may comprise sleeves, such as described in PCT/US2004/001070 published under WO 2004/064698. In the illustrated embodiment, carriage 434 is configured to engage and releasably couple to the head end of patient support 410 so that patient support 410 may be guided into vehicle 412 by loading and unloading device 414 either manually or pulled into the vehicle by a driver, noted below.

Mounted to carriage 434 is an arm 440, which is adapted to lift the head end of the patient support to allow an attendant to guide patient support 410 onto carriage 434 to couple the patient support to carriage 434 so that when carriage 434 is pushed or retracted into the vehicle, patient support 410 will be guided into the vehicle. Arm 440 comprises a generally U-shaped member with two arm portions and a transverse member, with the two arm portions pivotally mounted at their distal or proximate their distal ends to carriage 434.

As best understood from FIG. 21, arm 440 is pivotally mounted to carriage 434 by an axle or pin 442, which extends through the respective ends of the arm portions and carriage 434 to permit arm 440 to move between a generally horizontal position, such as shown in FIG. 23, and a downwardly angled or lowered position, such as shown in FIG. 21, so that patient support 410 can be guided onto arm 440. Pin 442 may be extended through bushings mounted in carriage 434 and held in place by conventional mechanisms, such as retaining rings or cotter pins or the like.

Arm 440 is moved between its generally horizontal position and lowered position by driver 444, such as a linear actuator, including a hydraulic cylinder, which is mounted at one end in carriage 434 and at its opposed end to arm 440. When the linear actuator is extended, arm 440 is moved to its generally horizontal orientation, and when the linear actuator is contracted arm 440 moves to its lowered position to receive patient support 410. Driver 444 is electrically coupled to and powered by rechargeable power supply 428, which as noted above is recharged when loading and unloading device 414 is fully retracted into the vehicle.

As best seen in FIGS. 22 and 23, receiving coil 430a is mounted to the leading end of carriage 434, while transmitting coil 420a is located at or near the proximate end of track 436 so that receiving coil 430a will align with and be in close proximity to coil 430a when carriage 434 is fully retracted on the tracks into the vehicle. In this manner, when carriage 434 is fully retracted into the vehicle and coil 420a is energized, its magnetic field will generate a magnetic field in coil 430a to thereby wirelessly transmit power to recharging circuit 430 and, hence, can recharge rechargeable power supply 428.

Similarly, patient support 410 includes an electrically powered device 446 that is powered by rechargeable power supply 422. In the illustrated embodiment, the electrically powered device is a driver, namely an elevation mechanism, for raising the base 448 of patient support 410 relative to the patient support surface 450, which in a cot is referred to as a litter, so that patient support 410 can be configured in a more compact configuration when being loaded into vehicle 412.

In the illustrated embodiment, carriage 434 include a releasable latch 452 which is configured to engage the guide wheel support 454 of patient support 410, which is mounted to the head end of patient support 410. For example, a suitable latching device is described in U.S. Pat. No. 6,796,757, which is commonly assigned to Stryker Corporation of Kalamazoo, Mich. and is incorporated by reference in its entirety herein. Guide wheel support 454 supports a wheel or bearing 456 that supports the head end of the patient support 410 on the vehicle deck when patient support 410 is inserted into the vehicle, as would be understood by those skilled in the art. Similarly, arm 440 may include a guide wheel 458, which rides on deck 438 to support arm 440 when arm 440 is in its horizontal orientation. Further, to facilitate manual removal or retraction of the patient support from the vehicle, arm 440 may also include a handle 460 at or proximate its distal end.

Again referring to FIG. 22, coil 424a is located beneath patient support surface 450a of patient support 410 and, as previously noted, at the foot end 426 of patient support 410. Further, coil 424a is positioned so that when patient support 410 is fully inserted into the vehicle and carriage 434 is fully retracted in the vehicle along track or tracks 436, coil 424a will align and be in registry and/or close proximity to coil 418a, which is supported adjacent track 436 on deck 438. In this manner, when the patient support is fully inserted in the vehicle both receiving coils (424a and 430a) will align and be in registry and/or close proximity to the respective transmitting coils (418a and 420a).

Alternately or in addition, either circuit 420 or 430 and 418 or 424 may include an impedance matching circuit to improve the resonant frequency match between the respective circuits, which will improve transmission and hence efficiency of the power transmission, as known to those skilled in the art. For example, the impedance matching circuit may include feedback loops that check the resonance of the power supply circuit (418, 420) and of the receiving circuit (424, 430) so the impedance of the power supply circuit can be adjusted. The feedback loop(s) may provide a dynamic circuit that seeks resonance between the two circuits. As a result, the power circuit can automatically adjust the frequency of the applied current to the transmitting coil to maintain the frequency resonant with the frequency of the receiving circuit, such as described in EP0700574B1, which is incorporated by reference herein in its entirety.

In addition to power transmission, coil 424a may be used to wirelessly transmit data from patient support 410 to vehicle 412 through induction. For example, modulated data signals may be transmitted to coil 424a, which can then wirelessly transmit the data signal to the receiving coil using induction, in this case coil 418a, which generates a reception signal. The reception signal is then demodulated by a demodulator. The demodulator then may transmit the signal to a processor or storage device, where it can be processed or stored for later use.

For example, power management data may be transmitted from patient support 410 to vehicle 412. Patient support 410 may include a storage device, for example, for storing data relative to the charging and using of rechargeable power supply 422. This data may be stored on the power supply or battery or on the charger. Power management data may include, for example, the number of times the battery is charged and the length of use of the battery, which data may be processed for evaluation or stored for later evaluation. Therefore, in this application, the receiving coil at the patient support becomes a transmitting coil for transmitting the data to a receiving coil, for example coil 418a, which then becomes a receiving coil.

Other data that may be transmitted includes the identification of the patient support or data related to the patient. For example, the patient support may incorporate an RFID tag, which identifies the type of patient support, and an RFID reader may be provided on the loading and unloading device so that the loader will recognize the patient support and, for example, know when to actuate the linear actuator to lift the head end of the patient support and how high, for example. Similarly, the identification of the patient support may be transmitted to the vehicle using data transmission by induction rather than RF transmission in a similar manner noted above.

Patient data that may be transmitted may include patient weight. For example, patient support 410 may incorporate load cells, which are coupled to an onboard processor that determines the weight of the patient based in the signals from the load cells. This data may be displayed at the patient support, for example, by a LCD display or other types of displays, so that the EMS personnel can determine the correct dosage of a medicine or treatment for example. This data similarly can be transmitted from patient support 410 to the storage device on the vehicle, which data can then be stored or processed for later use.

Alternately or in addition, the data may be inductively transmitted to a storage device on a handheld device (e.g. for an EMT or for EMS services) that includes a receiving coil that is in communication with the data storage device in the handheld device.

Further, the data in the storage device in either the vehicle or the handheld device may be transmitted, for example, wirelessly to a hospital storage device, including to a patient database. In addition, the transmission of the data may be made directly between the patient support coil (424a) and a hospital receiving coil when the patient support is delivered to the hospital, with the hospital receiving coil in communication with the hospital storage device.

When data transmission is also provided, frequency-shift keying techniques may be used to minimize the disturbance on the power transmission, such as described in EP0700574B1.

In addition or alternately to drivers 444 and 446, other drivers and/or other electrically power devices may be powered by rechargeable power supplies 422 and 428. For example, loading and unloading device 414 may incorporate a driver to move carriage relative to the tracks under power to thereby pull or push the patient support relative to the deck. Further, patient support 410 may include a fifth wheel to power the patient support, which may also be powered by rechargeable power supply 422 when patient support 410 is being maneuvered through a hospital or at an accident site or the like. Further, electrically powered accessories mounted at patient support 410 may also be powered by rechargeable power supply 422. It can be appreciated that the power demand on the rechargeable power supply 422 can be significant; hence, the inductive recharging system of the present invention may significantly prolong the life of the power supply 422, as well as, power supply 428. Moreover, by eliminating the electrical connections, no direct physical contact between the two electrical circuits occurs, which reduces the risk of electrical shock to the patient or the caregiver. In addition, with electrical connectors, repetitive coupling and decoupling can cause wear and tear on the connections. Further, electrical connections require greater precision in the alignment between the connectors.

As noted above, patient support 410 may be secured in the vehicle using other fastening systems. Referring to FIGS. 24-29, another embodiment of a patient support or cot fastening system is illustrated, which comprises a loading and unloading device 514 that is of similar construction to loading and unloading device 414 of the first embodiment and may incorporate a rechargeable power supply and recharging circuit described in reference to the first embodiment. For further details of the rechargeable power supply and recharging circuit reference is therefore made to the previous embodiment.

Device 514 includes a carriage or trolley 534 that is mounted on track 536, which is in turn mounted to the deck 538 of a vehicle. In the illustrated embodiment, track 536 comprises a rectangular tubular track with opposed guide surfaces 536a for guiding carriage 534. Carriage 534 is movably mounted on track 536 for linear movement along track 536 by an intermediate elongate member 535, such as an inverted, generally channel-shaped member. Intermediate member 535 includes a plurality of bearing assemblies 535a, for example a plurality of vertically oriented rollers, that engage sides 536a of track 536 and guide member 535, as well as carriage 534, along track 536. The rollers or bearings are mounted in member 135 between upper and lower inwardly extending flanges by fasteners 535b. Intermediate elongate member 535 also includes a second plurality of bearings 535c, such as wheels or rollers, mounted in the channel-shaped member for engaging deck 538 to thereby provide vertical support to member 535 and carriage 534 as they move along track 536.

Carriage 534 similarly comprises an inverted, generally channel-shaped member and also includes a plurality of bearing assemblies 534a, which are similarly secured between inwardly extending flanges by fasteners 534b and that engage opposed sides 535d of member 535 so that carriage 534 is movably mounted to member 135. In this manner, carriage 534 and member 535 form a nested rail arrangement in which member 535 can be extended from track 536, and carriage 534 can be extended from member 535 beyond the end of track 536 to extend carriage 534 further from the vehicle, for example, than the first embodiment.

Figure 24:
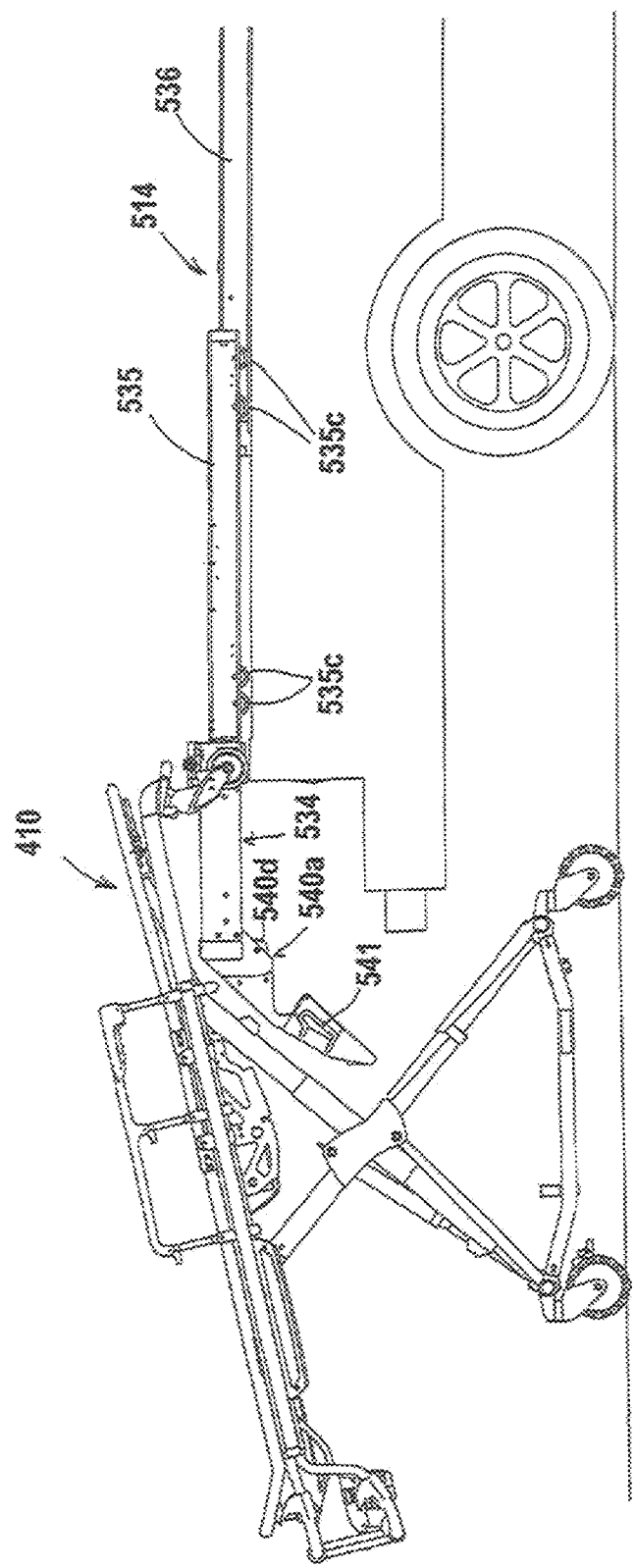
FIG. 24 is a similar view to FIG. 21 illustrating another embodiment of a loading and unloading device incorporating aspects of the present invention.
Figure 25:
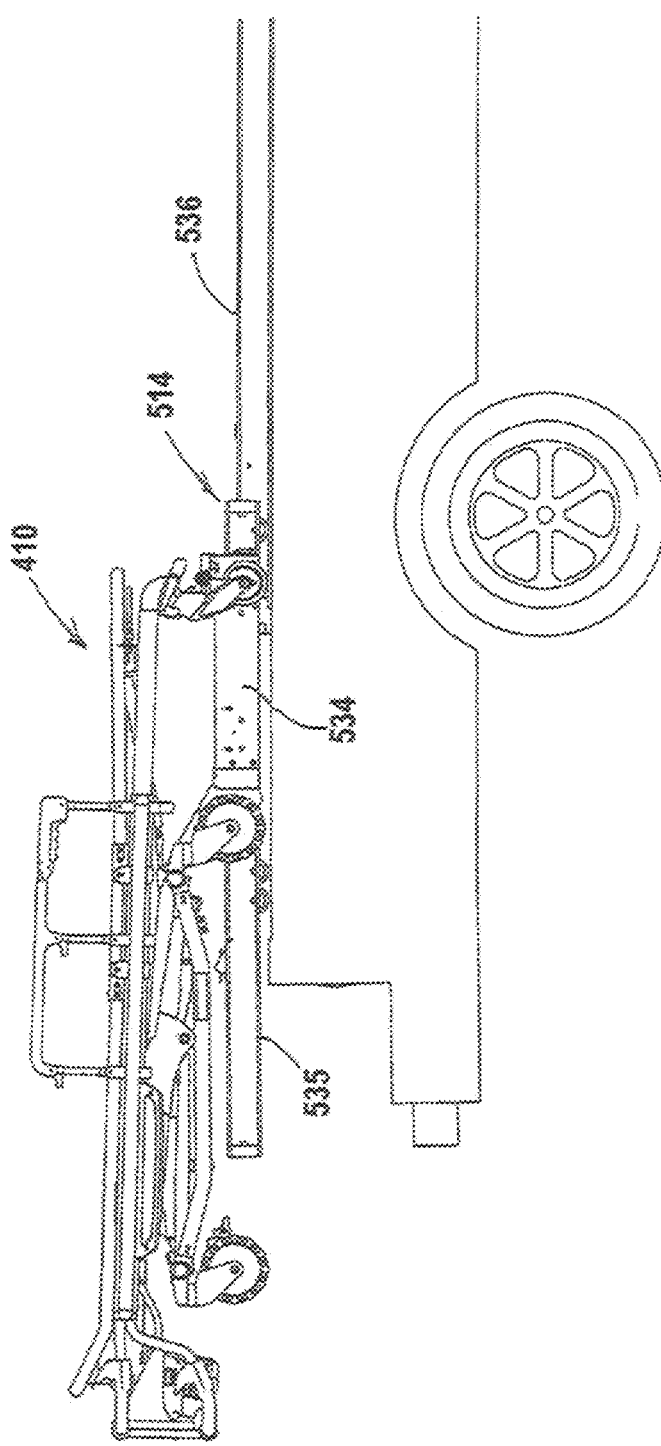
FIG. 25 is a side elevation view of the patient support of FIG. 21 being loaded into a vehicle.
Figure 26:
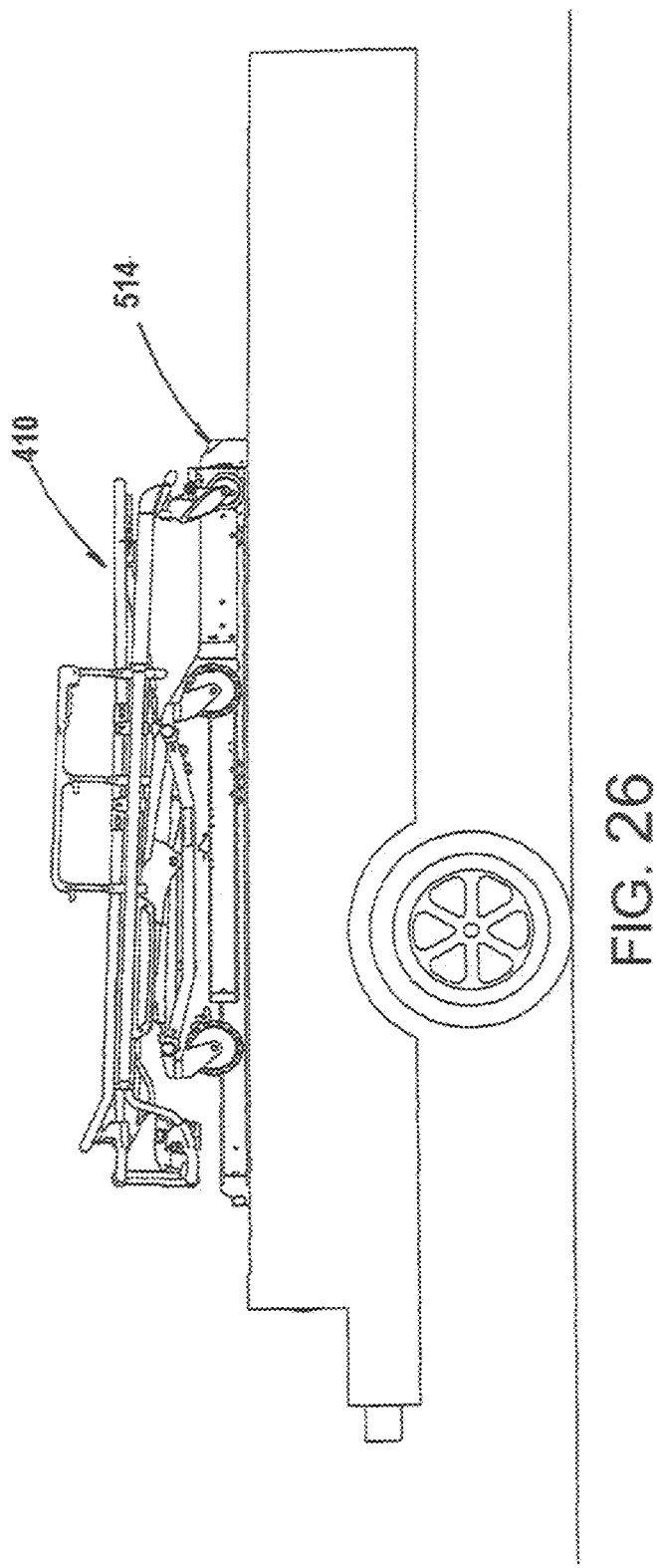
FIG. 26 is a side elevation view of the patient support of FIG. 21 in a fully stowed position within the vehicle.
Figure 27:
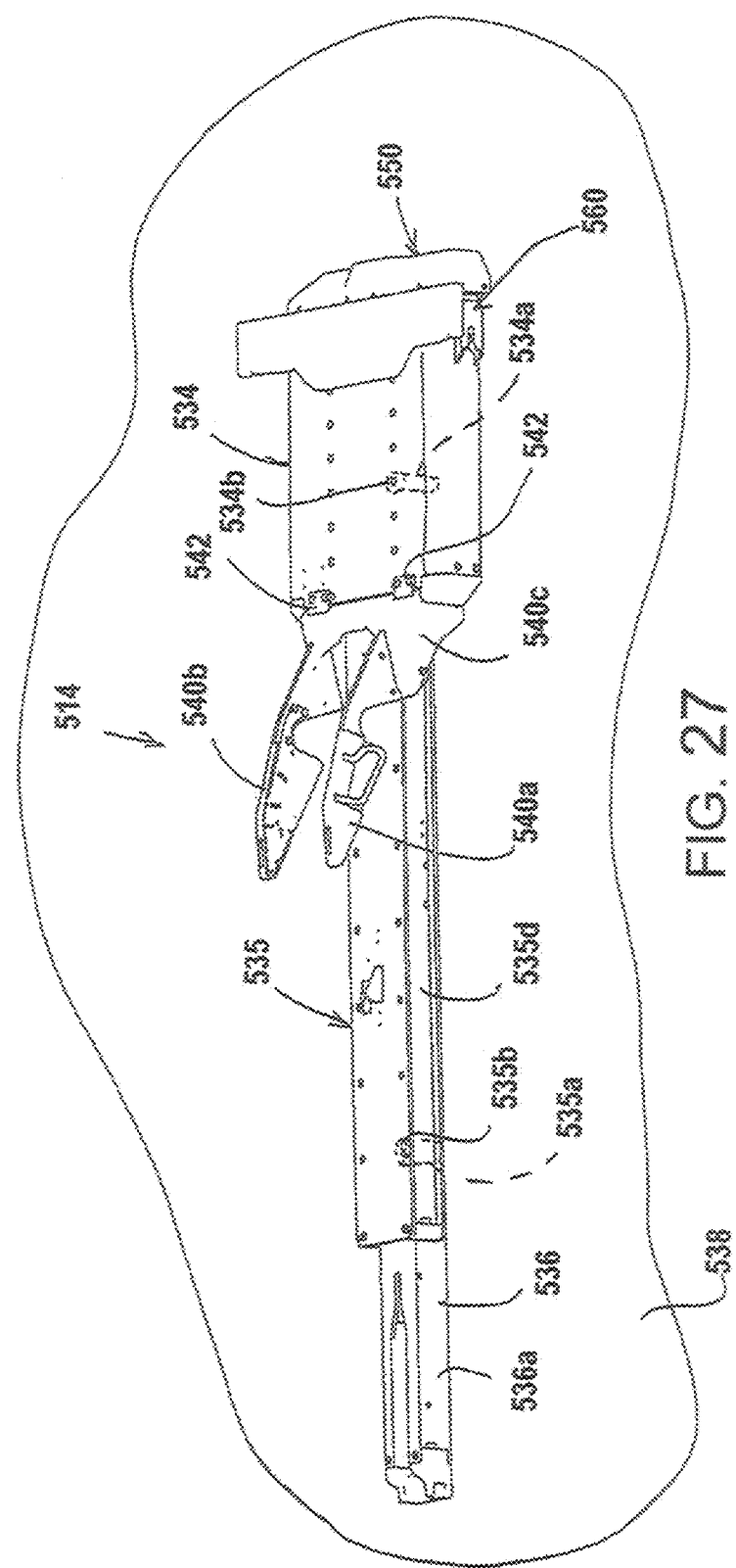
FIG. 27 is a perspective view of the loading and unloading device of FIG. 24.

Similar to device 414, device 514 includes a pair of pivotal arms 540a and 540b, which are pivotally mounted to carriage 534 and which are moved between a raised or inclined position, shown for example in FIG. 27, and a lowered position shown in FIG. 24 when carriage 534 is fully extended from the vehicle for loading or unloading patient support 410 into or from the vehicle. In the illustrated embodiment, arms 540a and 540b are commonly mounted to or formed on a base 540c, which is pivotally mounted to carriage 534 by a pair of hinges 542. Base 540c optionally includes one or more bearings or rollers 540d, which support base 540a on deck 538 when carriage 534 is retracted into the vehicle. To facilitate handling of carriage 534, arms 540a and 540b also optionally include handles 541 similar to the previous embodiment.

Arms 540a and 540b are pivoted by at least one actuator housed in carriage 534, which is mounted on one end to base 540c and mounted at its other end to carriage 534. Thus when the actuator is contacted, arms 540a and 540b will be lowered relative to carriage 534, and when the actuator is extended the arms will be raised back to their raised or inclined position illustrated in FIG. 27. Thus, loading and unloading device 514 operates in a similar manner as device 414 but has an extended range of motion.

Figure 28:
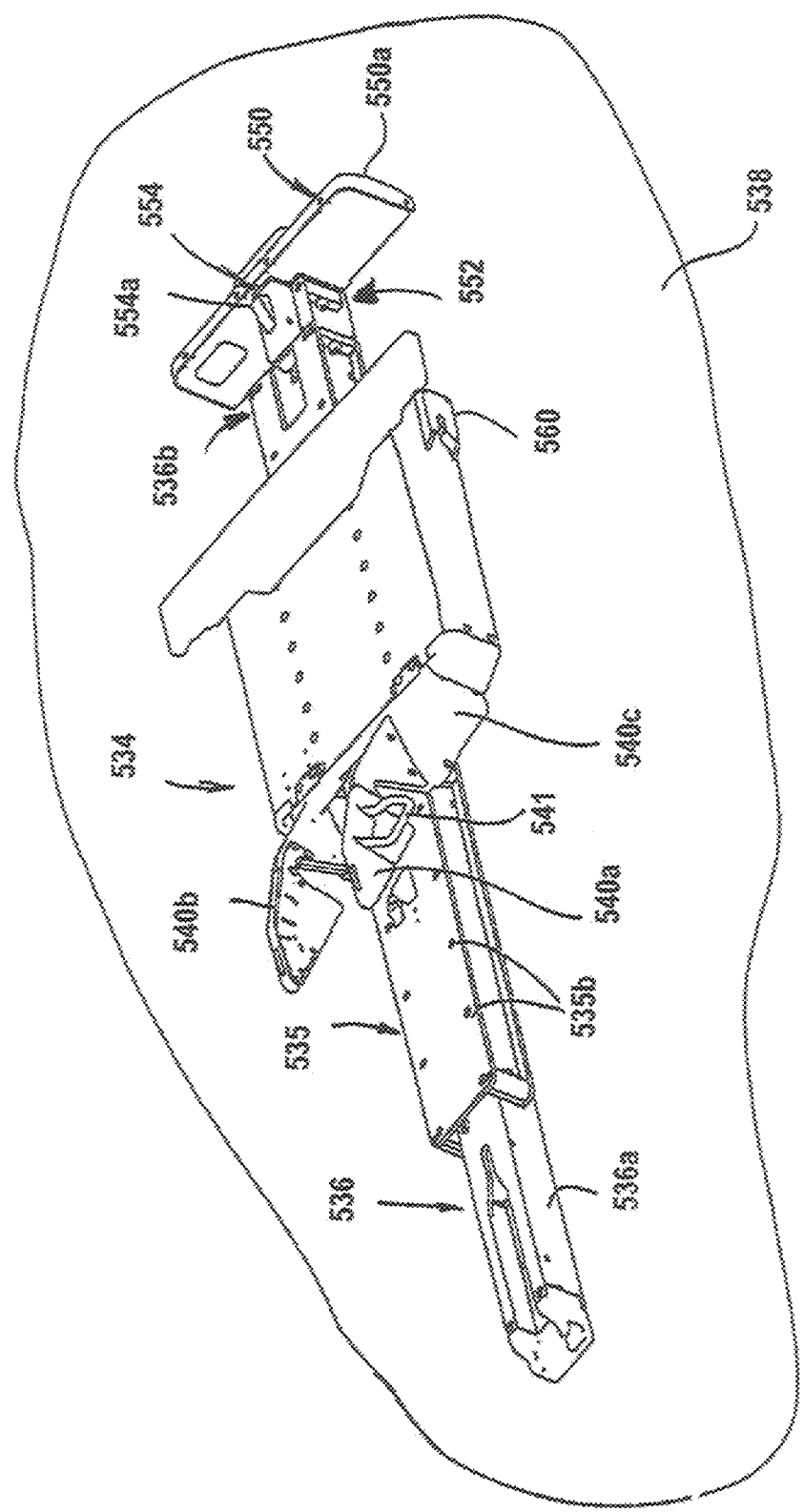
FIG. 28 is another perspective view of the loading and unloading device of FIG. 24 showing the carriage and pivotal arms moved away from the fully stowed position.

As best seen in FIG. 28, at the proximate terminal end 536b of track 536, device 514 includes a stop assembly 550. Stop assembly 550 is secured to deck 538 at the terminal end of track 536 and extends transversely relative to track 536 so that when carriage 534 is fully retracted into the vehicle, carriage 534 will be in close proximity if not abut stop assembly 550. Optionally, stop assembly 550 may comprise a housing 550a formed from a member having a similar cross-section to carriage 534, e.g. an inverted channel shaped member, so that when carriage 534 is fully inserted into the vehicle along track 536 the two members forming the carriage and the stop assembly will abut each other and have a shared geometry, which facilitates the mounting of the respective coils for the inductive power supply system. In this manner, stop assembly 550 may house the transmitting circuit described in reference to the previous embodiment in housing 550a. In addition, stop assembly 550 optionally includes a projecting stop member 552, which is aligned with member 535 so that member 535 will be spaced from stop assembly 550 when fully retracted along track 536, though carriage 534 will be in close proximity if not abut housing 550a. In addition, stop assembly 550 also may include a locking mechanism 554 that includes a spring biased latch 554a with a switch, which is located such that carriage 534 will initially compress the latch and close the switch, when carriage 534 is retracted and moved toward the stop assembly housing 550a, but once fully retracted will allow the latch to return to its pre-compressed position and engage carriage 534. Thus, when carriage 534 and arms 540 are in their fully retracted position along track 536, latch 554a will engage carriage 534 to thereby locking the carriage 534 and arms 540 in their fully retracted position. The switch may be used to trigger the recharging of the rechargeable power supply located in carriage 534 and/or provide a signal of when the loading device is in its retracted position in the vehicle.

Similar to device 414, the rechargeable power supply located in carriage 534 may be used to power the actuator that raises or lowers arms 540a and 540b. In addition, carriage 534 may include a driver to move carriage 534 relative to member 535 and/or relative to track 536, which may also be powered by the carriage's on board rechargeable power supply.

Figure 29:
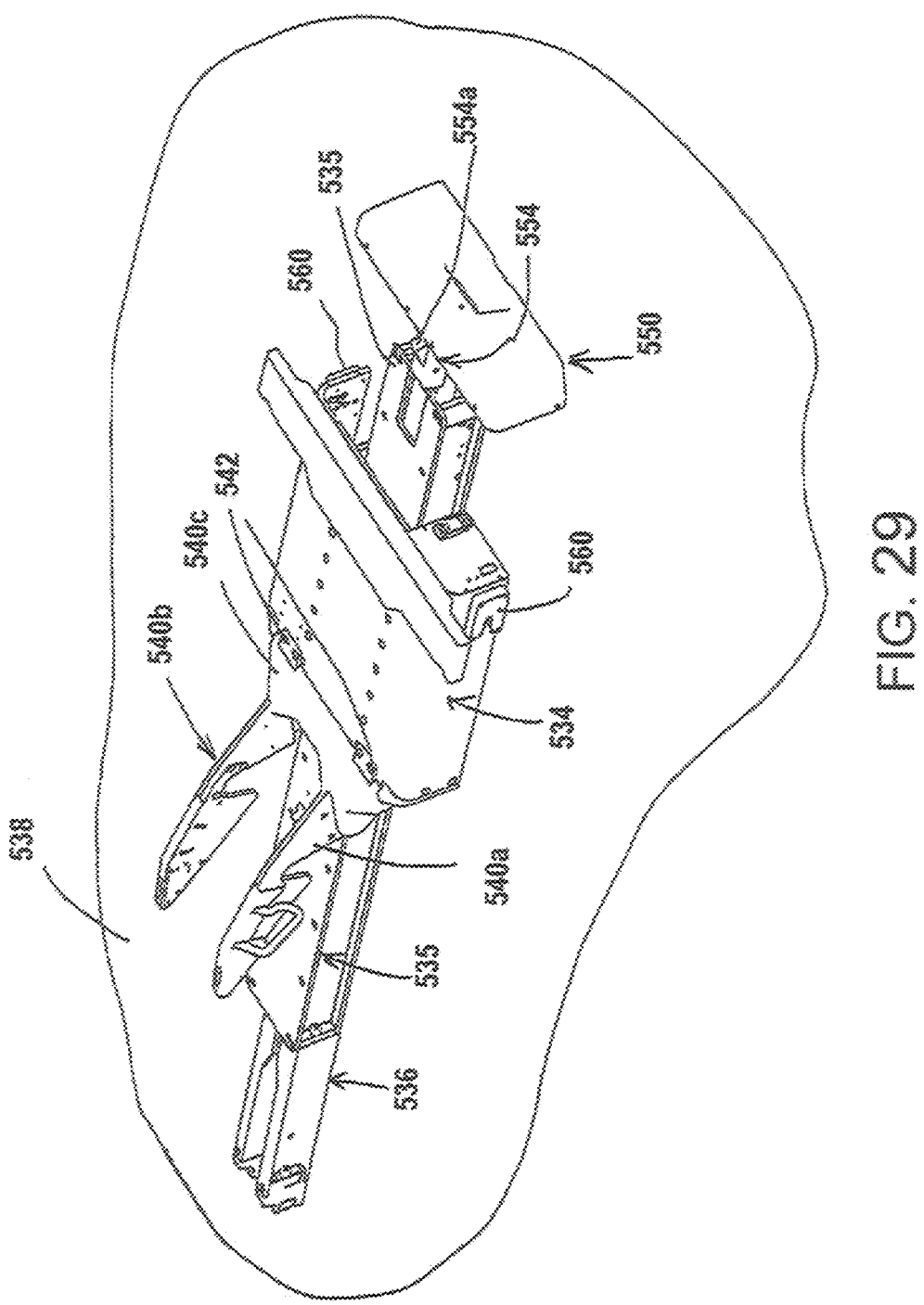
FIG. 29 is yet another perspective view of the loading and unloading device of FIG. 24.

To secure the patient support 410 to loading and unloading device 514, loading and unloading device 514 similarly includes at least one latch 560 for fastening the patient support 410 to carriage 534. Referring to FIG. 27-29, latches 560 are mounted to the opposed sides of carriage 534, which are adapted to releasably engage the head end wheel or bearing supports, described in reference to the first embodiment, which are mounted to the head end of the patient support 410 to facilitate loading of the patient support into the vehicle.

Figure 30:
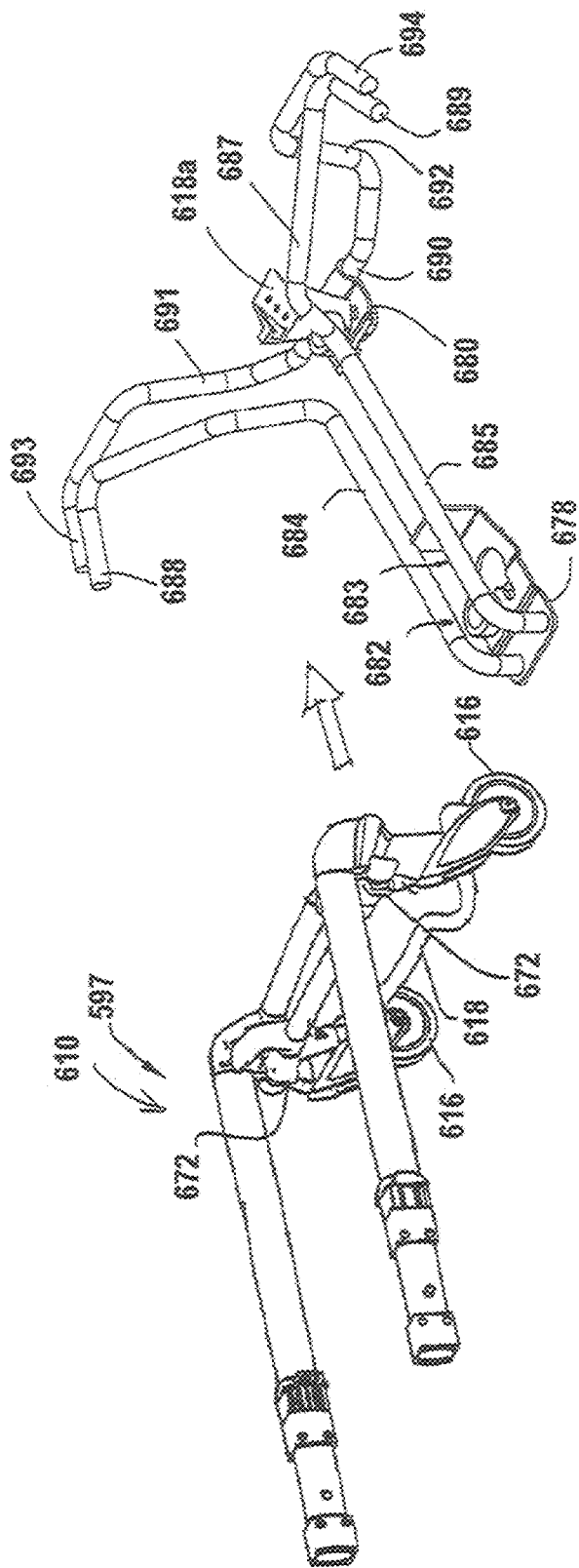
FIG. 30 is a perspective view of another embodiment of a cot fastening system incorporating aspects of the present invention.

Referring to FIG. 30, another embodiment of the cot fastening system 614 for securing a patient support 610 is illustrated. Cot fastening system 614 comprises an "antler" system with a center yoke 678 and a forward yoke 680. Both yokes 678, 680 are mounted to the ambulance cargo area floor, with a centerline of the antler system 614 aligned in the fore-aft direction of the ambulance.

The center yoke 678 is formed from two rods 682, 683 arranged as mirror images about the centerline of the antler system 676. Each rod 682, 683 includes a longitudinal segment 684, 685 and an outwardly divergent segment 686, 687, each outwardly divergent segment 686, 687 rising to a rearwardly directed hook or "ear" 688, 689.

The forward yoke 680 includes a central segment 690 secured to the ambulance cargo floor and two outwardly divergent arms 691, 692. The arms each terminate in an "ear" 693, 694 that is joined with a respective ear 688, 689 of the center yoke 678.

Positioned at central segment 690 is a transmitting circuit and transmitting coil 618a, which are electrically coupled to a power supply, such as a battery on the vehicle, for wirelessly transmitting power to a rechargeable power supply on support 610. Similar to support 410, support 610 optionally includes a rechargeable power supply and a recharging circuit that is electrically coupled to the rechargeable power supply. In the illustrated embodiment, the rechargeable power supply and recharging circuit are located at the head end of the patient support 610 so that when patient support 610 is fully loaded into the vehicle, the recharging circuit receiving coil will be aligned with central segment 690 and further with transmitting coil 618a of the transmitting circuit.

As patient support 610 (only the retractable head section 697 of support 610 is shown) is rolled into the vehicle head end first, as shown by the arrow in FIG. 30, safety bar 618 of support 610 contacts the center yoke 678. As the support 610 is rolled further, the center yoke 678 forces the safety bar 618 rearwardly until the safety bar 618 rides on top of the longitudinal segments 684, 685 of the rods 682, 683 of the center yoke 678. Again referring to FIG. 30, the latch disabler (illustrated and described more fully in publication US 2006/0075558, which is incorporated by reference herein in its entirety) on support 610 is activated prior to stop 672 reaching the shaft (numbered 266 US 2006/0075558). This enables use of the support 610 with an antler system having a lower profile, while still activating the latch disabler. With the safety bar 618 in the rotated position, the latch disabler is activated, thereby locking the retractable head section 697 of support 610 in the extended position. The latch disabler will remain activated until the support 610 is removed from antler system 676. As the patient support 610 is pushed further forward, the fixed wheels 616 roll between the ears 688, 689 and 693, 694 of the center and forward yokes 678, 680 and into the antler system 676.

In this manner, when support 610 is fully retracted onto system 614 and preferably locked in its locked position, the receiving coil of the recharging circuit for the rechargeable power supply of support 610 is positioned in close proximity to transmitting coil 618a of antler system 614 so that the rechargeable power supply of support 610 can be charged using wireless power transmission from the antler system. For further details of antler system 614 and support 610 reference is made to US 2006/0075558 referenced above.

Accordingly, the aforementioned embodiments provide a power system that eliminates the need for direct electrical connectors and reduces the concern for battery management, while enhancing safety. Further, the loading and unloading device of the present invention may provide a greater range of motion and extension from the vehicle than heretofore known to further facilitate the loading and unloading of the patient support from a vehicle equipped with the loading and unloading device.

C. More Vehicular Patient Support Apparatuses

FIGS. 31-38D illustrate additional embodiments of a patient support apparatus and a loading/unloading system for loading and loading the patient support apparatus into, and out of, a vehicle. Any of the components and/or features of the patient support apparatuses of FIGS. 1-30 may be incorporated into, either in whole or in part, any of the vehicular patient support apparatuses and/or loading/unloading systems described below with respect to FIGS. 31-38D. Some components of the patient support apparatuses of FIGS. 31-38D are described in more detail in U.S. patent application Ser. No. 11/769,959, which is incorporated by reference herein. The reference numbers in FIGS. 31-38D correspond to the reference numbers in the '959 patent application but have been increased by 700. Thus, for example, the reference number 10 in the '959 patent application corresponds to reference number 710 herein.

Figure 31:
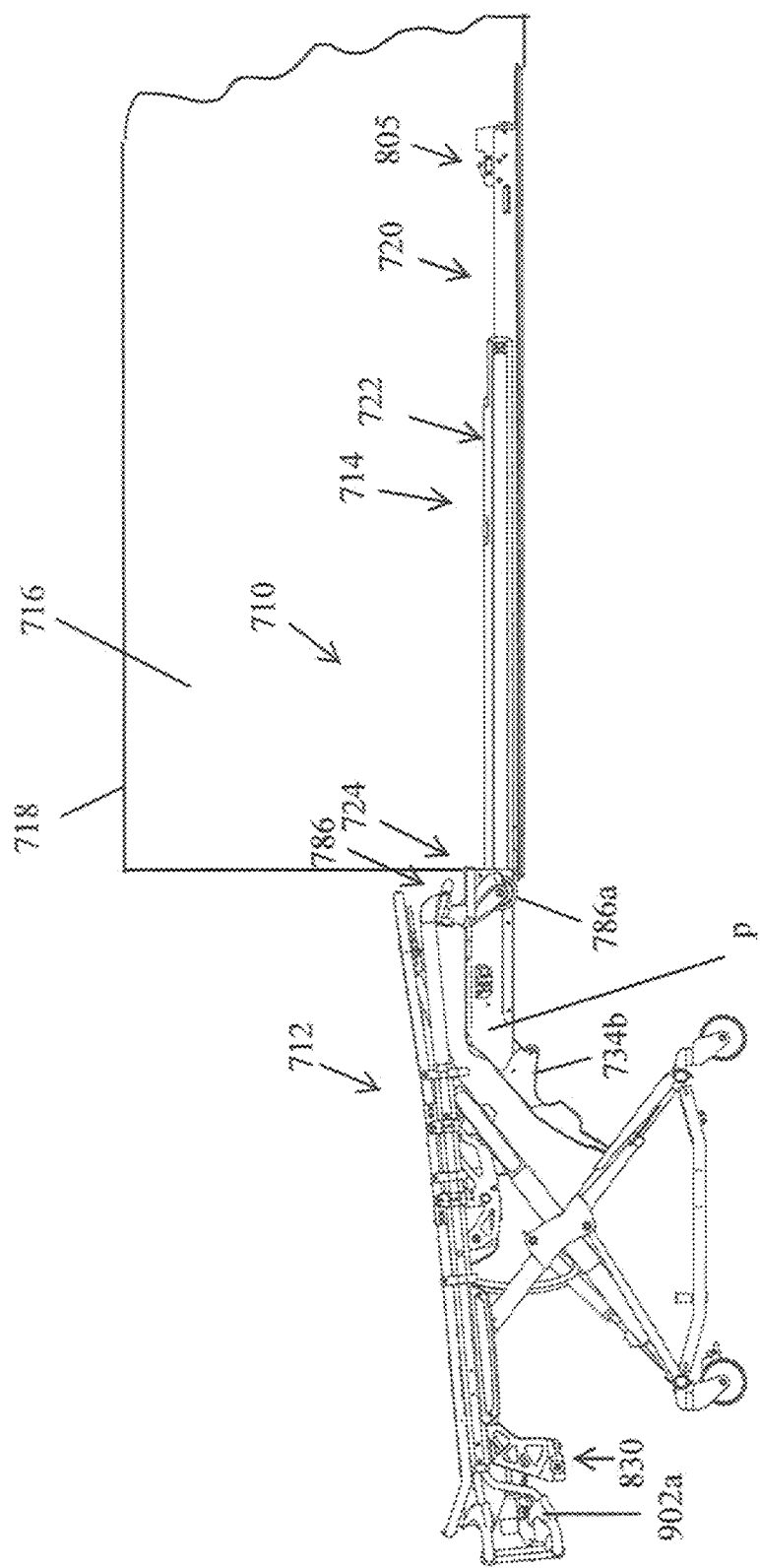
FIG. 31 is a side elevation view of a cargo area of an ambulance with an ambulance cot loading and unloading apparatus according to another embodiment of the present invention mounted therein illustrating the loading and unloading apparatus in a deployed configuration.

Referring to FIG. 31, the numeral 710 generally designates another embodiment of an ambulance cot and loading and unloading system incorporating one or more aspects of the present invention. Additional details of the patient support apparatus and cot loading/unloading system can be found in U.S. patent application Ser. No. 12/886,987 filed Sep. 21, 2010 and entitled AMBULANCE COT AND LOADING AND UNLOADING SYSTEM, by applicants Clifford Lambarth et al., the complete disclosure of which is hereby incorporated herein by reference.

System 710 includes an ambulance cot 712 and a cot loading and unloading apparatus 714, which is configured for mounting in the cargo area 716 of an ambulance 718. Cot loading and unloading apparatus 714 is configured to assist in the loading or unloading of a cot into or out of ambulance 718 by providing cantilevered support to the cot either before the cot is loaded into the ambulance so that as soon as the cot is engaged and lifted by the loading and unloading apparatus the collapsible legs or base of the cot can be folded and the cot loaded into the ambulance or when the cot is being unloaded. By cantilevered support it is meant that an attendant need not provide any significant vertical support to the cot and instead need only simply guide and push or pull the cot into or out of the ambulance once it is supported by the loading and unloading apparatus.

Cot loading and unloading apparatus 714 includes a base 720, which is mounted in the cargo area of the ambulance, and a transfer track 722, which is mounted on the base. Cot loading and unloading apparatus 714 also includes a trolley 724, which is mounted on the transfer track for movement therewith along the base. The track 722 and trolley 724 are configured to provide a nested rail arrangement to provide greater extension of the trolley from the emergency vehicle. Additionally, the nested rail arrangement is provided with at least one latch and more optionally, a series of latches that couple the track to the base and allow the trolley 724 to move along the track and thereafter release the track so it too can move with the trolley relative to the base to thereby fully extend the trolley from the vehicle (FIG. 31). As best seen in FIG. 31, in this configuration arms 734a and 734b pivot about a pivot axis P that is outside the ambulance, which allows arms 734a and 734b to have a greater range of motion. As previously noted, once the cot is loaded onto trolley and the arms lift the cot, the collapsible base of cot 712 is collapsed and trolley 724 along with cot 712 can be pushed along the base with head end wheels 786a straddling base 720.

Base 720 is formed from an extrusion, such as aluminum extrusion, which is anchored to the cargo area by a sub-anchor assembly. Track 722 is also formed from an extrusion and straddles base 720 and, further, is guided on base 720 by bearings 732, such as rollers or wheels, which are mounted to base 720 and which ride along inner rails 728.

The underside of trolley 724 forms an inverted channel, which straddles track 722 and is mounted to track 722 by a plurality of bearings 804, such as wheels or rollers, that ride along outer rails 720 until bearings 804 reach end caps 728b, which form the stops at the end of track 722. When trolley 724 reaches the end of track 722, trolley 724 is adapted to disengage the latch that anchors the position of track 722 along base 720 so that thereafter track 722 rides along base 720 along with trolley 724 to an extended position as shown in FIG. 32 and FIG. 31. Thus, when trolley 724 is fully extended along track 722 and track 722 is fully extended along base 720, trolley 724 extends from track 722 beyond base 720 (see FIG. 31). In this manner, trolley 724 can be extended from the ambulance cargo area and further extended from the ambulance.

To engage cot 712, trolley 724 includes an arm assembly 734 with a pair of cantilevered of arms 734a, 734b and a trolley frame 736 to which arm assembly 734 is mounted for pivotal movement by a transverse member 738. Arms 734a, 734b are pivoted between a lowered, pre-engaged position (FIG. 31), a raised cot engaged position, and non-deployed or stowed position (FIG. 33) by a drive mechanism 740. Further, as will be more fully described below, when trolley 724 is in its stowed configuration with arms 734a, 734b in a generally horizontal arrangement, arm assembly 734 is adapted to releasably engage track 722 so that trolley 724 is releasably anchored to track 722. Further, as will be more fully described below, when an attendant raises arms 734a, 734b the attendant can release this engagement and move trolley 724 along track 722 to position trolley 724 anywhere along track 722. Thus, an attendant may position trolley 724 toward the rear of the cargo area just inside the ambulance doors for quick deployment, thus eliminating the need for the attendant to climb into the cargo area to retrieve the trolley. To facilitate movement of trolley 724 and provide support to the arm when the arms are moved along the cargo area deck (when the arms are in the generally horizontal arrangement), arms 734a, 734b optionally include rollers 734c for rolling on the cargo deck outwardly of track 722 and base 720.

Drive mechanism 740 is configured to raise arms 734a, 734b at a first speed when the arms are deployed, but not loaded by an applied force, for example when not loaded with a cot, but is configured to raise the arms (734a, 734b) when in their deployed position at another, slower speed or speeds when the arms are loaded with an applied load, for example when engaged with and lifting a cot. For example, the slower speed at which the arms are raised may be variable or may have two or more discrete speeds for specific ranges of motion. Further, drive mechanism 740 may be configured to lower the arms 734a, 734b at a first speed when the arms are not subject to an applied load, e.g. not lifting a cot, but to lower the arms at another slower speed or speeds if the arms are subject to an applied load, e.g. lifting a cot. Alternately, the driver mechanism may be configured to raise or lower the arms at a slower speed only when the arms are loaded with a weight that exceeds the weight of a cot, for example, when a cot is supporting a patient. Optionally, the arms could be moved (raised or lowered) at one speed when fully unloaded, another slower speed when loaded with a cot, and yet another even slower speed or speeds when the arms are moving (lifting or lowering) a cot that is supporting a patient.

Dive mechanism 740 is mounted to trolley frame 736 and, in the illustrated embodiment, comprises a hydraulic drive mechanism, namely a hydraulic cylinder 742 and a hydraulic power unit 744. Rod 742a of cylinder 742 includes a bushing 742b on its rod end and also a switch 742c, which is used by control system 900 to determine the load on the arms. Bushing 742b is connected to outer side 738a of transverse member 738 by a pin 738c, such as a clevis pin, with the other end of cylinder 742 mounted to frame 736 by a pivot 742d, which in turn is secured to frame 736 by a fastener 742e. A return spring may also be provided that is mounted on one end to the frame and at another end to the arm assembly, which provides a counter balancing force to the cylinder to reduce the load on the cylinder when the hydraulic mechanism is actuated to raise arms 734a and 734b and also slow the lowering of arms 734a, 734b when the release button described below is actuated.

As previously noted, trolley 724 is adapted to engage cot 712. Trolley 724 includes a pair of latches 770 for engaging cot 712. Frame 736 supports two latches 770, one at each side of frame 736. Latches 770 are mechanically actuated and released, but may also be electrically released. Latches 770 each include a latch plate 772a and latch arm 772b. Latch plate 772a and latch arm 772b are mounted in a bracket 74 that forms a housing for mounting latch 770 to frame 736. Latch arm 772b is pivotally mounted in bracket 74 for movement between an unlocked position in which arm 772b is pivoted through an open side of the bracket for engagement by the cot (or for release of the engagement of the cot) and a locked position. Latch arm 772b is biased in its unlocked position by a spring (not shown), which is configured with an over center arrangement so that the spring also biases the latch arm in its locked position after latch arm 772b is moved out of its locked position. To release latch plate 772b from its locked position, latch arm 772b includes a pin 776 for actuation by a solenoid 780, which is controlled by control system 900, more fully described below.

Solenoid 780 is mounted to frame 736 by a bracket 782 and includes a plunger 778 that is coupled to a bracket that engages pin 776. Thus, when solenoid 780 is activated, plunger 778 will lower and the bracket will pull on pin 776 to allow the biasing force of the spring to move latch arm 772b to its unlocked position. As will be more fully disclosed below, latch 770 may also be manually released by manual release assembly 880.

When cot 712 is aligned with the rear opening of the ambulance and trolley 724 is fully extended along base 720, and arms 734a, 734b are lowered, cot 712 can then be pushed toward the ambulance so that arms 734a, 734b extend into the cot beneath the head end wheeled frame 786 of cot 712. Cot 712 is then pushed and guided by guide surfaces formed on housing 788 of trolley 724 and into a pair of recesses 788a also formed in housing 788, which are configured to guide wheels 786a into engagement with the latches (770) on trolley 724. Each wheel 786a includes a laterally extending pin 790 for engagement by latches 770.

Base 720 is anchored to the cargo deck of the ambulance by a sub-anchor assembly 792. Anchor assembly 792 includes an anchor member or plate 792a, which is fastened in or on the deck by a plurality of attachment brackets 794. Plate 792a is generally channel-shaped whose channel is covered by a cap plate 796 and ends are covered by end caps 798. Plate 792a optionally provides through holes to allow cabling to extend from the loading and unloading apparatus to the vehicle power supply system. As will be more fully described below, system 710 may incorporate an inductive charging system for charging batteries on the trolley and the cot. Anchor plate 792a may also provide anchorage for an optional safety hook 802 that can be engaged, for example, by a frame member of cot 712 after unloading the cot from or before loading the cot onto loading and unloading apparatus.

To anchor trolley 724 and the cot 712 during transport, base 720 supports a latch mechanism 805 for engaging trolley 724. Referring to FIGS. 32-33, track 722 has a forked end 722b, which when fully retracted along base 720 allows track 722 to straddle latch mechanism 805, which helps reduce the overall contracted length of loading and unloading apparatus while providing full extension of trolley 724 along base 720. Further, this allows latch 805 to engage trolley 724 when trolley 724 is fully retracted over track 722.

Latch mechanism 805 includes a pawl 806, which is pivotally mounted in housing 808 by a pivot pin 806a and biased in an extended or locking position by an actuator 810. Pawl 806 is also coupled to a manual release plate 812 via a pin connection. Plate 812 supports a button 812a that extends through a mounting bezel 812b on housing 808 so that it is accessible to an attendant in the front of the ambulance cargo area. Plate 812 is also coupled to a pair of springs 814 to thereby return button 812a to its non-release position after the pressure on the button is removed. Optionally, plate 812 is also coupled to a release mechanism 815 (FIG. 34D) provided at the other end of base 720, described more fully in reference to FIG. 34D below.

Actuator 810 includes a plunger 816 that is biased by a spring 818 to apply a downward force on a pivot actuator 820, which is also pivotally mounted in housing 808 by a pivot pin 820a and which is coupled to pawl 806 by a link 820b to thereby urge pawl in its extended position. To engage latch 805, trolley 724 includes a stop ramp 26a, which is mounted to the underside of frame 726 in top plate 800c of rail portion 800 by a pair of fasteners 724c. In this manner, when trolley 724 is pushed along track 722 toward the front cargo area of the ambulance, stop ramp 724b will ride on the ramped surface 806b of pawl 806, with the weight of the trolley then depressing pawl 806 so that it pivots about pin 806a against the biasing force plunger 810. Once block 724b has moved past the end of the ramped surface 806a of pawl 806, plunger 810 will return pawl 806 to its extended locked position behind ramp 724b and thereby lock trolley 724 as well as track 722 in their full retracted positions along base 720. Also to provide lateral support at latching mechanism 805, a pair of retaining plates 805a are mounted to housing 808 adjacent either side of pawl 806.

In addition, to further secure cot 712 when fully loaded, the foot end of cot 712 includes a foot end fastener 830 (FIG. 36) for engaging a fastener 832 provided on track 722. Fastener 832 (shown inverted) includes a guide 834 with a V-shaped recess 836, which is mounted in track 722. Pivotally mounted in guide 834 by a pin 838a is a hook 838, which is biased by a pair of springs 840 in an extended position in recess 836 for engaging fastener 830 when the foot end of cot 712 is aligned over fastener 832. Also mounted to hook 838 is a release plate 838b, which is coupled to release mechanism 815 which when pulled moves hook 838 to a recessed position for disengaging hook 838 from fastener 830. Optionally, an indicator plate 838c may be provided that is also mounted about pin 838a and which pivots with pin 838a and extends through a slotted opening in hook 838, which indicates the status of the hook (i.e. engaged or not engaged).

Figure 36:
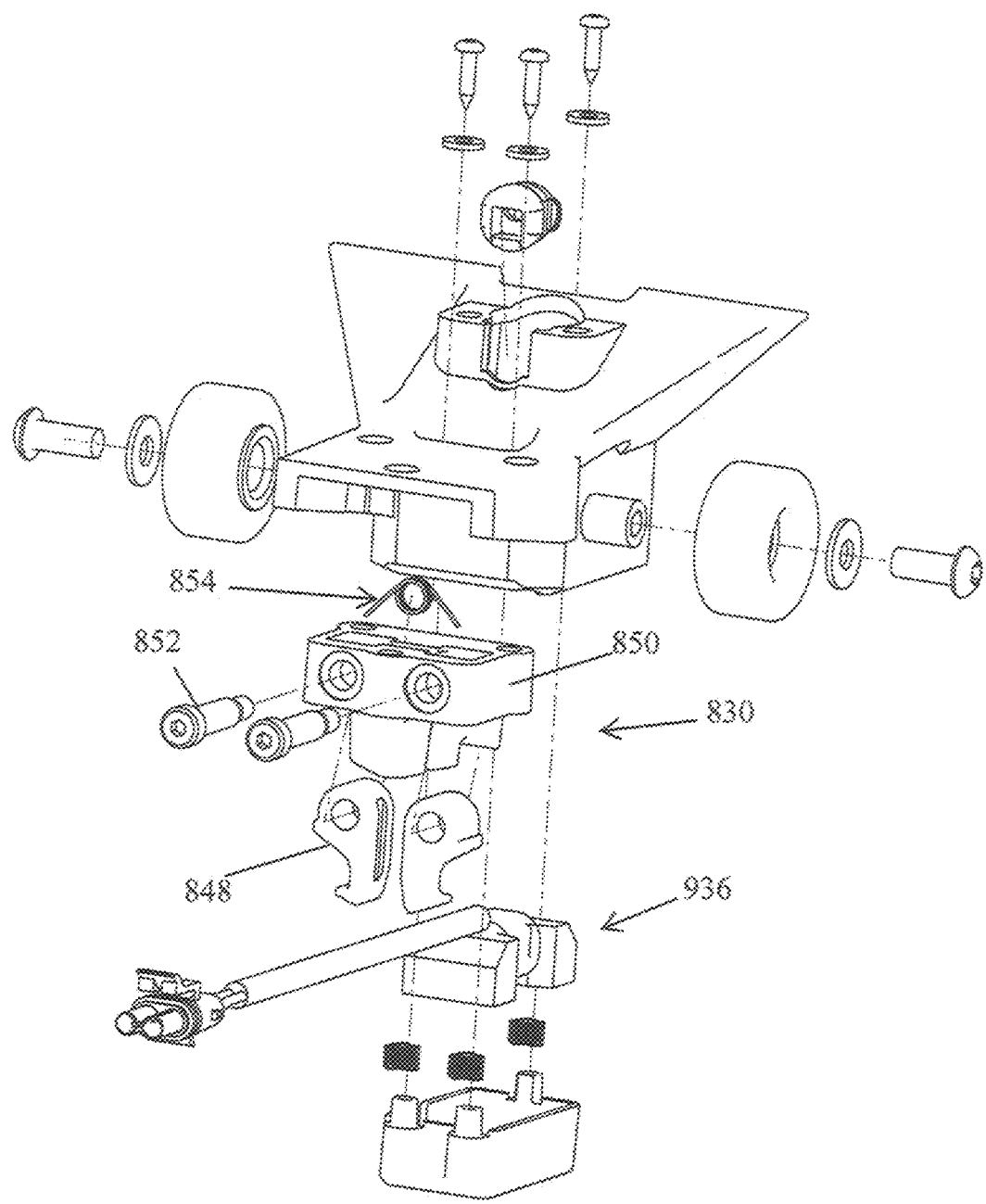
FIG. 36 is an exploded perspective view of a foot end fastener assembly of the cot of FIG. 31.
Figure 37:
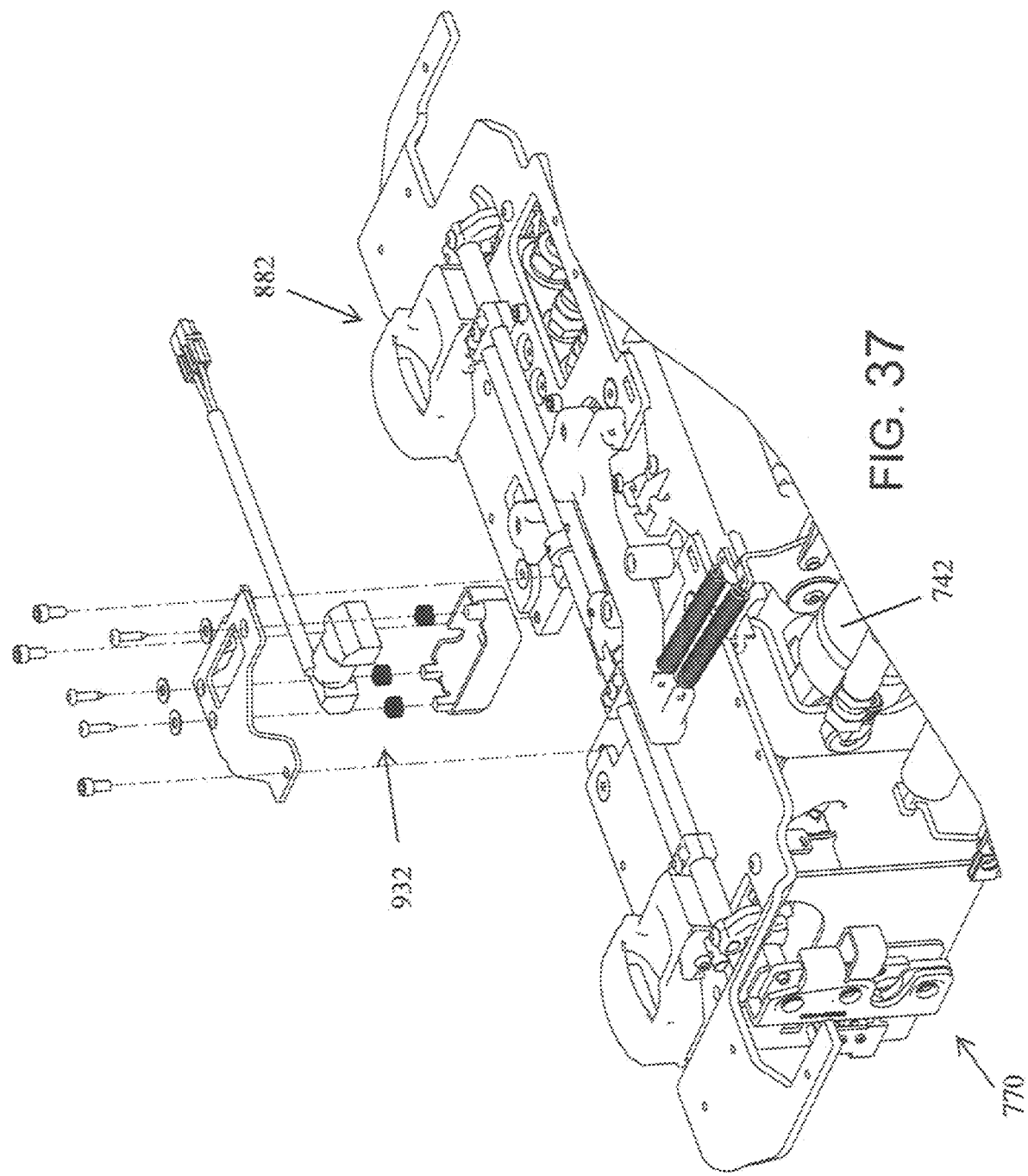
FIG. 37 is an exploded perspective view of the mounting details of the trolley secondary control of the loading and unloading system of FIG. 31.
Figure 38:
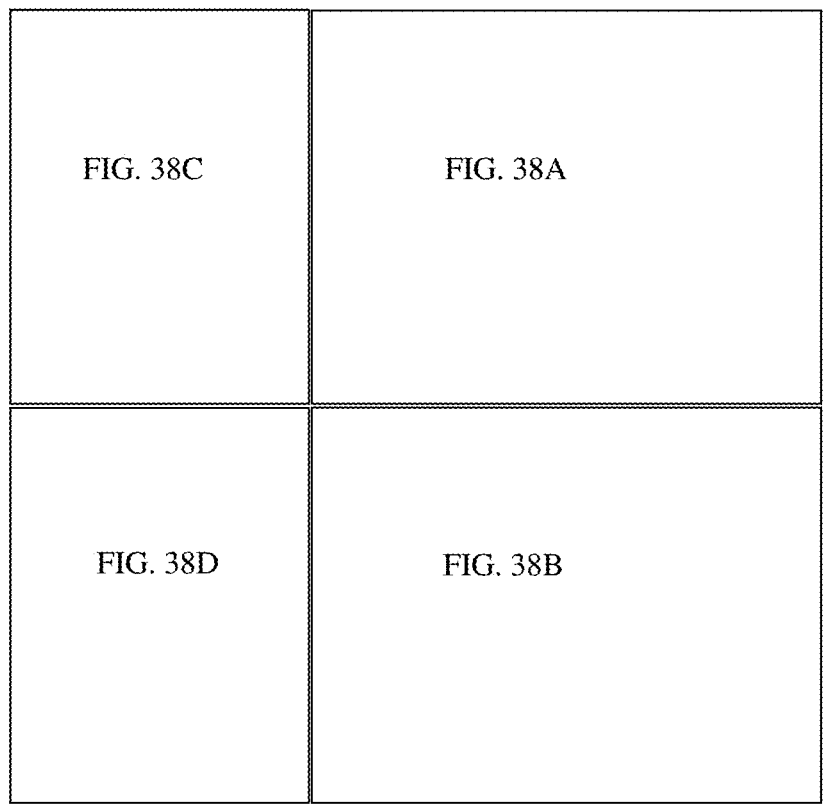
FIG. 38 is a diagram showing the arrangement and relationship between FIGS. 38A, 38B, 38C, and 38D, which together illustrate a schematic drawing of the control system of the ambulance cot and loading and unloading system of FIG. 31.
Figure 38A:
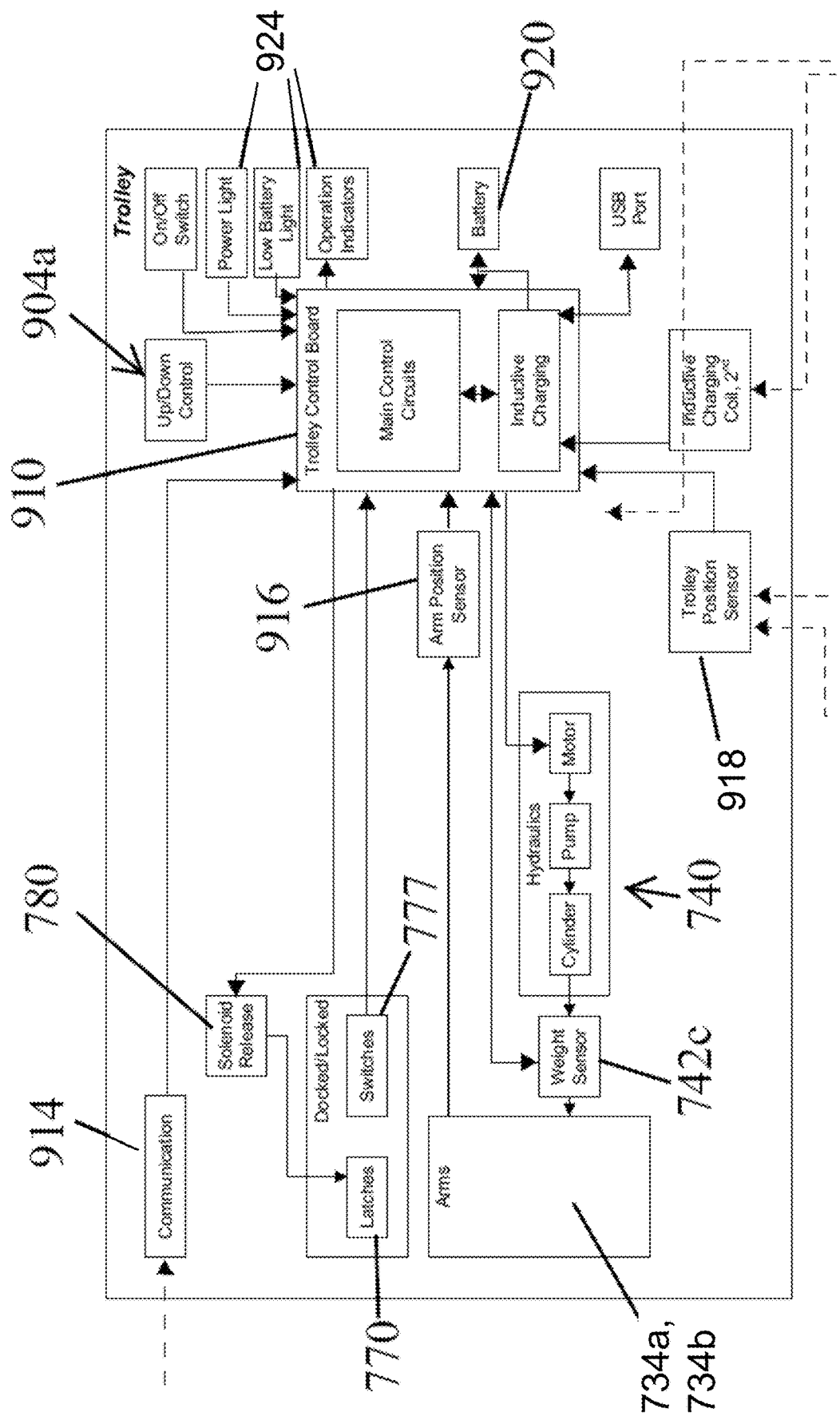
FIG. 38A is a first portion of the diagram referenced by FIG. 38.
Figure 38B:
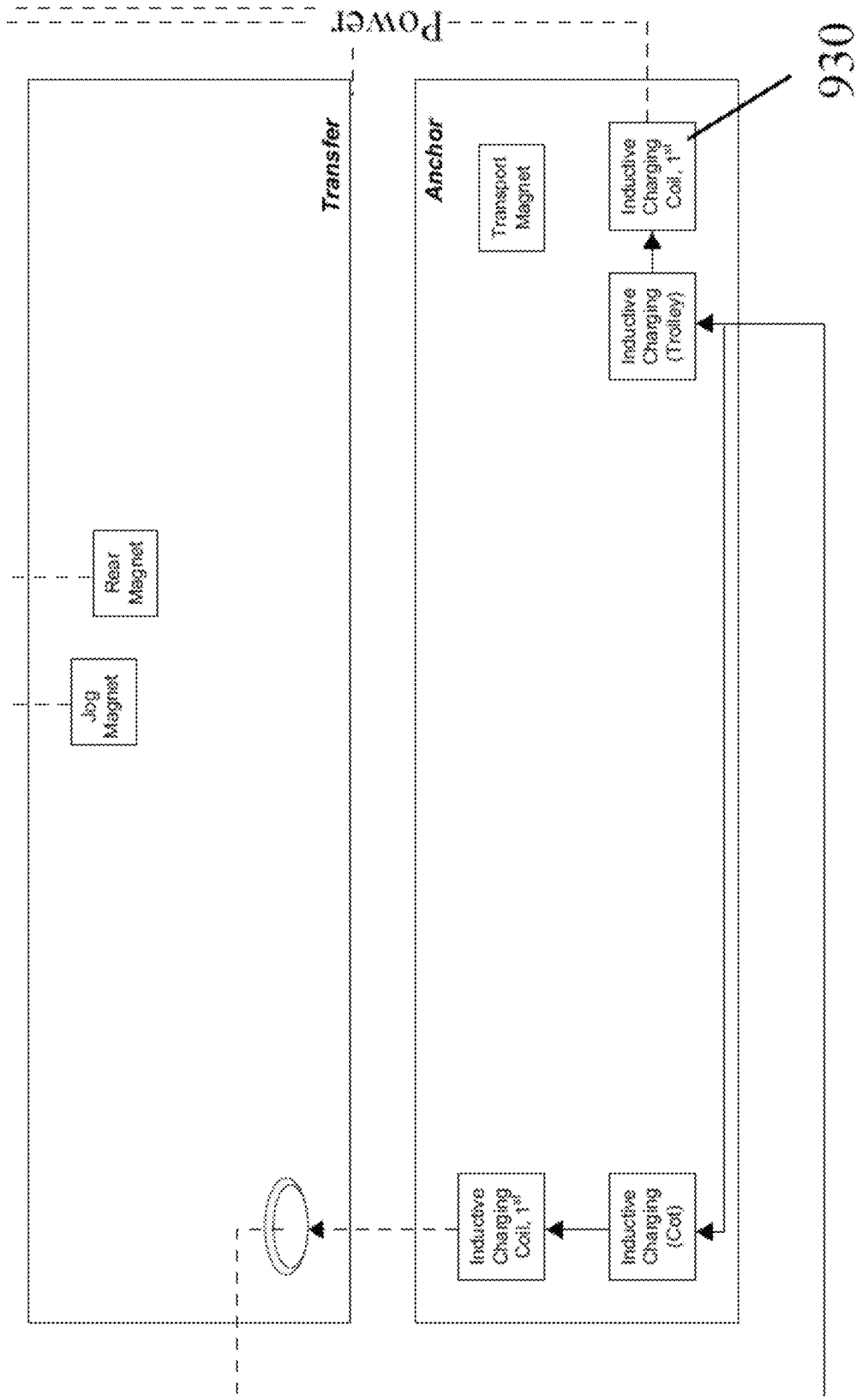
FIG. 38B is a second portion of the diagram referenced by FIG. 38.
Figure 38C:
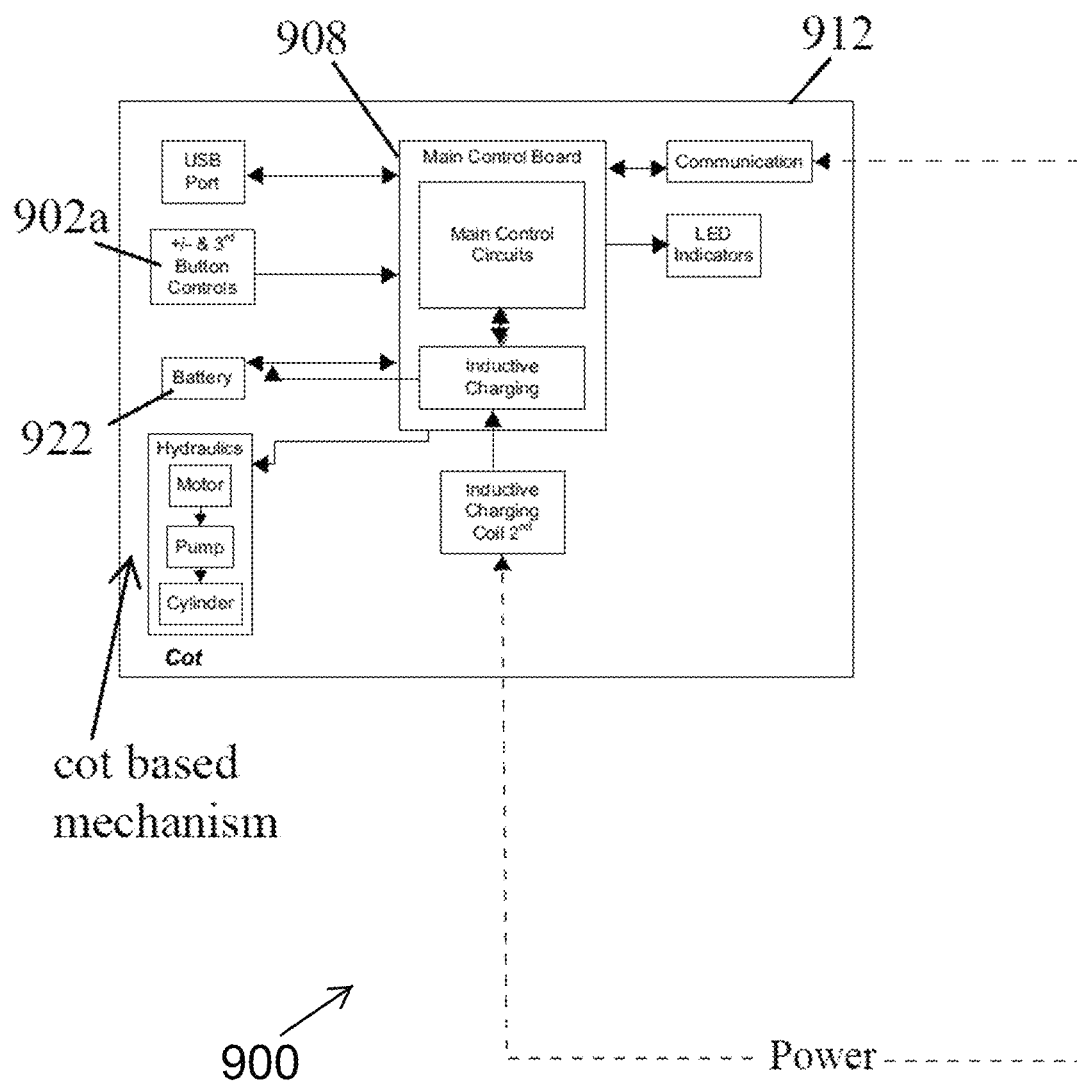
FIG. 38C is a third portion of the diagram referenced by FIG. 38.
Figure 38D:
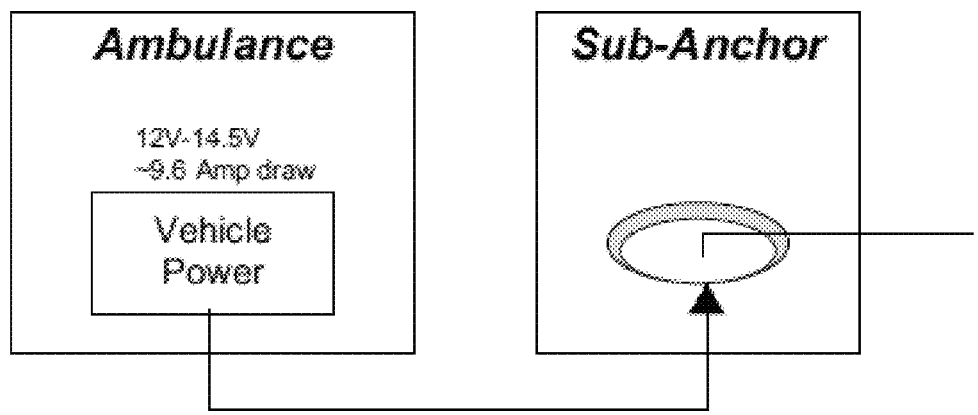
FIG. 38D is a fourth portion of the diagram referenced by FIG. 38.

Referring to FIG. 36, fastener 830 is mounted to the foot end of cot 712 by a frame 842 and a bracket 846. Fastener 830 is mounted between a pair of wheels 844, which are also mounted to frame 842 by bracket 846, and positioned for engaging the floor of the cargo area when cot 712 is being loaded onto or unloaded from the loading and unloading apparatus. Wheels 814, therefore, provide further support and stability to the cot, when the cot is loaded into the ambulance. Fastener 830 includes a pair of pawl hooks 848, which are pivotally mounted in a housing 850 (which is mounted to frame 842) by a pair of pins 852 and further biased outwardly by a coil spring 854 so that their distal ends project beneath housing 850 for engagement with fastener 832. Once so engaged, fastener 830 will restrain the cot relative the transfer track 722 from vertical, lateral (side to side), and longitudinal movement.

As noted above, to release trolley 724 from its full retraced and locked position at latch mechanism 805, an attendant need only push button 812a, which causes pawl 806 to pivot about pin 806a into its lowered or depressed position in housing 808. Alternately, latch mechanism 805 may be released by release mechanism 815. Referring to FIG. 34D, release mechanism 815 includes a trigger 815a, which is rotatably mounted in a housing 815b mounted to the end of base 720. Trigger 815a is coupled to an actuation plate 815c, which is positioned and aligned to actuate a pair of drive rods 815d and 815e via drive blocks 815f. Drive rod 815e is coupled to actuator 820 of latch mechanism 805 so that when trigger 815 is rotated its rotational axis, actuator plate 815c will urge drive rod 815e to pivot actuator 820 about its respective pivot axis to thereby pivot pawl 806 about its respective pivot pin and thereby allow trolley 724 to be disengaged from latch mechanism 805. In a similar manner, drive rod 815d is coupled to release plate 838b of fastener 832 so that when trigger 815a is rotated about its pivot pin, hook 830 will be moved to its recessed position for disengaging hook 838 from fastener 830. Optionally, trigger 815a may provide two actuation positions, one for releasing fastener 832 and a second position for releasing both fasteners 832 and latch 805.

Control system 900 may include an inductive charging system, such as described in copending application entitled POWERED PATIENT SUPPORT AND FASTENING SYSTEM WITH INDUCTIVE BASED POWER SYSTEM, Ser. No. 60/949,005, filed Jul. 11, 2007, which is hereby incorporated by reference in its entirety.

In the illustrated embodiment, control system 900 includes two control systems, a cot-based control system 902 and a loading and unloading apparatus-based control, for example, a trolley-based control system 904. Each control system 902, 904 includes a control board 908 and 910 (with a microprocessor and memory storage unit), which are in communication with user input devices 902a and 204a, which are provided at cot 712 and trolley 724, respectively. User input devices 902a and 904a each include user actuatable buttons or switches 904b (only user input device 904a is shown in detail) to allow a user to input signals for raising or lowering arms 734a, 734b. Further, user input device 904a also include a manual dump button 904c, which when pressed presses against a linkage 904d that couples to the manifold to release fluid from the cylinder into a reservoir so that the arms can be quickly lowered.

Control system 902 and 904 also each include a communication board 912, 914 with wireless transmitters and/or receivers, such as RF devices, inductive devices, acoustic device, optical devices, or infrared devices, between the cot-based control system 902 and trolley-based control system 904 so that cot-based control system 902 can control the devices at loading and unloading apparatus. Communication may be one-way or two-way communication.

To determine the height, angles, speeds, stop points/conditions, and acceleration, system 710 also includes an arm angle position sensor 916, which is mounted to frame 736 by a mounting bracket 916a and is coupled to arm assembly 734 by a link 916b, which is used to determine the angular position of the arms. Its values are referenced against preset registers to determine speeds, stop points/conditions, and acceleration. Control system 900 may also include a sensor 918 to detect when trolley 724 is latched at latching mechanism 805 and to provide feedback to control system 900 when trolley 724 is latched. Further, control system 900 may include one or more USB port devices to allow information, data, programming upgrades, or programming to be uploaded to the respective cot-based control system 902 and/or trolley-based control system 904. In addition, system 900 may incorporate a plurality of indicators 924, such as LEDs, to provide status indication, such as low battery, a power light (to indicate that the system is powered), and other operational indicators.

As noted above, control system 900 may incorporate an inductive charging system for charging the battery 920 on the loading and unloading apparatus and/the battery 922 on the cot. Primary and secondary coils may be electrically coupled to the respective batteries and located on the cot, on the trolley, and in the base to allow recharging of the respective batteries through induction. Further, the charge regulation circuitry for the trolley battery may reside on the trolley-based control board 910, while the charge regulation circuitry for the cot battery may reside on the cot-based control board 908.

For example, latch mechanism 805 may house a primary coil 930, which couples to the electrical system of the vehicle through the sub-anchor assembly 792, and trolley 724 may house a secondary coil 932, which is in communication with trolley-based control board 910, so that when aligned with coil 930 in the latch mechanism 806 (when trolley is moved to its fully retracted position), electricity can be generated by inductive coupling to recharge the trolley battery (which is housed in trolley) from the vehicle's electrical system. Similarly, base 720 may include another primary coil 934 adjacent fastener 832, which is also coupled to the vehicle electrical system, for example through sub-anchor assembly 792, and cot 712 may include a coil 936 (FIG. 36), which is electrically coupled to the cot battery through cot-based control board 908 so that the cot battery can also be recharged using the vehicle electrical system. Further, to facilitate close positioning of coil may be enhanced by mounting coil 934 in a spring biased housing 934a (FIG. 34A) so that when track 722 is moved along base 720, coil 934 will not interfere with the movement of track 722.

Alternately, the system of the present invention may incorporate electrical contacts to provide direct electrical coupling between the trolley and the base, as described in the reference patent, and further may provided a cabling between the cot and trolley based control systems rather than the wireless connection described herein.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A patient support system comprising:
   a patient support apparatus having an electrically powered device or electrically powered subsystem and an electrical circuit including a receiving coil for powering said electrically powered device or electrically powered subsystem; and
   a transmitting coil for inductively coupling and transferring electrical energy to said receiving coil when said receiving coil is in proximity to said transmitting coil.

2. The patient support system according to claim 1, wherein said patient support apparatus includes an electrically powered subsystem, said electrically powered subsystem comprising a mattress, and said mattress including at least one device chosen from a group consisting of a blower, a pump, a valve actuator, a sensor, a control circuit, and a battery.

3. The patient support system according to claim 2, wherein said receiving coil is mounted to said mattress.

4. The patient support system according to claim 1, wherein said patient support apparatus includes a base and a frame supported by said base, said frame for supporting a mattress or a pad.

5. The patient support system according to claim 4, wherein said receiving coil is mounted to said frame.

6. The patient support system according to claim 1, wherein said transmitting coil transfers power and data to said receiving coil.

7. The patient support system according to claim 1, further comprising an alignment structure to align said receiving coil with said transmitting coil.

8. The patient support system according to claim 7, wherein said alignment structure comprises alignment structures on housings for said coils.

9. The patient support system according to claim 1, further comprising an actuator to move one of said coils between an extended position and a retracted position.

10. The patient support system according to claim 1, further comprising a controller, said controller configured to detect when said coils are aligned or inductively coupled with each other.

11. The patient support system according to claim 10, wherein said controller is configured to initiate a signal in response to a status of the inductive coupling.

12. The patient support system according to claim 11, wherein said signal comprises a message to an off-board controller regarding the status of the inductive coupling.

13. The patient support system according to claim 11, said patient support apparatus including a rechargeable battery, said electrical circuit for recharging said battery, and said signal indicating when said rechargeable battery is charged.

14. The patient support system according to claim 1, further comprising an indicator at said patient support apparatus, said indicator providing a human-perceptible signal to a caregiver when said coils are aligned or inductively coupled.

15. The patient support system according to claim 14, wherein said indicator comprises a light or an image on a display screen.

16. A patient support apparatus comprising:
a base;
a frame supported by said base;
an electrically powered device or electrically powered subsystem; and
an electrical circuit including a receiving coil for powering said electrically powered device or electrically powered subsystem, said receiving coil for inductively coupling and receiving electrical energy from a transmitting coil when said receiving coil is in proximity to the transmitting coil.

17. The patient support apparatus according to claim 16, further comprising an alignment structure for aligning said receiving coil with the transmitting coil.

18. The patient support apparatus according to claim 16, further comprising a controller, said controller configured to detect when said receiving coil aligned or inductively coupled with the transmitting coil.

19. The patient support apparatus according to claim 18, further comprising a brake, said controller only allowing inductively coupling when said brake is activated.

20. The patient support apparatus according to claim 19, further comprising an actuator, said actuator configured to automatically move said receiving coil to an extended position when said brake is activated.

21. The patient support apparatus according to claim 16, wherein said patient support apparatus comprises a chair, a bed, a stretcher, a cot, or a surgical table.

22. The patient support apparatus according to claim 16, wherein said receiving coil inductively receives electrical energy from one or more transmitting coils that occupy a greater area than said receiving coil.

* * * * *

UNITED STATES PATENT AND TRADEMARK OFFICE
CERTIFICATE OF CORRECTION

PATENT NO. : 10,561,551 B2
APPLICATION NO. : 15/040593
DATED : February 18, 2020
INVENTOR(S) : Clifford Edwin Lambarth et al.

It is certified that error appears in the above-identified patent and that said Letters Patent is hereby corrected as shown below:

In the Claims

Column 34, Claim 18, Line 12:
"detect when said receiving coil aligned or inductively"

Should be:
--detect when said receiving coil is aligned or inductively--

Signed and Sealed this
Twenty-first Day of February, 2023

Katherine Kelly Vidal
*Director of the United States Patent and Trademark Office*